(12) United States Patent
Matias et al.

(10) Patent No.: US 7,924,843 B2
(45) Date of Patent: *Apr. 12, 2011

(54) METHOD, APPARATUS AND COMPUTER-READABLE CODE FOR DATA COMPRESSION OF NETWORK PACKETS

(75) Inventors: Yossi Matias, Tel Aviv (IL); Raanan Refua, Givat Shmuel (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/624,441

(22) Filed: Nov. 24, 2009

(65) Prior Publication Data

US 2010/0103953 A1 Apr. 29, 2010

Related U.S. Application Data

(63) Continuation of application No. 11/403,803, filed on Apr. 14, 2006, now Pat. No. 7,630,394.

(60) Provisional application No. 60/671,074, filed on Apr. 14, 2005.

(51) Int. Cl.
*H04L 12/28* (2006.01)
*H04L 12/413* (2006.01)
*G06F 15/16* (2006.01)

(52) U.S. Cl. .......... 370/393; 370/447; 341/67; 709/228; 709/247

(58) Field of Classification Search .......... 370/229–238, 370/389–477; 341/51–67; 707/101, 102; 379/93.01; 709/206–249
See application file for complete search history.

(56) References Cited

U.S. PATENT DOCUMENTS

| 5,850,526 | A | * | 12/1998 | Chou | 709/247 |
|---|---|---|---|---|---|
| 6,388,584 | B1 | * | 5/2002 | Dorward et al. | 341/51 |
| 7,400,636 | B2 | * | 7/2008 | Kim et al. | 370/401 |
| 7,630,394 | B2 | * | 12/2009 | Matias et al. | 370/447 |
| 2002/0150048 | A1 | * | 10/2002 | Ha et al. | 370/231 |
| 2005/0094670 | A1 | * | 5/2005 | Kim | 370/477 |

OTHER PUBLICATIONS

J.Bellardo and S. Savage; "Measuring Packet Reordering" In Proc. of International ACM SIGCOMM Conference on Applications, Technologies, Architectures, and Protocols for Computer Communication, Pittsburgh, PA, USA, Aug. 2002.
M. Burrows and D.J. Wheeler. "A block-sorting losses data compression algorithm" Technical Report 124, May 10, 1994.

(Continued)

*Primary Examiner* — Afsar M. Qureshi
(74) *Attorney, Agent, or Firm* — Mark M. Friedman

(57) ABSTRACT

Methods, apparatus and computer readable code for compression, encoding and decoding of units of data such as packets are disclosed. In some embodiments, methods, apparatus and computer readable code for transmitting and/or receiving the data packets (for example, transmitting from a sending location to a receiving location where packets are received) are provided. For at least some packets, a dictionary is determined from a respective group of packets, including a first set of historical packets and excluding a second set of historical packet. Each target packet is encoded and/or compressed and/or decoded using the respective dictionary. Optionally, the respective group of packet includes the actual target packet to be encoded and/or compressed and/or decoded. In some embodiments, respective group of packets from which the dictionary is determined includes packets that have not been acknowledged from the receiving location at the time of encoding, though embodiments where packets have been acknowledged are also disclosed.

15 Claims, 37 Drawing Sheets

OTHER PUBLICATIONS

M.Borella; "Measurement and interpretation of internet packet loss" In Proc. of Journal of Communication and Networks, 2(2): 1-20, 2000.

Y. Matias, R. Refua "Delayed dictionary compression for packet networks", IEEE INFOCOM 2005, Conference occured in Miami, Mar. 2005.

S. Dorward and S. Quinlan. "Robert data compression of network packets," Bell Labs, Lucent Technologies, Jul. 2000. Unpublished Manuscriot.

P. Deutsch. "Deflate compressed data format specification" version 1.3. IETF, RFC, 1951, May 1996. http://www.ietf.org/rfc/rfc1951.txt.

V. Jacobson, "Compressing tcp/ip headers for low-speed serial links", IETF, RFC 1144, Feb. 1990. http://www.ietf.org/rfc/rfc 1144.txt.

Jeannot, B. Knutsson et al. "Adaptive online data compression" In Proc. of the IEEE International Conference on High Performance Distributed Computing (HPDC'11), Edinburgh, Scotland, Jul. 2002.

Lilley, J. et al. "A Unified header Compression framework for low-bandwidth links" In. Proc. of the Sixth Annual ACM-IEEE International Conference on Mobile Computing and Networking, pp. 131-142, Aug. 2000.

Y. Matias et al :"The effect of Flexible Parsing for Dynamic Dictionary Based Data Compression".In Proc. of the International Conference on Data Compression (DCC), Snowbird, Utah. pp. 238-246, Mar. 1999.

Y. Matias et al,"On the optomality of parsing in dynamic dictionary based compression". In Proc. of the Tenth Annual ACM-SIAM Symposium on Discrete Algorithms (SODA), pp. 943-944, Jan. 1999.

R. Pereira, "IP Payload compression using DEFLATE", IETF, RFC 2394, Dec. 1998. http://www.ietf.org/rfc/rfc2394.txt.

D. Rand., "PPP Predictor compression Protocol", IETF, RFC 1978, Aug. 1996. http://www.ietf.org/rfc/rfc1978.txt.

A. Shacham et al. "IP Payload compression Protocol (IPComp)", IETF, RFC 2393, Dec. 1998. http://www.ietf.org/rfc/rfc2393.txt.

R. Friend et al. "IP Payload compression Using LZS," IETF, RFC 2395, Dec. 1998. http://www.ietf.org/rfc/rfc2395.txt.

J. Postel et al, "File Transfer Protocol ",IETF, RFC 959, 1985. http://www.ietf.org/rfc/rfc959.txt.

J. Woods; "PPP Deflate Protocol", IETF, RFC 1979 1996. http://www.ietf.org/rfc/rfc1979.txt.

J. Postel et al, "User Datagram Protocol" ,IETF, RFC 768 1980. http://www.ietf.org/rfc/rfc768.txt.

Information Science Institute , "Transmission Control Protocol", IETF, RFC 793 1981. http://www.ietf.org/rfc/rfc793.txt.

K. Sollins, "The TFTP Protocol (rev. 2)",IETF, RFC 1350, 1992. http://www.ietf.org/rfc/rfc1350.txt.

Engan, "Casner and Bormann; IP Payload Compression Over PPP",IETF, RFC 2509, 1999. http://www.ietf.org/rfc/rfc2509.txt.

N. Spring et al. "A protocol independent technique for eliminating redundant network traffic". In Proc. of the International ACM-SIGCOMM Conference on Applications, Technologies, Architectures, and Protocols of Computer Communication, Stockholm, Sweden, Aug. 2000.

T. Welch, "A technique for high performance data compression", IEEE Computer, 17 (6): 8-19, Jun. 1984.

C. Westphal. "A user-based frequency-dependent IP header compression architecture", In Proc. of the International IEEE- Globecom Symposium on Ad Hoc Wireless Networks (SAWN), Taipei, Taiwan-,Nov. 2002.

J. Ziv et al;"A universal algorithm for sequential data compression", In Proc. of the International Conference IEEE Transactions of Information Theory, 23 (3): 337-343, 1977.

J. Ziv et al; "Compression of individual sequences via variable-rate coding", In Proc. of the International Conference IEEE Transactions on Information Theory 24(5):530-536, 1978.

Divx.: http://www.divx.com/.

Ethernet IEEE 802.3 http://www.ieee802.org/3/.

A Symmetrical Digital Subscriber line http:/www.dslforum.org; http:/www.dslforum.org/learndsl.shtml.

Asynchronous Transfer Mode http:/atmforum.com; http:/www.mfaforum.org/tech/atm_specs.shtml.

Frame Relay Forum;http:/www.mfaforurn.org and http:/www.mfaforum.org/tech/fr_ia.shtml.

General Packet Radio Service http://www.gsmworld.com/technology/gprs/; http://www.gsmworld.com/technology/gprs/class.shtml; http://www.gsmworld.com/technology/gprs/grx_prov.shtml http://www.gsmworld.com/technology/gprs/guidelines.shtml.

IPSec Working Group- http://www.ietf.org/html.charters/OLD/ipsec-charter.html.

Planet-lab-http://www.planet-lab.org/.

Virtual Private Network- http://www.vpnc.org/.

Yossi Matias et al.—Flexible- Parsing- Project -http://www.dcs.warwick.ac.uk/~nasir/work/fp/.

* cited by examiner

For encoding "target packet 1100"
The "respective group" includes"
A) Packets 800-1080
B) Packets 1098-1099
C) Optionally, packet 1100

"Explicit delta" Is Optional

For encoding "target packet 1100"
The "respective group" includes"
A) Packets 800-1080
B) Optionally, packet 1100

```
Algorithm 5.1: BDDC-LZW(void)

client ← create_new_tx_client(hostname)
d_bddc ← create new BDDC dictionary
encoded_packet_i ← 0
last_packet_in_dict ← 0
for i ← 1 to delay
    add_dummy_to_dict_Q
while true
    wait for a new uncompressed packet
    encoded_packet_i ← encoded_packet_i + 1
    p_packet ← create_packet_object(encoded_packet_i)
    d_bddc.compress_buffer(p_packet)
    if uncompr_len ≤ compr_len
        chosen_method ← UNCOMPRESSED
        compr_len ← uncompr_len
    client.tx_compressed_packet(chosen_method, compr_len)
    add_packet_to_dict_Q(p_packet)
    if queue_size > 0
        element ← remove_element_from_dict_Q
        if element.type == PACKET
            pour_pairs_from_packet_to_dict(p_packet, &d_bddc)
            last_packet_in_dict ← last_packet_in_dict + 1
```

FIG. 28B

Figure 30: *A multi purpose FIFO queue* -The queue contains queue element structures which may have different types.

```
Algorithm 6.2: BDC-LZW-MIN(word)

client ← create_new_tx_client(hostname)
a_bddc ← create new BDDC dictionary
encoded_packet_i ← 0
last_packet_in_dict ← 0
for i ← 1 to delay
    add_dummy_to_dict_Q
while true
    wait for new uncompressed packet
    encoded_packet_i ← encoded_packet_i + 1
    p_packet ← create_packet_object(encoded_packet_i)
    d_bddc_compress_buffer(p_packet)
    p_d_stateless ← create new stateless dictionary buffer
    p_d_stateless ← compress_buffer
    delete p_d_stateless
    chosen_method ← STATELESS
    compr_len ← 0
    if stateless_cmpr_length ≤ bddc_cmpr_length
        chosen_method ← STATELESS
        compr_len ← stateless_cmpr_length
    else
        chosen_method ← BDDC
        compr_len ← bddc_cmpr_length
    if uncompr_len ≤ compr_len
        chosen_method ← UNCOMPRESSED
        compr_len ← byte_read
    client.tx_compressed_packet(chosen_method, compr_len)
    add_packet_to_dict_Q(p_packet)
    if queue_size > U
        element ← remove_element_from_dict_Q
        if element.Type == PACKET
            pair_pairs_from_packet_to_dict(p_packet, a_bddc)
            last_packet_in_dict ← last_packet_in_dict + 1
```

FIG. 30B

Figure 31: *Packet class* - The packet contains a queue of phrases to be inserted to the dictionary during encoding.

Figure 32: *Encoder to Dictionary queue* -Each time that encoding of a packet is finished, a packet structure is added to this queue, and a packet structure (perhaps dummy) is removed from the queue, and its elements are added into the dictionary.

Figure 33: *The dictionaries classes hierarchy* -The stateless dictionary, streaming dictionary and BDD dictionary are implemented in c++. The BDDC dictionary derives from the stateless dictionary.

*SMS chat from a PC to a mobile phone* -SMS messages are sent from Instant Messenger PC clients to mobile phones by using TCP at first, then SS7 links, and finally to the mobile phone users. The bottleneck is the low speed SS7 links.

METHOD, APPARATUS AND COMPUTER-READABLE CODE FOR DATA COMPRESSION OF NETWORK PACKETS

CROSS-REFERENCE TO RELATED APPLICATIONS

This patent application is a Continuation of U.S. patent application Ser. No. 11/403,803, filed Apr. 14, 2006, pending, which claims benefit of U.S. Provisional Application No. 60/671,074, filed Apr. 14, 2005 by the present inventors.

FIELD OF THE INVENTION

The present invention relates to methods, apparatus and computer readable code for packet compression.

BACKGROUND

One of the things used commonly in every day life, and in particular in computerized systems is communication. The need for communication is obvious. People throughout the world need to share information among them, talk through the phone, see movies through the internet, send SMS (short message service) messages etc. There is a growing demand for communication. All over the world more and more people are using cellular phones. More and more people are using cable modems and ADSL, people nowadays download video movies to their cellular phones, and also perform video conferences via cellular phones.

An important resource in communications is the bandwidth. If bandwidth was unlimited, issues like QoS (quality of service) were not relevant. However, since this is not the case, bandwidth is and will be an important issue. Common applications such as audio streaming and video streaming consume today major portions of the bandwidth. More and more people download movies in DivX format (MPEG-4).

Bandwidth is an important resource in computer networks. The bandwidth can be considered as an important factor in networks performance. There are a few common ways to improve the performance of a network: bandwidth management which allows better utilization of existing network capacity by aligning network with organizations priorities; caching which increases the overall capacity of the network. In particular, caching of web traffic helps to reduce response time for access to web content; Finally, by using data compression, we can identify different protocol segments in a packet and reduce header information any payload information significantly.

We consider data compression in packet networks, in which data is transmitted by partitioning it into packets. Packet compression allows better bandwidth utilization of a communication line resulting in much smaller amounts of packet drops, more simultaneous sessions, and a smooth and fast behavior of applications (see, e.g., [34]).

Packet compression can be obtained by a combination of header compression [16] and payload compression, which may be complementary methods. Many dictionary compression algorithms were developed following the seminal papers of Lempel and Ziv (see, [33, 36, 37]).

In dictionary compression, an input sequence encoding is based on a dictionary that is constructed dynamically according to the given text. The compression is done in a streaming fashion, enabling to leverage on redundancy in the input sequence.

In many packet networks, including ATM [2], Frame Relay [5], Wireless, and others, packets are sent via different routes, and may arrive reordered, due to different network characteristics, or due to retransmissions in case of dropped packets. Since streaming compression assumes that the compressed sequence arrives at the decoder in the order in which it was sent by the encoder, the decoder must hold packets in a buffer until all preceding packets arrive. This causes decoding latency, which may be unacceptable in some applications.

To alleviate decoding latency, standard stateless packet compression algorithms are based on a packet-by-packet compression. For each packet, its payload is compressed using a dictionary compression algorithm, independently to other packets. While the decoding latency is addressed properly, this may often result in poor compression quality, since the inherent redundancy within a packet is significantly smaller than in the entire stream.

There is an ongoing need for methods, apparatus and computer-readable code provide improved compression quality and/or reduced or eliminated coding latency.

The following documents are believed to be the represent the state of the art:

1) U.S. Pat. No. 6,388,584 of Dorward and Quinlan;
2) S. Dorward and S. Quinlan. Robust data compression of network packets.

Bell Labs, Lucent Technologies, July 2000. Unpublished manuscript.

SUMMARY

Some or all of the aforementioned needs, and other needs, are satisfied by several aspects of the present invention.

It is now disclosed for the first time a method of packet compression comprising: (a) transmitting a plurality of packets from a sending location to a receiving location; b) for each packet of at least a sub-plurality of said packets, determining a respective at least one dictionary from a respective group of packets, each said respective group of packets including a respective first set of historical packets and excluding a respective second set of historical packets that includes at least one historical packet transmitted after a latest packet of said respective first set; c) for each packet of said sub-plurality, generating a respective compressed packet using a respective said at least one dictionary, wherein: i) said respective group of a later said compressed packet has a later latest historical packet than said respective group of an earlier said compressed packet; and ii) for each said compressed packet, said generating is effected without receiving confirmation of receipt at said receiving location of at least one historical packet of said respective group.

According to some embodiments, confirmation is indeed received for some but not all historical packets of a respective group.

According to some embodiments, for each packet of said sub-plurality, there is a sequence gap among historical packets of said respective group.

According to some embodiments, for each packet of said sub-plurality, there is a sequence gap between said each packet of said sub-plurality and a latest historical packet of said respective group.

According to some embodiments, for each packet of said sub-plurality, a respective said generating of said each packet of said sub-plurality is carried out before transmission of all historical packets of said respective group.

According to some embodiments, for each packet of said sub-plurality, a respective said generating of said each packet of said sub-plurality is carried out before transmission of a majority of historical packets of said respective group.

According to some embodiments, for each packet of said sub-plurality, a respective said generating of said each packet of said sub-plurality is carried out after transmission of a majority of historical packets of said respective group.

According to some embodiments, at least one said generating of a said compressed packet includes effecting at least one of a Lempel-Ziv compression, a deflate compression, a Huffman compression, a predictor compression (Cisco), and an arithmetic coding compression These are non-limiting examples, and embodiments using other compression techniques are contemplated.

According to some embodiments, each said compressed packet is generated by effecting a lossless compression using said respective dictionary.

According to some embodiments, each said compressed packet is generated by effecting a slightly lossy compression using said respective dictionary.

According to some embodiments, each said compressed packet is generated by effecting a lossy compression using said respective dictionary.

According to some embodiments, at least some packets of said sub-plurality are selected from the group consisting of voice packets and text chat packets.

According to some embodiments, at least some packets of said sub-plurality are selected from the group consisting of video packets and interne browsing packets. According to some embodiments, for each packet of said sub-plurality, said respective group includes said each packet of said sub-plurality.

According to some embodiments, for at least one packet of said sub-plurality, said generating of said respective compressed packet is carried out such that a compression ratio of said respective compressed packet relative is at least as good as a compression ratio attainable by effecting a stateless compression According to some embodiments, for each packet of said sub-plurality, said deriving of said respective at least one dictionary includes determining a respective unionized dictionary from a union of a respective first phrase set and a respective second phrase set, wherein: i) said respective first phrase set includes phrases of packets of historical packets of said respective group of packets; and ii) said second phrase set includes phrases of said each packet of said sub-plurality.

According to some embodiments, for each packet of said sub-plurality, said deriving of said respective unionized dictionary includes: i) effecting a respective rollback operation on a respective previous unionized dictionary associated with a packet before said each packet to recover a respective previous history dictionary associated with said packet before said each packet; ii) deriving said respective unionized dictionary from at least phrases of said respective previous history dictionary and phrases of one or more packets including said each packet of said sub-plurality.

According to some embodiments, for each packet of said sub-plurality, a ratio between a number of historical packets of said respective group and a number of bits of said each packet is at least 0.2. In some embodiments, this ratio may be at least 0.5, at least 1, at least 2, at least 5, at least 10, or at least 100.

According to some embodiments, for each packet of said sub-plurality, a number of historical packets of said respective group may be at least 100, at least 100, at least 500 and/or at least 1000.

It is now disclosed for the first time a method of packet compression comprising: (a) transmitting a plurality of packets from a sending location to a receiving location; b) for each packet of at least a sub-plurality of said packets, determining a respective plurality of dictionaries from a respective group of packets, each said respective group of packets including a respective first set of historical packets and excluding a respective second set of historical packets that includes at least one packet transmitted after a latest packet of said respective first set; and c) for each packet of said sub-plurality, effecting a respective plurality of compressions of said each packet of said sub-plurality to generate a respective compressed packet, wherein said respective group of a later said compressed packet has a later latest historical packet than said respective group of an earlier said compressed packet.

It is now disclosed for the first time a method of packet compression comprising: (a) a) determining (for example, deriving and/or establishing and/or detecting) a packet order (for example, a transmission order and/or a designated and/or future and/or predicted transmission order) of said packets; b) for each packet of at least a sub-plurality of said packets, determining a respective plurality of dictionaries from a respective group of packets, each said respective group of packets including a respective first set of historical packets and excluding a respective second set of historical packets that includes at least one packet transmitted after a latest packet of said respective first set; and c) for each packet of said sub-plurality, effecting a respective plurality of compressions of said each packet of said sub-plurality to generate a respective compressed packet, wherein said respective group of a later said compressed packet has a later latest historical packet than said respective group of an earlier said compressed packet.

According to some embodiments, at least one respective effecting of a said respective plurality of compressions is carried out, at least in part, in parallel.

It is now disclosed for the first time a method of packet compression comprising: a) transmitting a plurality of packets from a sending location to a receiving location b) for each packet of at least a sub-plurality of said packets, determining a respective at least one dictionary from a respective group of packets, each said respective group of packets including a respective first set of historical packets and excluding a respective second set of historical packets that includes at least one packet transmitted after a latest packet of said respective first set c) for each packet of said sub-plurality, generating a respective compressed packet using a respective said at least one dictionary; and d) for each packet of said sub-plurality, generating a respective marker using a respective said marker having a respective packet specification density that exceeds one packet per bit, wherein said respective group of a later said compressed packet has a later latest historical packet than said respective group of an earlier said compressed packet.

According to some embodiments, for at least one said respective marker, said respective packet density exceeds a value that may be at least 1.5 packets/bit, at least 1.75 packets/bit, at least 2 packets/bit, at least 5 packets/bit or at least 10 packets/bit.

It is now disclosed for the first time a method of packet compression comprising: a) determine (for example, deriving and/or establishing and/or detecting) a packet order (for example, a transmission order and/or a designated and/or future and/or predicted transmission order) of said packets; b) for each packet of at least a sub-plurality of said packets, determining a respective at least one dictionary from a respective group of packets, each said respective group of packets including a respective first set of historical packets and excluding a respective second set of historical packets that includes at least one packet transmitted after a latest packet of said respective first set; c) for each packet of said sub-plurality, generating a respective compressed packet using a respective said at least one dictionary; and d) for each packet of said sub-plurality, generating a respective marker using a respective said marker having a respective packet specification density that exceeds one packet per bit, wherein said respective group of a later said compressed packet has a later latest historical packet than said respective group of an earlier said compressed packet.

It is now disclosed for the first time a method of packet compression comprising: (a) transmitting a plurality of packets from a sending location to a receiving location; b) for each packet of at least a sub-plurality of said packets, determining a respective at least one dictionary from a respective group of packets, each said respective group of packets including a respective first set of historical packets and excluding a respective second set of historical packets that includes at least one packet transmitted after a latest packet of said respective first set; c) for each packet of said sub-plurality, generating a respective compressed packet using a respective said at least one dictionary; and d) for each packet of said sub-plurality, generating a respective marker using a respective said marker which specifies a range of packets associated with said respective group without specifying every packet in said range, wherein said respective group of a later said compressed packet has a later latest historical packet than said respective group of an earlier said compressed packet.

It is now disclosed for the first time a method of packet decompression (i.e. generating an uncompressed packet, or a less compressed packet, from a compressed packet) comprising: a) determining (for example, deriving and/or establishing and/or detecting) a packet order (for example, a transmission order and/or a designated and/or future and/or predicted transmission order) of said packets; b) for each packet of at least a sub-plurality of said packets, determining a respective at least one dictionary from a respective group of packets, each said respective group of packets including a respective first set of historical packets and excluding a respective second set of historical packets that includes at least one packet transmitted after a latest packet of said respective first set; c) for each packet of said sub-plurality, generating a respective compressed packet using a respective said at least one dictionary; and d) for each packet of said sub-plurality, generating a respective marker using a respective said marker which specifies a range of packets associated with said respective group without specifying every packet in said range, wherein said respective group of a later said compressed packet has a later latest historical packet than said respective group of an earlier said compressed packet.

It is now disclosed for the first time a method of packet compression comprising: a) determining (for example, deriving and/or establishing and/or detecting) a packet order (for example, a transmission order and/or a designated and/or future and/or predicted transmission order) of said packets; b) for each packet of at least a sub-plurality of said packets, determining a respective at least one dictionary from a respective group of packets, each said respective group of packets including a respective first set of historical packets and excluding a respective second set of historical packets that includes at least one packet transmitted after a latest packet of said respective first set; c) for each packet of said sub-plurality, generating a respective compressed packet using a respective said at least one dictionary; and d) for each packet of said sub-plurality, generating a respective marker using a respective said marker having a respective packet specification density that exceeds one packet per bit, wherein said respective group of a later said compressed packet has a later latest historical packet than said respective group of an earlier said compressed packet.

It is now disclosed for the first time a method of packet compression comprising: a) transmitting a plurality of packets from a sending location to a receiving location; b) for each packet of at least a sub-plurality of said packets, determining a respective at least one dictionary from a respective group of packets, each said respective group of packets including a respective first set of historical packets and excluding a respective second set of historical packets that includes at least one historical packet transmitted after a latest packet of said respective first set; c) for each packet of said sub-plurality, generating a respective compressed packet using a respective said at least one dictionary, wherein: i) for each packet of said sub-plurality, said respective group includes said each packet of said sub-plurality, and ii) said respective group of a later said compressed packet has a later latest historical packet than said respective group of an earlier said compressed packet It is now disclosed for the first time a method of packet compression comprising: a) transmitting a plurality of packets from a sending location to a receiving location; b) for each packet of at least a sub-plurality of said packets, determining a respective at least one dictionary from a respective group of packets, each said respective group of packets including a respective first set of historical packets and excluding a respective second set of historical packets that includes at least one packet transmitted after a latest packet of said respective first set; c) for each packet of said sub-plurality, generating a respective compressed packet using a respective said at least one dictionary wherein: i) a ratio between a number of historical packets of said respective group plurality and a number of bits of said each packet is at least 0.2 and/or at least 0.5 and/or at least 1 and/or at least 2 and/or at least 5 and/or at least 10; ii) said respective group of a later said compressed packet has a later latest historical packet than said respective group of an earlier said compressed packet. It is now disclosed for the first time a method of packet compression comprising a) transmitting a plurality of packets from a sending location to a receiving location; b) establishing a delay parameter delta; c) for each packet of at least a sub-plurality of said packets, determining a respective at least one dictionary from a respective group of packets excluding a respective last delta packets that precede said each packet; d) for each packet of said at least a sub-plurality of said packets, compressing said each packet using said respective dictionary; and e) transmitting each said compressed packet.

In some embodiments, the value of delta (i.e. the delay parameter) is maintained constant for every packet of the sub-plurality and/or for a given period of time. Alternatively, the value of delay may be adjusted in time and/or be adjusted for difference packets, for example, in accordance with one or more of i) a directive to change a value of said delay parameter (for example, received from a receiving location) and a ii) an indication of at least one of a probability of packet drops and a decoding failure rate.

It is now disclosed for the first time a method of receiving and decoding packets, the method comprising: a) at a receiving location, receiving a plurality of compressed packets transmitted from a sending location, said plurality of compressed packets associated with a transmission order; b) for at least some said received packets, not sending an acknowledgement to said sending location; c) for each packet of at least a sub-plurality of said packets determining a respective group of packets, each said respective group of packets including a respective at least one historical unacknowledged packet, said respective group including a respective first set of historical packets and excluding a respective second set of historical packets that includes at least one packet transmitted after a latest packet of said respective first set; d) for each packet of said at least a sub-plurality of packets, determining a respective at least one dictionary from a respective at least a sub-set of said respective group of packets, and e) using said respective at least one dictionary, making a respective at least one attempt to decode each packet of said sub-plurality, wherein said respective group of a later said compressed packet has a later latest historical packet than said respective group of an earlier said compressed packet According to some embodiments, for each packet of said at least a sub-plurality of packets, each respective said attempted decoding is performed only using said respective at least one dictionary determined from every packet of said respective group. According to some embodiments, for each packet of said at least a sub-plurality of packets, said respective at least one dictionary includes a respective dictionary determined from only a sub-set of said respective group of packets, and at least one respective attempt uses said respective dictionary determined from only a sub-set of said respective group of packets.

It is now disclosed for the first time a method of receiving and decoding packets, the method comprising: a) at a receiving location, receiving a plurality of compressed packets transmitted from a sending location, said plurality of compressed packets associated with a transmission order; b) for each packet of at least a sub-plurality of said packets determining a respective group of packets, each said respective group of packets including a respective at least one historical unacknowledged packet, said respective group including a respective first set of historical packets and excluding a respective second set of historical packets that includes at least one packet transmitted after a latest packet of said respective first set; c) for each packet of said at least a sub-plurality of packets, determining a respective at least one dictionary from a respective at least a sub-set of said respective group of packets, and d) using said respective at least one dictionary, making a respective at least one attempt to decode each packet of said sub-plurality, wherein said respective group of a later said compressed packet has a later latest historical packet than said respective group of an earlier said compressed packet, and wherein for said each packet of said sub-plurality, at least one of the following conditions is true: i) for each packet of at least a sub-plurality of said packets, said each packet is associated with and/or includes a marker having specification density that exceeds one packet per bit and/or a marker which specifies a range of packets without specifying every packet. ii) a ratio between a number of historical packets of said respective group plurality and a number of bits of said each packet is at least 0.2 and/or at least 0.5 and/or at least 1 and/or at least 2 and/or at least 5 and/or at least 10;

It is now disclosed for the first time a method of receiving and decoding packets, the method comprising: a) at a receiving location, receiving a plurality of compressed packets transmitted from a sending location, said plurality of compressed packets associated with a transmission order; b) for each said packet of at least a sub-plurality, determining a packet membership for a respective dictionary; c) using only some packets of said packet membership, deriving a respective dictionary; d) attempting to decode.

It is now disclosed for the first time a method of packet decoding, the method comprising: a) receiving a plurality of packets from a sending location to a receiving location; b) establishing a delay parameter delta; c) for each packet of at least a sub-plurality of said packets, determining a respective at least one dictionary from a respective group of packets excluding a respective last delta packets that precede said each packet; d) for each packet of said at least a sub-plurality of said packets, decoding said each packet using said respective dictionary.

It is now disclosed for the first time apparatus for transmitting compressed packets, said apparatus comprising: a) a packet transmitter operative to transmit packets to the receiving location; b) a data compressor operative to generate compressed packets, said data compressor operative to: i) determine, for each packet of at least a sub-plurality of said packets, a respective at least one dictionary from a respective group of packets, each said respective group of packets including a respective first set of historical packets and excluding a respective second set of historical packets that includes at least one packet transmitted after a latest packet of said respective first set; ii) generate, for each packet of said sub-plurality, a respective compressed packet using a respective said at least one dictionary, wherein: i) said respective group of a later said compressed packet has a later latest historical packet than said respective group of an earlier said compressed packet; and ii) for each said compressed packet, said data compressor is operative to generate each said respective compressive packet without receiving confirmation of receipt at said receiving location of at least one historical packet of said respective group.

According to some embodiments, said data processor is operative to generate said respective compressed packets such that for each packet of said sub-plurality, there is a sequence gap among historical packets of said respective group.

According to some embodiments, said data processor is operative to generate said respective compressed packets such that for each packet of said sub-plurality, there is a sequence gap between said each packet of said sub-plurality and a latest historical packet of said respective group.

According to some embodiments, said data processor is operative to generate said respective compressed packets such that for each packet of said sub-plurality, a respective said generating of said each packet of said sub-plurality is carried out before transmission of all historical packets of said respective group.

According to some embodiments, said data processor is operative to generate said respective compressed packets such that for each packet of said sub-plurality, a respective said generating of said each packet of said sub-plurality is carried out before transmission of a majority of historical packets of said respective group.

According to some embodiments, said data processor is operative to generate said respective compressed packets such that for each packet of said sub-plurality, a respective said generating of said each packet of said sub-plurality is carried out after transmission of a majority of historical packets of said respective group.

According to some embodiments, said data processor is operative to generate said respective compressed packets such that at least one said generating of a said compressed packet includes effecting at least one of a Lempel-Ziv compression, a deflate compression, a Huffman compression, a predictor compression (Cisco), and an arithmetic coding compression.

According to some embodiments, said data processor is operative to generate said respective compressed packets such that each said compressed packet is generated by effecting a lossless compression using said respective dictionary.

According to some embodiments, said data processor is operative to generate said respective compressed packets such that each said compressed packet is generated by effecting a slightly lossy compression using said respective dictionary.

According to some embodiments, said data processor is operative to generate said respective compressed packets such that each said compressed packet is generated by effecting a lossy compression using said respective dictionary.

According to some embodiments, said data processor is operative to compress at least one of voice packets and text chat packets.

According to some embodiments, said data processor is operative to compress at least one of video packets and internet browsing packets.

According to some embodiments, said data processor is operative to generate said respective compressed packets such that for each packet of said sub-plurality, said respective group includes said each packet of said sub-plurality.

According to some embodiments, said data processor is operative to generate said respective compressed packets such that a compression ratio of said respective compressed packet relative is at least as good as a compression ratio attainable by effecting a stateless compression According to some embodiments, said data processor is operative to generate said respective compressed packets such that for each packet of said sub-plurality, said deriving of said respective at least one dictionary includes determining a respective unionized dictionary from a union of a respective first phrase set and a respective second phrase set, wherein: i) said respective first phrase set includes phrases of packets of historical packets of said respective group of packets; and ii) said second phrase set includes phrases of said each packet of said sub-plurality.

According to some embodiments, said data processor is operative to generate said respective compressed packets such that for each packet of said sub-plurality, said deriving of said respective unionized dictionary includes: i) effecting a respective rollback operation on a respective previous unionized dictionary associated with a packet before said each packet to recover a respective previous history dictionary associated with said packet before said each packet; ii) deriving said respective unionized dictionary from at least phrases of said respective previous history dictionary and phrases of one or more packets including said each packet of said sub-plurality.

According to some embodiments, said data processor is operative to generate said respective compressed packets for each packet of said sub-plurality, a ratio between a number of historical packets of said respective group and a number of bits of said each packet is at least 0.2. In some embodiments, this ratio may be at least 0.5, at least 1, at least 2, at least 5, at least 10, or at least 100.

According to some embodiments, for each packet of said sub-plurality, a number of historical packets of said respective group may be at least 100, at least 100, at least 500 and/or at least 1000.

According to some embodiments, said data processor is operative to generate said respective compressed packets for each packet of said sub-plurality, a number of historical packets of said respective group is at least 100, at least 500 and/or at least 1000.

It is now disclosed for the first time apparatus for transmitting compressed packets, said apparatus comprising: a) a packet transmitter operative to transmit packets to the receiving location; b) a data compressor operative to generate compressed packets, said data compressor operative to: i) transmitting a plurality of packets from a sending location to a receiving location; ii) for each packet of at least a sub-plurality of said packets, determining a respective plurality of dictionaries from a respective group of packets, each said respective group of packets including a respective first set of historical packets and excluding a respective second set of historical packets that includes at least one packet transmitted after a latest packet of said respective first set; and iii) for each packet of said sub-plurality, effecting a respective plurality of compressions of said each packet of said sub-plurality to generate a respective compressed packet, wherein said respective group of a later said compressed packet has a later latest historical packet than said respective group of an earlier said compressed packet According to some embodiments, said data processor is operative to generate said respective compressed packets for each packet of said plurality such that at least one respective effecting of a said respective plurality of compressions is carried out, at least in part, in parallel.

It is now disclosed for the first time apparatus for transmitting compressed packets, said apparatus comprising: a) a packet transmitter operative to transmit packets to the receiving location; b) a data compressor operative to generate compressed packets, said data compressor operative to: a) transmit a plurality of packets from a sending location to a receiving location; b) for each packet of at least a sub-plurality of said packets, determine a respective at least one dictionary from a respective group of packets, each said respective group of packets including a respective first set of historical packets and excluding a respective second set of historical packets that includes at least one packet transmitted after a latest packet of said respective first set; c) for each packet of said sub-plurality, generate a respective compressed packet using a respective said at least one dictionary; and d) for each packet of said sub-plurality, generate a respective marker using a respective said marker having a respective packet specification density that exceeds one packet per bit, wherein said respective group of a later said compressed packet has a later latest historical packet than said respective group of an earlier said compressed packet.

According to some embodiments, said data processor is operative to generate said respective compressed packets for each packet of said plurality such that for at least one said respective marker, said respective packet density exceeds 1.5 packets/bit.

According to some embodiments, said data processor is operative to generate said respective compressed packets for each packet of said plurality such that for at least one said respective marker, said respective packet density exceeds 2 packets/bit.

It is now disclosed for the first time apparatus for receiving and decoding packets transmitted from a sending location, the apparatus comprising: a) a packet receiver operative to receive a plurality of compressed packets transmitted from the sending location, said plurality of compressed packets associated with a transmission order, said packet receiver further operative, for at least some said received packets, to not send an acknowledgement to said sending location; b) a data decoder operative to decode at least some said received packets, said data compressor operative to: i) for each packet of at least a sub-plurality of said packets determine a respective group of packets, each said respective group of packets including a respective at least one historical unacknowledged packet, said respective group including a respective first set of historical packets and excluding a respective second set of historical packets that includes at least one packet transmitted after a latest packet of said respective first set; ii) for each packet of said at least a sub-plurality of packets, determine a respective at least one dictionary from a respective at least a sub-set of said respective group of packets, and e) using said respective at least one dictionary, make a respective at least one attempt to decode each packet of said sub-plurality, wherein said respective group of a later said compressed packet has a later latest historical packet than said respective group of an earlier said compressed packet According to some embodiments, said data processor is operative to decode said at least some receive packets such that for each packet of said at least a sub-plurality of packets, each respective said attempted decoding is performed only using said respective at least one dictionary determined from every packet of said respective group.

According to some embodiments, said data processor is operative to decode said at least some receive packets such that for each packet of said at least a sub-plurality of packets, said respective at least one dictionary includes a respective dictionary determined from only a sub-set of said respective group of packets, and at least one respective attempt uses said respective dictionary determined from only a sub-set of said respective group of packets.

It is now disclosed for the first time a computer readable medium comprising program instructions, wherein when executed the program instructions are operable to a) receive a plurality of packets; b) determine a packet order of said packets; c) for each packet of at least a sub-plurality of said packets, determine a respective at least one dictionary from a respective group of packets, each said respective group of packets including a respective first set of historical packets and excluding a respective second set of historical packets that includes at least one historical packet transmitted after a latest packet of said respective first set; d) for each packet of said sub-plurality, generate a respective compressed packet using a respective said at least one dictionary, wherein: i) said respective group of a later said compressed packet has a later latest historical packet than said respective group of an earlier said compressed packet; and ii) for each said compressed packet, said generating is effected without receiving confirmation of receipt at said receiving location of at least one historical packet of said respective group.

It is now disclosed for the first time a computer readable medium comprising program instructions, wherein when executed the program instructions are operable to a) receive a plurality of packets; b) determine a packet order of said packets; c) for each packet of at least a sub-plurality of said packets, determine a respective at least one dictionary from a respective group of packets, each said respective group of packets including a respective first set of historical packets and excluding a respective second set of historical packets that includes at least one historical packet transmitted after a latest packet of said respective first set; d) for each packet of said sub-plurality, generate a respective compressed packet using a respective said at least one dictionary, wherein: i) for each packet of said sub-plurality, said respective group includes said each packet of said sub-plurality, and ii) said respective group of a later said compressed packet has a later latest historical packet than said respective group of an earlier said compressed packet It is now disclosed for the first time a computer readable medium comprising program instructions, wherein when executed the program instructions are operable to a) receive a plurality of packets; b) determine a packet order of said packets; c) for each packet of at least a sub-plurality of said packets, determining a respective at least one dictionary from a respective group of packets, each said respective group of packets including a respective first set of historical packets and excluding a respective second set of historical packets that includes at least one historical packet transmitted after a latest packet of said respective first set; d) for each packet of said sub-plurality, generating a respective compressed packet using a respective said at least one dictionary, wherein: i) for each packet of said sub-plurality, said respective group includes said each packet of said sub-plurality, and ii) said respective group of a later said compressed packet has a later latest historical packet than said respective group of an earlier said compressed packet It is now disclosed for the first time a computer readable medium comprising program instructions, wherein when executed the program instructions are operable to a) a) receive a plurality of packets; b) determine a packet order of said packets; b) for each packet of at least a sub-plurality of said packets, determine a respective plurality of dictionaries from a respective group of packets, each said respective group of packets including a respective first set of historical packets and excluding a respective second set of historical packets that includes at least one packet transmitted after a latest packet of said respective first set; and c) for each packet of said sub-plurality, effect a respective plurality of compressions of said each packet of said sub-plurality to generate a respective compressed packet, wherein said respective group of a later said compressed packet has a later latest historical packet than said respective group of an earlier said compressed packet.

A computer readable medium comprising program instructions, wherein when executed the program instructions are operable to: a) receive a plurality of packets; b) determine a packet order of said packets; c) for each packet of at least a sub-plurality of said packets, determining a respective at least one dictionary from a respective group of packets, each said respective group of packets including a respective first set of historical packets and excluding a respective second set of historical packets that includes at least one packet transmitted after a latest packet of said respective first set; d) for each packet of said sub-plurality, generating a respective compressed packet using a respective said at least one dictionary; and e) for each packet of said sub-plurality, generating a respective marker using a respective said marker having a respective packet specification density that exceeds one packet per bit, wherein said respective group of a later said compressed packet has a later latest historical packet than said respective group of an earlier said compressed packet. It is now disclosed for the first time a computer readable medium comprising program instructions, wherein when executed the program instructions are operable to a) receive a plurality of packets; b) determine a packet order of said packets; c) for each packet of at least a sub-plurality of said packets, determining a respective at least one dictionary from a respective group of packets, each said respective group of packets including a respective first set of historical packets and excluding a respective second set of historical packets that includes at least one packet transmitted after a latest packet of said respective first set; d) for each packet of said sub-plurality, generating a respective compressed packet using a respective said at least one dictionary; and e) for each packet of said sub-plurality, generating a respective marker using a respective said marker which specifies a range of packets associated with said respective group without specifying every packet in said range, wherein said respective group of a later said compressed packet has a later latest historical packet than said respective group of an earlier said compressed packet.

It is now disclosed for the first time a computer readable medium comprising program instructions, wherein when executed the program instructions are operable to a) receive a plurality of packets; b) determine a packet order of said packets; b) for each packet of at least a sub-plurality of said packets, determining a respective at least one dictionary from a respective group of packets, each said respective group of packets including a respective first set of historical packets and excluding a respective second set of historical packets that includes at least one packet transmitted after a latest packet of said respective first set; c) for each packet of said sub-plurality, generating a respective compressed packet using a respective said at least one dictionary, wherein: i) a ratio between a number of historical packets of said respective group plurality and a number of bits of said each packet is at least 0.2. ii) said respective group of a later said compressed packet has a later latest historical packet than said respective group of an earlier said compressed packet. It is now disclosed for the first time a computer readable medium comprising program instructions, wherein when executed the program instructions are operable to a) receive a plurality of packets; b) determine a packet order of said packets; c) establishing a delay parameter delta; d) for each packet of at least a sub-plurality of said packets, determining a respective at least one dictionary from a respective group of packets excluding a respective last delta packets that precede said each packet; e) for each packet of said at least a sub-plurality of said packets, compressing said each packet using said respective dictionary These and further embodiments will be apparent from the detailed description and examples that follow.

BRIEF DESCRIPTION OF THE FIGURES

FIG. 28B illustrates a BDDC-LZW procedure.
FIG. 30B illustrates a DDC-LZW-MIN procedure.

DETAILED DESCRIPTION

Figure 1A:
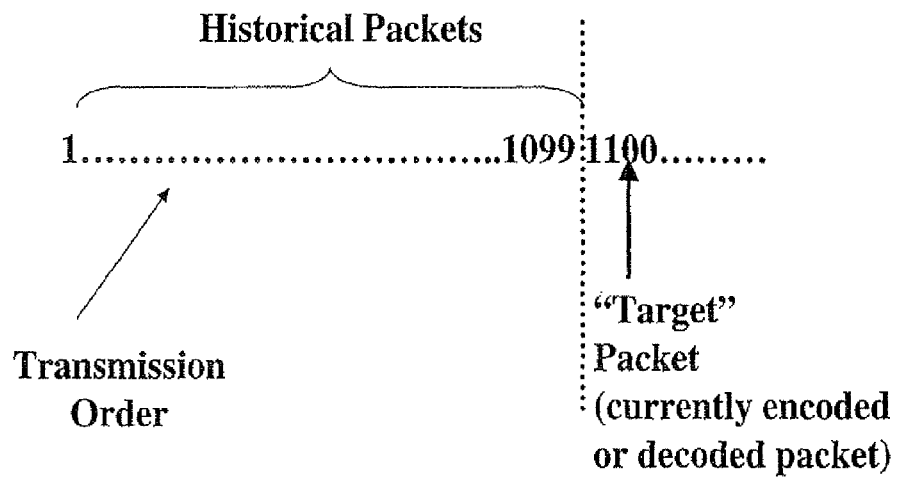
FIGS. 1A-1B illustrate an example of historical packets.

The present invention will now be described in terms of specific, example embodiments. It is to be understood that the invention is not limited to the example embodiments disclosed. It should also be understood that not every feature of the presently disclosed method, device and computer-readable code for encoding and/or decoding and/or transmitting and/or receiving units of data (for example, packets) is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Overview

The present inventors are disclosing methods, apparatus and compute-readable code for compression of data packets. Since data packets may be dropped or may arrive reordered, streaming compression algorithms result in a considerable decoding latency. On the other hand, standard stateless packet compression algorithms that compress each packet independently, give a relatively poor compression ratio, and a minimal decoding latency.

The present inventors are disclosing novel techniques for encoding and/or decoding units of data (for example, data packets, or any units of data other than data packets) where each packet is encoded in accordance with dictionary determined from a group of packets including historical packets. Typically, this "group" includes some historical packets but excludes other historical packets, as will be explained below. Although not a limitation of the present invention, it is noted that a judicious selection of historical packets for an encoding and/or compression dictionary may be useful to reduce decoding latency and/or provide a better compression for a given decoding latency or expected or average decoding latency.

Typically, packets compressed by the encoder are transmitted from a sending location to one or more receiving locations. Although the present invention does not exclude embodiments where one or more packets (or any other unit of data) are transmitted simultaneously, it is noted that typically individual packets (or groups of packets) are transmitted sequentially. Thus, a given plurality of packets (or other units of data) may be said to have a "transmission order" indicative of which packets are transmitted (or were transmitted, or to be transmitted) earlier, and which packets are to be transmitted later.

Although certain embodiments are explained in terms of actual packet transmission, certain embodiments of the present invention do not require actual packet transmission or receipt of transmitted packet, but rather relate to a technique for compressing and/or decoding packets in accordance with a determined transmission order.

In some embodiments, there is no explicit "determining" of a transmission order, and this order may be determined implicitly. In one non-limiting example, an embodiment receives packets in an order for which packets are to be transmitted in the future, and, the packets are encoded in accordance with an order in which the encoder receives the packets. Alternatively or additionally, packets may be explicitly marked with data indicative of a position in the transmission order (for example, a packet "serial number"). In exemplary embodiments, this "data indicative" is provided as some sort of marker, for example as a header.

This marker may be transmitted together with the packet "payload", for example as part of the packet. Although this marker may be part of the packet header (for example, appended to other data of the packet header), this is not to be construed as a limitation, and other implementations are within the scope of the present invention.

As mentioned earlier, the present invention relates to encoding (including compressing) and decoding of "units of data." in exemplary embodiments, the "units of data" are "packets" which include packet headers that provide routing data and/or data indicative of a transmission source and/or destination. Nevertheless, it is appreciated that any method, apparatus or computer readable code described in terms of encoding and/or compressing and/or decoding of packets are not limited to packets per se, and are equally applicable to any plurality of data units that are associatable with a "transmission order." Thus, throughout this patent application, although the convention of encoding and/or decoding and/or compressing and/or transmission of "packets" has been adopted, the presently disclosed techniques are equally applicable to any data units.

Certain embodiments of the present invention disclose generation of dictionaries (for a given "target packet") and/or encoding and/or compressing and/or decoding of individual packets or groups of packets in accordance with "historical packets." It is noted that a historical packet is any packet that is earlier in a transmission order and/or any packet that is transmitted earlier than a given target packet to be compressed and/or encoded and/or decoded. Thus, the term "historical packet" is a relative term, relative to the given target packet.

Figure 1B:
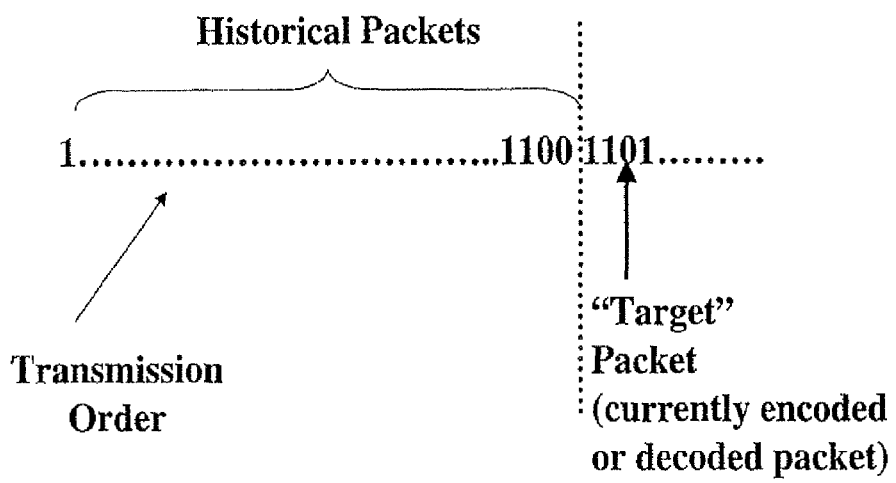

The concept of "historical" packets is illustrated graphically in FIGS. 1A-1B. According to FIG. 1A, when encoding or decoding packet number 1100 (i.e. packet 1100 is the "target packet"), packets that are earlier in the transmission order (i.e. packets 1-1099) are defined as "historical packets." According to FIG. 1B, when encoding or decoding packet number 1101 (i.e. packet 1101 is the "target packet"), packets that are earlier in the transmission order (i.e. packets 1-1100) are defined as "historical packets."

It is noted that although packets that are later in the transmission order are designated for later transmission (or transmitted later), they are not necessarily compressed and/or encoded and/or decoded earlier.

Thus, terms such as "earlier" "later" and "latest" refer to the packet transmission order, with earlier packets being transmitted earlier and/or designation for transmission prior to later packets.

A "later" compressed packet is thus transmitted and/or determined to have a later position in the transmission order than an "earlier" compressed packet.

Furthermore, for the case of packet decoders, it is noted that there are some situations where one given packet, say, packet X, is transmitted through a network and/or over a communications channel before a second given packet, say, packet Y. According to a first example, packet X is received before packet Y, and the order in which packets are received is the same as the order in which these packets are transmitted.

Alternatively, according to a second example, at a receiving location packet Y is received before packet X. It is noted that for the purposes of this patent application, in this second example, packet X is still defined as a "historical packet" relative to packet Y (i.e. an earlier or preceding packet), despite that fact tgat, in this second example, packet X is received after packet Y. This is due to the earlier position of packet X in a transmission order and/or due to packet X's earlier transmission time.

As stated above, the present inventors are now disclosing for the first time a technique wherein packets are encoded and/or compressed and/or decoding with a dictionary determined using a group of packets, including some historical packets but excluding other historical packets. As will be explained below, there may be a sequence gap among the historical packets of the group used to determine a dictionary (see FIG. 16D) and/or there may be a sequence gap between a latest packet of the historical packets of the group, and the "target" packet to be encoded and/or compressed and/or decoded.

The term "target" packet refers to a "currently" encoded and/or compressed and/or decoded packet, and does not imply any required special properties.

The presently disclosed methods, systems and computer readable code relate to compressing and/or encoding and/or decompressing of any type of packet, including but not limited to file transfer packets (for example, FTP packets), text message packets (for example SMS packets), voice packets, video packets, chat packets, and internet browsing.

Thus, the present invention relates to fast transfer of data stored in volatile memory as well as data stored in non-volatile or persistent memory (for example, files).

The present application relates both to systems where there are pre-defined sending and receiving locations (including the case where a packet is transmitted to a plurality of receiving locations), as well as systems where packets are "broadcast" to receiving locations which are not necessarily pre-defined. The present invention relates both to "reliable" or "connection" communication protocols (or networks) as well as connectionless communication protocols (or networks).

Thus, in some embodiments, the term "receiving location" is used. This is to be understood as either A) a unique receiving location or B) one of many receiving locations (for example, if packets are multi-cast).

Thus it is noted that in general, the teachings of the present invention apply to multiple decoders and/or multiple receiving locations.

Markers Specifying Packet History

One salient feature provided by exemplary embodiments of the present invention is the ability to specify a relatively large packet history (i.e. a large number of historical packets) using a relatively small header. Specifying packet history is useful for synchronizing of the sending side dictionary and the receiving side dictionary. If the amount of data used to specify packet history becomes too large, this may adversely impact the compression achievable using a given compression technique.

Thus, in some embodiments, the packet is associated with a marker and/or includes a marker, for example, a "header" or any other chunk of data sent with the packet. As used herein, a "packet specification density" of a given marker is the number of historical packets that may be specified in a marker of a given number of bits. Thus, in one non-limiting example, if a packet history of 600 packets is specified using a marker of 4 bits, the packet specification density is 150 packets/bit.

In some embodiment, the packet density is more than 1 packet/bit. This may be accomplished, for example, by specifying a range of packets associated with packet history, rather than specifying every single packet (i.e. specifying). Thus, as the range grows (and the number of historical packets grows), the number of bits required to specify the larger range grows at a slower rate (for example, as a logarithm of the number of packets). Thus, with larger packet ranges (and larger histories), it is possible to achieve a higher packet specification density.

Delayed Dictionary Compression

One novel technique currently disclosed by the present inventors is referred to as delayed-dictionary compression (DDC), for an improved compression-latency trade-off for packet networks. By allowing delay in the dictionary construction, the problems of packet drops and packet reordering may be handled, resulting in a compression quality which is often substantially better than standard stateless packet compression and has a smaller decoding latency than that of streaming compression. Several variants of the DDC technique, that may be suitable for different scenarios, are disclosed. Relevant apparatus, methods, and computer readable code are provided.

The present disclosure provides an extensive description of certain types of "delayed dictionary compression" (or decoding/decompression) techniques. The delayed dictionary techniques are only examples of the techniques of the present invention, and thus statements describing "delayed dictionary" encoding and/or decoding and/or compressing and/or decompressing are exemplary, and not intended to provide limitations to the present invention.

The DDC (and any technique for encoding and/or decoding and/or compressing packets disclosed herein) is a general framework that may apply to any dictionary algorithm. In some embodiments, the dictionary construction and the dictionary-based parsing of the input text are considered as separate processes, and a delay $\Delta$ in the dictionary construction. Nevertheless, there is no requirement of maintaining $\Delta$ constant (i.e. $\Delta$ may vary between packets), though such embodiments are contemplated.

In general, the term "delay" does not imply a requirement for a temporal delay or any other temporal constraint on the time of dictionary construction or packet compression. Thus, the dictionary used to compress a specific packet may be constructed at any time, and the present invention imposes no limitation. Rather, the term "delay" implies that the set of packets used to derive a dictionary for any given packet may include older packets and exclude "more recent" packets, where the concepts of "older" or "more recent" refer to a transmission order. Thus, when encoding a given packet, a dictionary may be constructed using packets that are earlier in the transmission order by delay $\Delta$.

Not wishing to be bound by theory, it is noted that later, when decoding a packet encoded using a DDC technique, the decoding is not required be carried out as a function of the $\Delta$ preceding packets. Thus, after a given compressed packets is transmitted across a communications channel to the decoder at the receiving end of the channel, it is possible to decode or decompress the given packet without waiting for each of the $\Delta$ preceding packets (i.e. preceding in the transmission order) This may be useful for eliminating or diminishing the problems of out-of-order packets and packet drops compared to streaming compression, still with a good traffic compression ratio.

Figure 2:
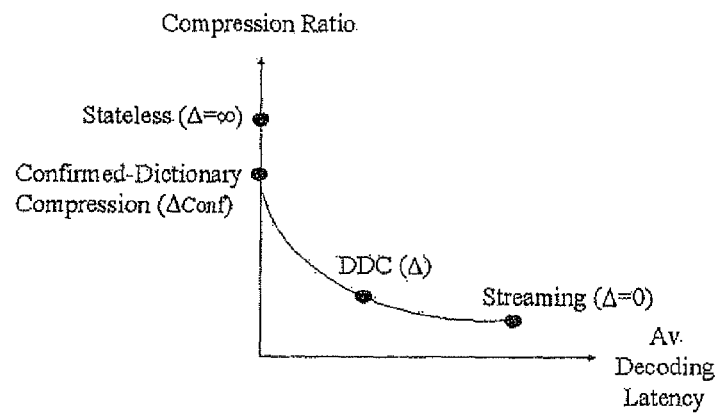
FIG. 2 illustrates a trade-off between the compression ratio and the decoding latency.

Tradeoff Between Compression Ratio and Decoding Latency: A Theoretical Discussion A number of variations of are presented. In order to better understand the presently disclosed technique, a discussion of the tradeoff between the compression ratio and the decoding latency is presented in FIG. 2. It is noted that streaming compression has the best compression ratio and the worst decoding latency, while stateless compression has the worst compression ration and zero decoding latency. DDC provides the option to obtain decoding latencies and compression ratios according to different positions on the curve. Furthermore, it is noted that the presently disclosed confirmed-dictionary compression algorithm ensures a zero decoding latency, and a compression ratio better than the one of stateless compression.

Thus, the DDC may provide benefits associated with both stateless compression and streaming compression. With the right choices of the dictionary delay parameter, one may obtain decoding latency which is equal to and/or close to that of stateless compression, and with a compression ratio which is close to that of streaming compression.

The present inventors have conducted various experiments to establish the potential improvement for packet compression techniques, using many data files including the Calgary corpus and the Canterbury corpus. Experimental results of the new delayed-dictionary compression show that its main advantage is in low to medium speed links. The experiments were conducted over the geographical scattered nodes of the Planet-Lab networking testbed. A dictionary based compression framework for packets and buffers was created and used in the implementation of all the packet compression algorithms mentioned in this work. All the experiments were implemented with this framework.

For example, according to experiments conducted by the present inventors, for a concatenation of the Calgary corpus files, fragmented into packets with a payload of 125 bytes, in streaming the compression ratio is 0.52 with an average decoding latency of 62 packets, while in DDC-min with a large dictionary delay of 200 packets we obtain a compression ratio of 0.64 and only an average decoding latency of 14.3 packets. It is noted that the traffic compression ratio is defined as the size of the compressed traffic divided by the size of the uncompressed traffic.

Packet Networks

Although not a limitation, typically, the techniques disclosed herein are implemented in a packet network. A network is a series of points or nodes interconnected by communication paths. Networks can interconnect with other networks and can contain sub-networks. Each packet network transfers data by using packets. Each packet consists of header and payload. The header may contain parameters such as serial number, packet length, checksum, etc. The payload of the packet holds the transferred data.

A communication path may be a concatenation of physical lines or of wireless media. Each communication path has its own characteristics such as reliability in terms of error rate, line speed and more.

Since many networks are unreliable (e.g., Frame Relay has a lot of packet drops), many packets are dropped or reordered. The internet is an example for such a network—many IP packets are dropped or reordered. Other packet networks may be ATM, Ethernet [4], GPRS [6], etc There are a few common ways to improve the performance of a network: The most trivial way is to buy more bandwidth. This solution is a good solution, since it definitely increases the network capacity. However, this solution may require major modifications in the hardware, and is very expensive. Another solution is bandwidth management, which allows better utilization of existing network capacity by aligning the network with organizations priorities. Typically, this represents prioritizing mission critical or delay sensitive traffic over non-critical traffic. Bandwidth management prioritizes the available capacity of a network according to organization rules.

Another solution is caching, which may increase the overall capacity of the network. In particular, caching of web traffic helps to reduce the response time of access to web content. Web caching brings static content closer to end user, therefore delivering better turn-around time for content access and decreased traffic usage. Non-web traffic can be cached as well.

The present inventors are disclosing methods, systems and computer-readable code for data compression. It is noted that the techniques provided by the present invention may be combined with any other known technique for improving network performance.

According to some embodiments, when working with packet networks, we can identify different protocol segments in a packet and reduce header information and payload information significantly. Compressed traffic may increase the total throughput (provides the compression time is short enough).

Framework

We examine the case of end-to-end compression over a communication path. We assume the existence of network processors, one on each side of the communication path. The original traffic that is to be transmitted to the communication path is now transmitted to the network processor and from there to the physical path. The network processors are compression enabled. This framework is depicted in FIG. 3A.

Figure 3A:
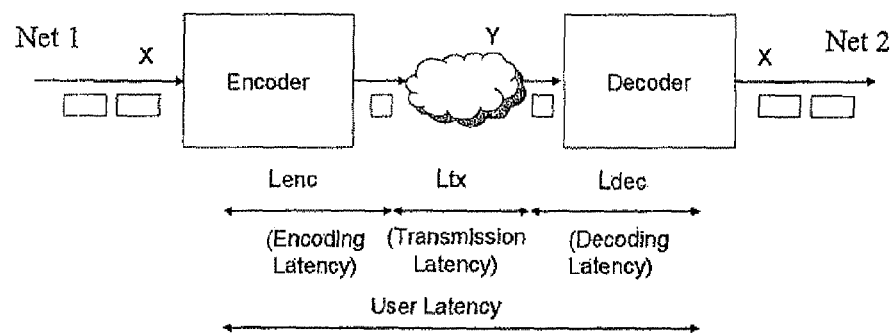
FIG. 3A provides a diagram of an exemplary end-to-end framework according to exemplary embodiments of the present invention.

Thus, FIG. 3A illustrates an end-to-end framework according to exemplary embodiments of the present invention. Two compression enabled network processors are used, one on each side of the communication path. The total user latency is the total of the encoding latency, transmission latency, and decoding latency. X is the original uncompressed traffic and Y is the compressed traffic. We focus on the decoding latency $L_{dec}$ and the traffic compression ratio.

By compressing the traffic, a lower utilization (the line utilization is defined as the ratio between the current transferred traffic and the line capacity for a given time period) of the communication line is obtained; equivalently this results with effectively larger line bandwidth. This results in a smaller number of packet drops, resulting in a smaller amount of packet retransmissions. At this level we have packets carrying pieces of the original data which may be a stream of data, a file, or any other application information.

Figure 3B:
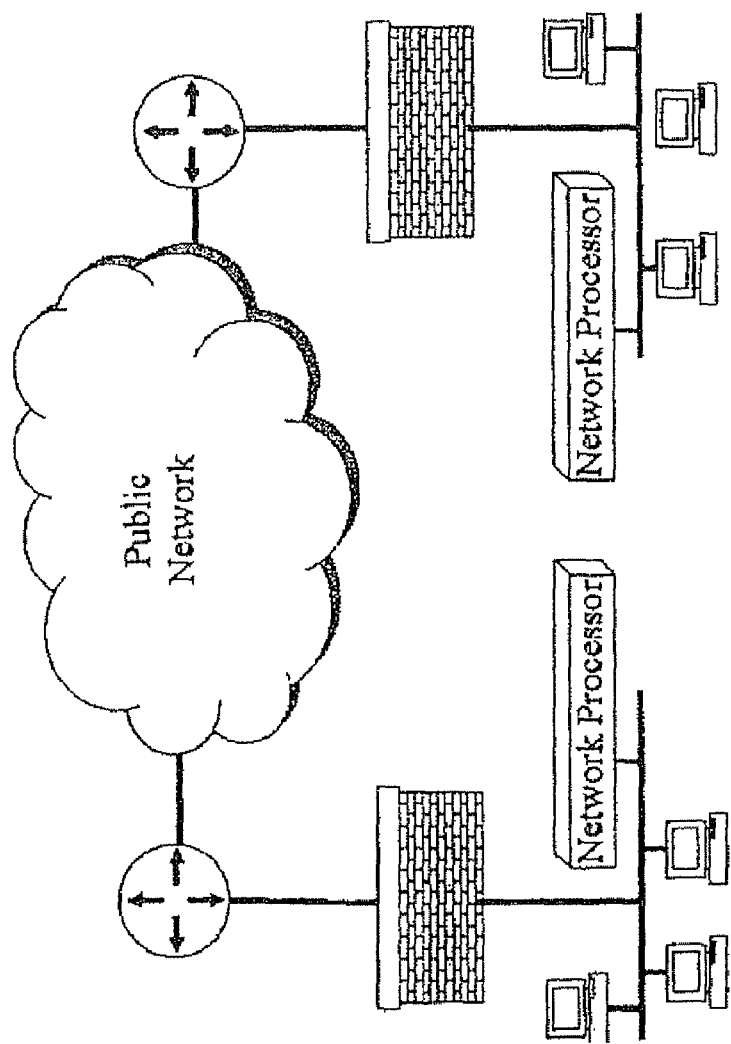
FIG. 3B provides a diagram of an exemplary LAN-to-LAN framework.

The following examples are exemplary network configurations where this model is applicable, though other configurations are certainly within the scope of the present invention. The first example is the LAN-to-LAN configuration, as depicted in FIG. 3B. An on-path configuration is depicted in the upper part of the figure. In this network configuration all traffic must go through the two upper network processors, that communicate with each other through the public network. The on-path traffic of the upper-left LAN goes through the upper-left network processor, where it is compressed. From there the compressed traffic moves on into the public network, then it arrives to the upper-right network processor, where it is de-compressed, and finally it arrives to the computers in the upper-right LAN. A similar configuration is the WAN-to-WAN configuration. In the WAN-to-WAN configuration the network processor is "behind the router", i.e. It is not part of the LAN. In the lower part of the figure we see an on-LAN configuration. The traffic in this part of the figure goes from the lower-left LAN to the lower-right LAN through the two lower network processors. The network processors are configured as the default gateway of each LAN, i.e. all the traffic that goes from the specific LAN to all other networks is routed via the network processor.

Figure 4:
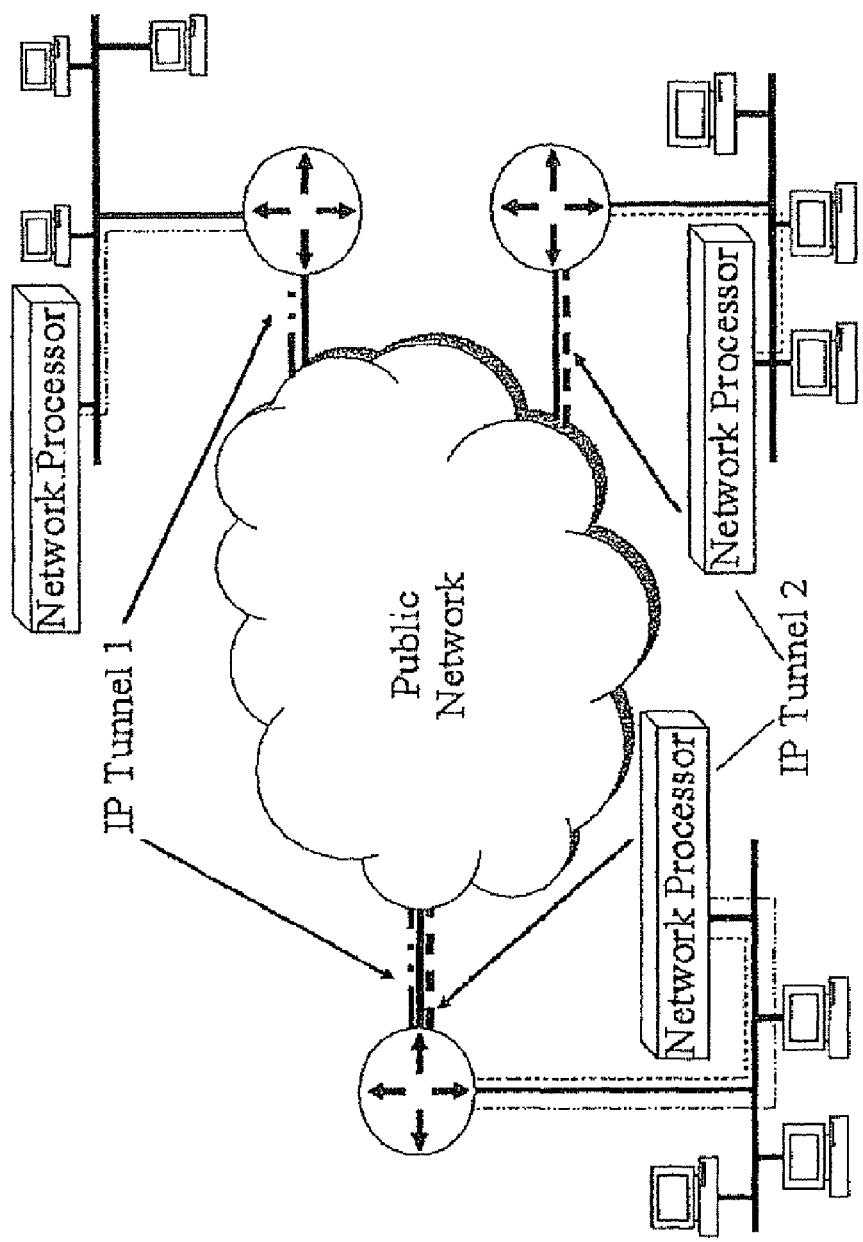
FIG. 4 provides a diagram of an exemplary system with IP-Tunnels.

Another non-limiting example is the case of an IP-tunnel, which is depicted in FIG. 4. In FIG. 4, two different IP tunnels (lower and upper) are depicted. To ensure synchronized communication between multiple machines, virtual IP tunnels are established. This ensures that every packet is handled by a specific machine, and will arrive to the correct destination machine. An End-to-End data compression scheme can be applied over each IP-tunnel, allowing transfer of more data through every IP-tunnel. This virtual tunnel can be considered as a communication link.

Figure 5:
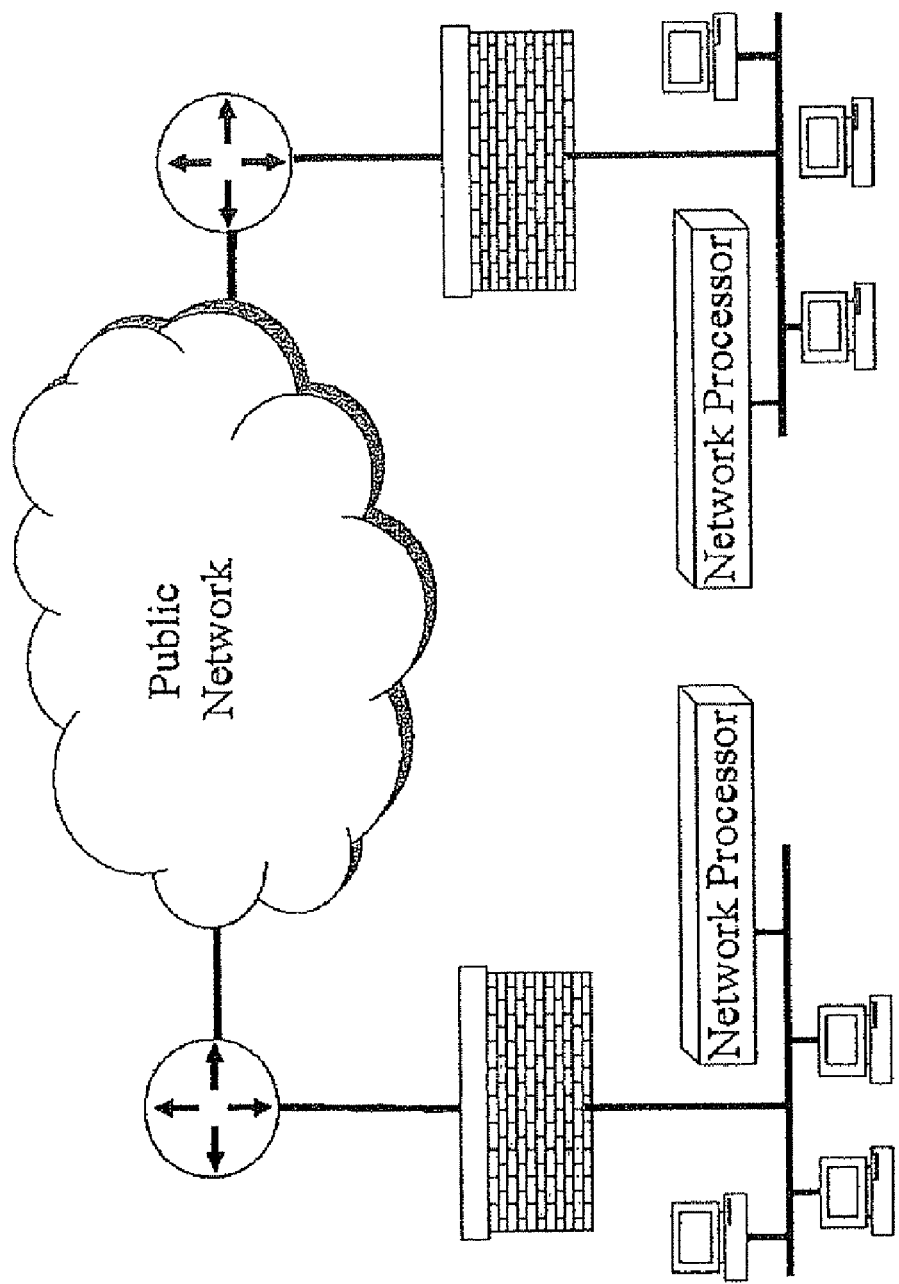
FIG. 5 provides a diagram of an exemplary VPN over IPSec system according to exemplary embodiments of the present invention.

Finally, according to a third non-limiting example (VPN over IPSec), a configuration of a VPN (Virtual Private Network) [9] over IPSec (IP Security Protocol) [7] is depicted in FIG. 5. In this configuration, a Fire-Wall is used. When working in VPN environments, the service provider offers secure IP tunnels across the public Internet or via a dedicated IP network. The "access router", using IPSec, can encapsulate data traffic in a secure manner. As we can see, if we use the on-LAN configuration for data compression, machines can be added to VPN-enabled environments, as they are installed behind the access router. By using an on-LAN configuration, it is possible to compress the data and then encrypt it, i.e. transfer the data over the VPN by using a Fire-Wall.

Packet Compression Algorithms

Packet compression algorithms are algorithms that compress packets by using at least one of:

A) a lossless compression algorithm, including but not limited to a Lempell-Ziv compression algorithm, Deflate [14], Predictor [30], Huffman compression, predictor (Cisco), arithmetic coding, or any combination thereof As used herein, "Lempell-Ziv compression algorithm" refers to any variant, including but not limited to LZ77 algorithms (and LZ77 variants such as LZR, LZSS, LZB, and LZH), and LZ78 algorithms (and any LZ78 variant). It is appreciated that other lossless compression algorithms are also within the scope of the present invention.

B) a lossy compression algorithm. In non-limiting example, during decoding we use an approximate matching and replace a string with a token for another string that is similar but not identical. The level of matching of approximate matching can be pre-defined.

C) a substantially lossless compression which is slightly lossy. The term "slightly lossy" is defined in terms of the types of packets compressed (i.e. the type of application using these packets), and refers to the case where some amount of data is lost, I) but in such a level that is not noticed by the user of the data, or II) where after data loss, the packet (which has lost some data) is "good enough" for the user, for example using specific pre-defined criteria. Thus, for the non-limiting example of voice packets, there is no noticeable degradation (or a user-defined "acceptable" degradation) in the voice quality of the received packets. The skilled artisan will be able to determine how much degradation is a "noticeable degradation" for the type of packet and/or for the type of application.

Although the current invention is not limited to lossless compression, the teachings of the present invention will be explained in terms of exemplary embodiments relating to lossless compression. Nevertheless, the use of lossless compression is not a limitation of the present invention.

Packet compression algorithms use a dictionary for the compression of every packet. The decoder reconstructs the dictionary of the encoder by using phrases derived from the compressed packets.

A Brief Discussion About Dictionaries

As used herein, a "dictionary" is a data structure which represents phrases of one or more packets. A given target packet can thus be compressed/encoded and/or decoded in accordance with the phrases of the dictionary.

When a dictionary is determined, this includes both the cases where a dictionary is explicitly constructed as well as "implicit" derivation of a dictionary where, although not explicit dictionary is derived, certain phrases or data of existing packets are "determined" to be part of a given dictionary.

Typically (see FIG. 11 and FIG. 12), dictionaries are used both by the encoder as well as the decoder. Typically, there is some sort of "dictionary synchronization" so that the same packets (or at least a sub-set of packets) used by the encoder to determine a dictionary for compressing a packet are used by the decoder to decompress the packet. There is no limitation for what type of synchronization mechanism is provided. In some non-limiting embodiment, when a given packet is compressed or encoded using a dictionary determined from a respective group of packets, a marker (for example, a header which may be appended to an existing header) is generated, and this marker is parsed or read by the decoder. Nevertheless, this does not mean that the decoder needs every single packet specified in the marker to decode the packet, and "eager decoding" embodiments where an attempt is made to decode a given packet using a dictionary determined from a sub-set of the packets used in the encoding dictionary are disclosed for the first time.

A Theoretical Discussion of Various Compression Algorithms

In order to explain the delayed dictionary compression technique, two discussions are first presented: I) first, in the current section, a discussion of three main types of packet compression algorithms, namely stateless, streaming, and off-line compression, is provided, and II) second, a discussion of potential improvements relative to these three techniques is presented (see the section "Potential Improvement in Packet Compression" below). It is stressed that the concept of "potential improvements" is provided for explanatory and exemplary purposes only, and is not to be construed as limiting the present invention.

Stateless Compression (Packet by Packet Compression)

Each packet is compressed independently, the history space is initialized after every packet is compressed or decompressed. Since each packet is independent, it can always be decompressed by the receiver, regardless of the order of arrival or of packet drops. In stateless compression, the decoding latency is minimal since packets are independent. The following IETF (Internet Engineering Task Force) RFCs are examples of dictionary based stateless compression algorithms: Monsour et al [31], Friend et al [17], Pereira [26], Rand [30], Woods [35].

Figure 6:
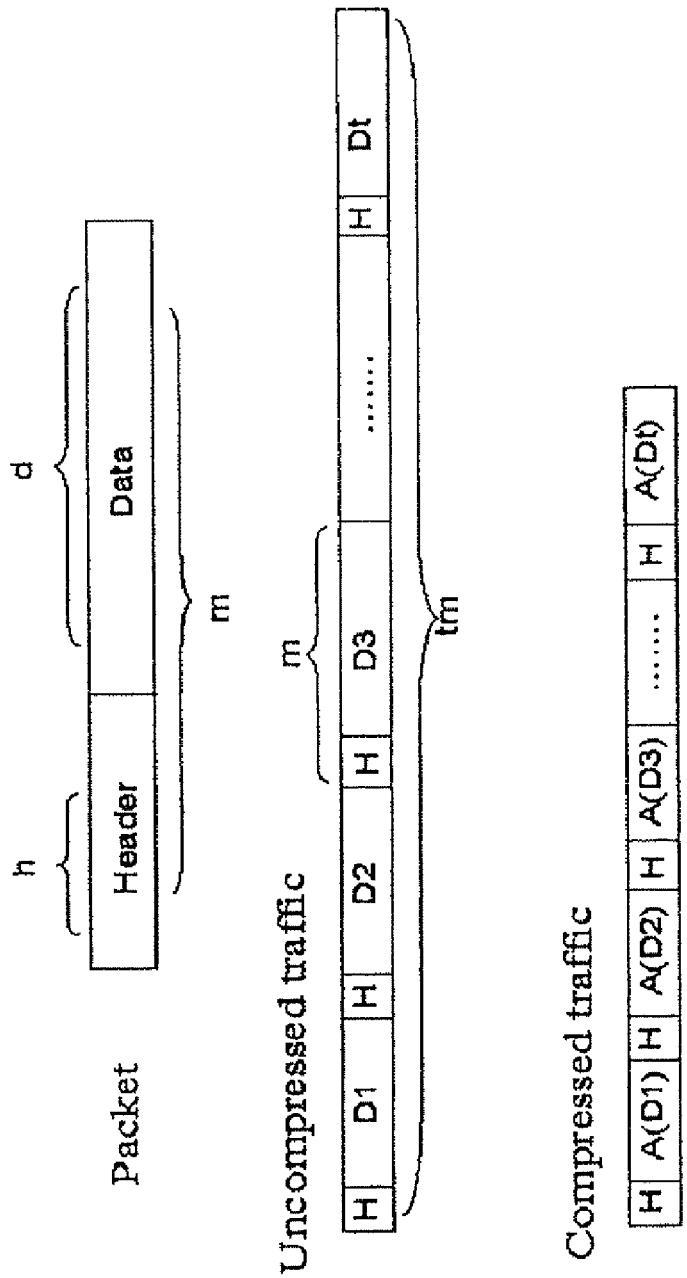
FIG. 6 provides a diagram of an exemplary packet structure according to exemplary embodiments of the present invention.

A structure of a single packet, the structure of the traffic without compression and the traffic in stateless compression are depicted in FIG. 6. The upper hand side of the figure is a a structure of a packet which consists of a header and a payload. The total size of a packet is m bytes. The header has a length field indicating the length of the payload. The middle part of the figure is the structure of an uncompressed network traffic with t packets, while the lower part is the structure of stateless compression traffic. In stateless compression the payload of every packet is compressed with the algorithm A independently.

The lossless compression algorithm A is executed on the payload of every packet separately. The required buffer size is small, since it only has a dictionary with phrases derived from a single packet.

Streaming Compression (Continuous Compression)

In streaming compression the history buffer is not initialized after every packet is encoded (resp. decoded). Each packet is encoded by using a history which is derived from all preceding packets and from the current packet. In this method packets are encoded (resp. decoded) in their consecutive order. When decoding a received packet, if some prior packets are missing, the decoder must store the current packet until all prior packets are received by retransmissions, resulting in large values of decoding latency. The required buffer size is larger than that of stateless compression, since it contains phrases derived from the entire encoded traffic. The buffer also contains the pending packets in which their amount is determined by the packet reordering probability. When the reliability of a link is poor, streaming compression is unattractive.

Off-Line Compression (Compress and Send)

First we compress the data off-line, at the application layer, then we break the compressed data into packets, and finally send the packets to the receiver. This approach achieves a good compression ratio compared to the previous methods. Since compression is performed at the application layer and not inside the network processors, off-line compression does not require any buffer at the network processors, nor do these cause any decoding latency at the network processor. The network processors see the packets as standard packets, since the data carried by the packets is compressed data. The packets are not compressed by the network processor, since it is not worth while to compress compressed data. The required buffer is the same buffer of the compression algorithm at the application layer. All known lossless compression algorithms are good for off-line compression.

Problem Definition

Definition 1 Let F be a file. Let A be a lossless compression algorithm. The compression ratio of A on F, $r_A(F)$, is $$\frac{|A(F)|}{|F|}$$

Definition 2 Let A be a lossless compression algorithm. Let B be a packet compression algorithm which uses A. Let X (resp. Y) be the uncompressed (resp. compressed) traffic. The traffic compression ratio $r_{A,B}(F)$ is $$\frac{|Y|}{|X|}.$$

The traffic compression ratio is also the ratio between the utilization of the line after compression, and the utilization of the line before compression. If the line is in full utilization, the compression ratio is identical to the line utilization. Note that the traffic compression ratio is not fixed since it depends on the currently transferred traffic, i.e. compressed data.

Proposition 3 Let $B_{STATELESS}$ be a stateless compression algorithm which uses A. Let H (resp. D) be a header (resp. payload) of a packet. Define the following quantities: m is the total length of the packet Maximal Transmission Unit (MTU); h=|H|(resp. d=|D|) is the length of the header (resp. packet's payload or packet's data). $\overline{A(D)}$ is the average compressed payload length. Then, the following equality holds:

$$r_{A,B_{STATELESS}} = \frac{h + \overline{A(D)}}{m}$$

Proof: Let F be a file or a stream of data, to be transferred by a transport protocol. Define n=|F| as the length of the file F. By definition, m=h+d. Let t be the number of the packets that are required to transfer the file. Thus, t=n/d. $A(D_i)$ is the output of A running on the payload Di.

$$r_{A,B_{STATELESS}}(F) = \quad (1)$$

$$\frac{\sum_{i=1}^{t}(h + \overline{A(D_i)})}{t(h+d)} = \quad (2)$$

$$\frac{ht + \sum_{i=1}^{t}(\overline{A(D_i)})}{tm} = \quad (3)$$

$$\frac{h + \overline{A(D)}}{m}. \quad (4)$$

This proposition demonstrates why header compression and payload compression are orthogonal problems.

Proposition 4 Let F be a file or a stream of data to be transferred by a transport protocol. Let $B_{OFFLINE}$ be an off-line compression algorithm which uses A. Then, the following equality holds:

$$r_{A,\text{off-line}}(F) = r_A(F)$$

Proof: The off-line traffic compression ratio is the ratio between the size of the compressed file, broken into packets with payload size d and header size h, and the size of the uncompressed file transferred with the same type of packets.

Let x (resp. y) be the amount of bytes in the compressed (resp. uncompressed) traffic. The number of packets required to transfer the compressed data is $$\frac{|A(F)|}{d},$$

thus $$x = \frac{|A(F)|}{d}(h+d) = \frac{|A(F)|}{d}m.$$

The number of packets required to transfer the uncompressed data $$\frac{|F|}{d},$$

thus $$y = \frac{|F|}{d}(h+d) = \frac{|F|}{d}m.$$

By definition, x/y is the off-line traffic compression ratio. Therefore $$r_{A,B_{OFF-LINE}}(F) = \frac{x}{y} = \frac{|A(F)|}{|F|} = r_A(F).$$

Note that this result is true for any network type, i.e. the header size and the payload size are irrelevant.

Proposition 5 Let $B_{STATELESS}$ (resp. $B_{STREAMING}$, $B_{OFFLINE}$) be a stateless (resp. streaming, off-line) compression algorithm which uses A. Then, the following inequality holds:

$$r_{A,B_{STATELESS}} \geq r_{A,B_{STREAMING}} \geq r_{A,B_{OFF-LINE}}$$

Proof: In all compression methods, if a compressed packet length is greater or equal to the original uncompressed one, the original packet is transmitted. Off-line compression can emulate a streaming compression by marking all the packets as uncompressed, since the data is already compressed by the same algorithm. Streaming compression can emulate stateless compression by initializing the history after each packet.

Definition 6 Let $P_i$ be a packet that was received by the decoder. The decoding latency of $P_i$, denoted by $L_{dec}(P_i)$, is the number of additional packets that Pi had to wait for until $P_i$ was decodable. The average decoding latency is denoted by $\overline{L_{DEC}}$ It is desirable is to find an efficient packet compression algorithm that compresses packets along a communication line. This algorithm should have a small traffic compression ratio and also a small $\overline{L_{DEC}}$. Due to the large required delay, achieving $r_{A,B_{off-line}}$ is not practical in a network processor. Therefore, $r_{A,B_{STREAMING}}$ would be regarded as our objective for compression ratio improvement.

Potential Improvement in Packet Compression: A Theoretical Discussion

This section is provided for exemplary and theoretical purposes only, and is not to be construed as limiting.

All the preliminary experiments were performed on the Calgary corpus files, Canterbury corpus files [10], and a set of various large files that consist of text files, bmp, documents, audio files, worksheets, presentations, pdf, images, mpegs, zip, etc.

The purpose of the first experiment was to choose a compression algorithm that gives a good compromise between the compression ratio and the encoding speed. We divided the experiment to two parts: In the first part we ranked four different compression algorithms that are suitable for communication purposes with respect to their compression ratio. In the second part of the experiment we ranked the compression algorithms with respect to their encoding speed. The algorithms are: LZW (the same algorithm used by Unix compress), FP-LZW [25], Deflate [14] (same algorithm used by gzip, for the implementation we used the zlib compression library [18]), and Predictor [30]. Note that our definition for compression ratio is the ratio between the compressed data size and the uncompressed data size.

Figure 7:
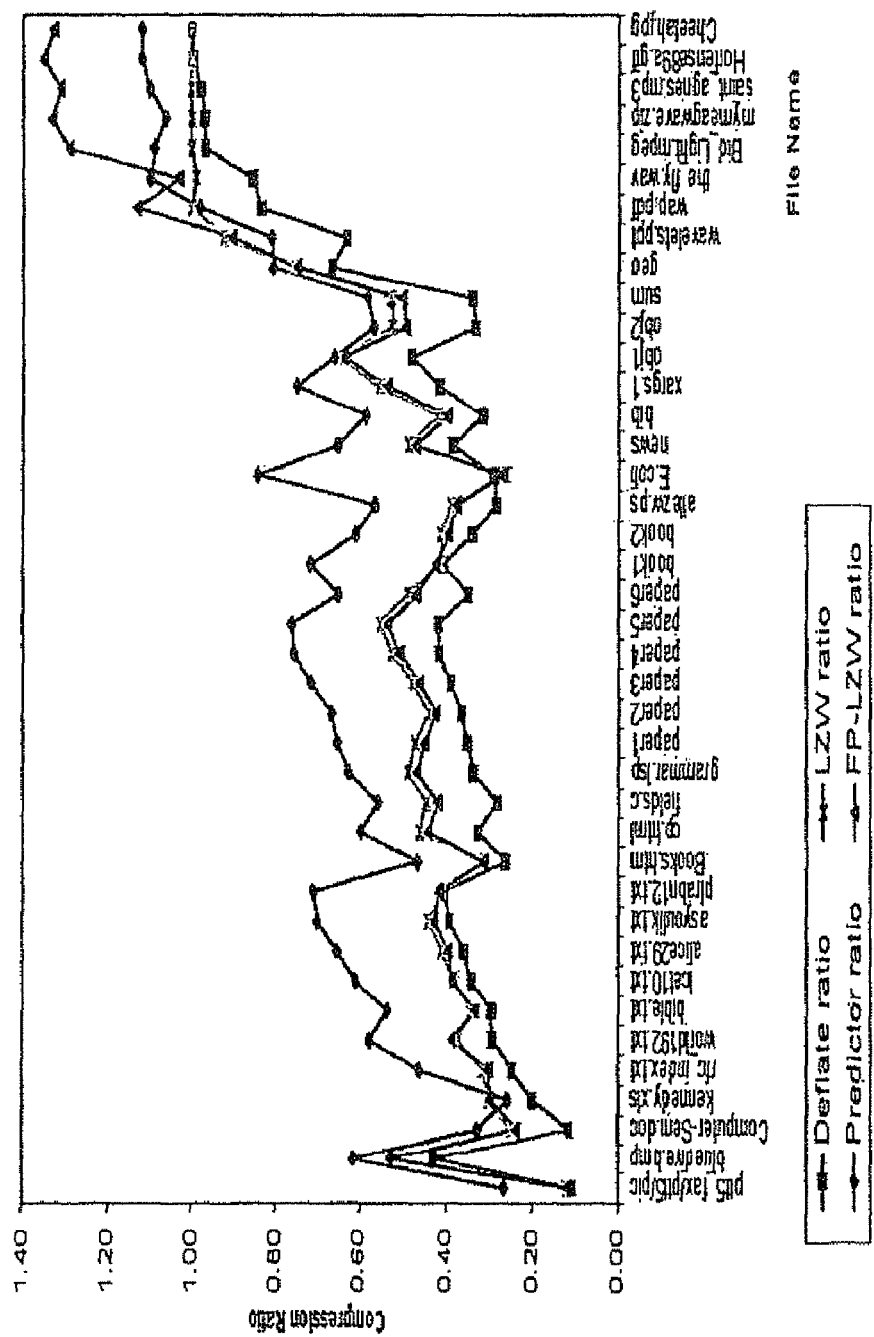
FIG. 7 provides a graph illustrating off-line compression ratios of various files measured with various compression algorithms.

The compression ratios of the various compression algorithms on the input files are depicted in FIG. 7. FIG. 7 presents compression ratios of various files measured with various compression algorithms Deflate (gzip), Predictor, LZW (compress), FP-LZW. The files used are the Calgary corpus files, Canterbury files, and some files of our own. Note that the right hand side files are compressed files. Therefore, the compression ratio is larger than 1, indicating the overhead of the compression algorithm. Predictor has the worst compression ratio (but is the fastest compression algorithm). FP-LZW has a compression ratio at least as good as the one of LZW. Finally, Deflate has the best compression ratio.

In summary, Deflate gives the best compression ratios, FP-LZW and LZW give close results (FP-LZW gives results at least as good as those of LZW), while Predictor gives the poorest compression ratio.

Figure 8:
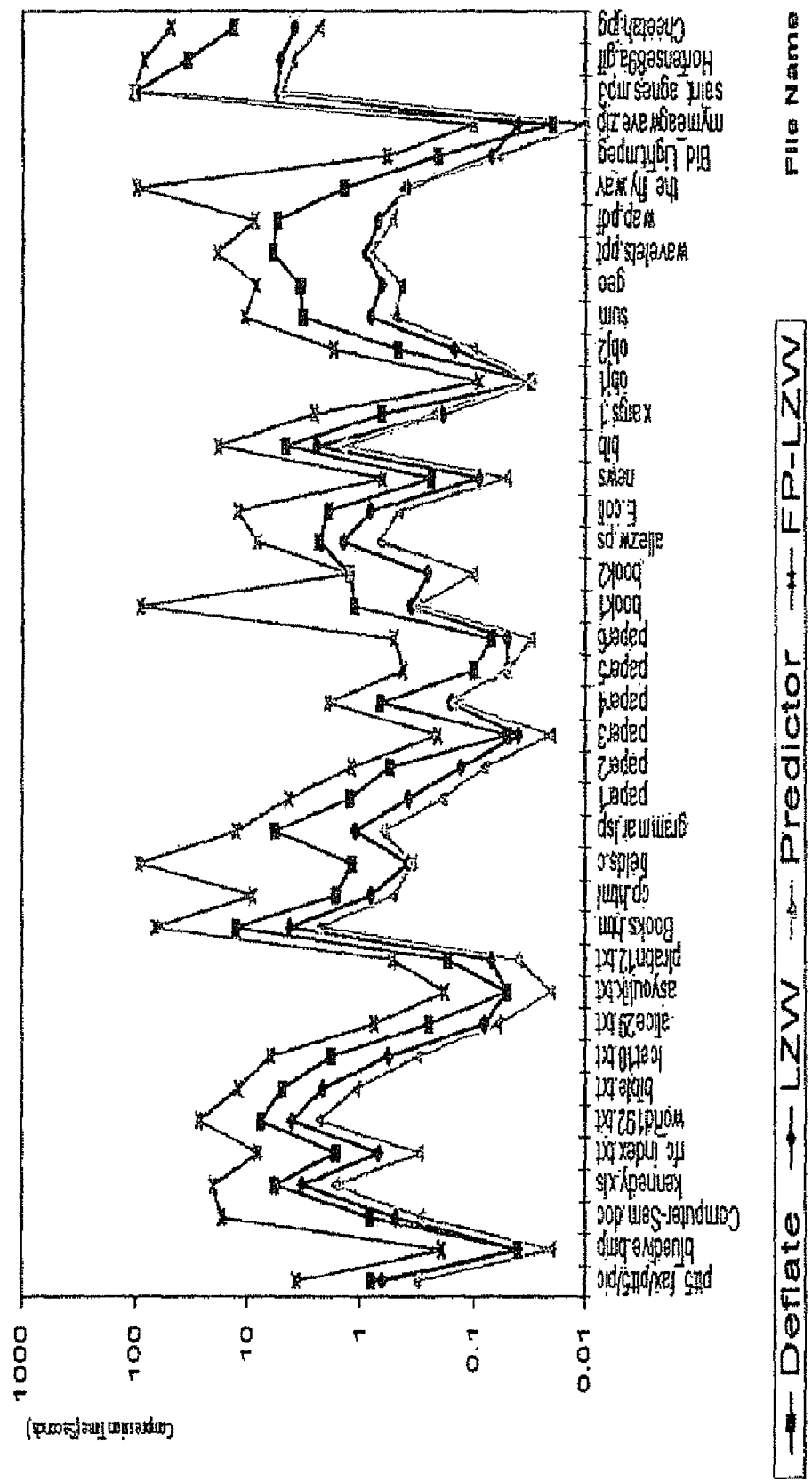
FIG. 8 provides a graph illustrating a compression time comparison.

In order to measure the compression time performance of the various compression algorithms, we compressed with them all the test files, and used the Linux OS time utility (user+system time) to measure the exact time used by every compression algorithm for every input file. The results are depicted in FIG. 8, which provides a compression time comparison graph. The compression time of Calgary corpus files, Canterbury corpus files, and some files of our own, compressed by Deflate, LZW, FP-LZW, and Predictor, are depicted in this figure. FP-LZW is the slowest compression algorithm, Deflate is next, then LZW, and eventually Predictor is the fastest compression algorithm.

Eventually we chose the FP-LZW compression algorithm due to its simple and clear implementation which allowed easy modifications of the code according to our needs, as described later in this work. Nevertheless, it is noted that this is not to be construed as a limitation of the present invention.

Figure 9:
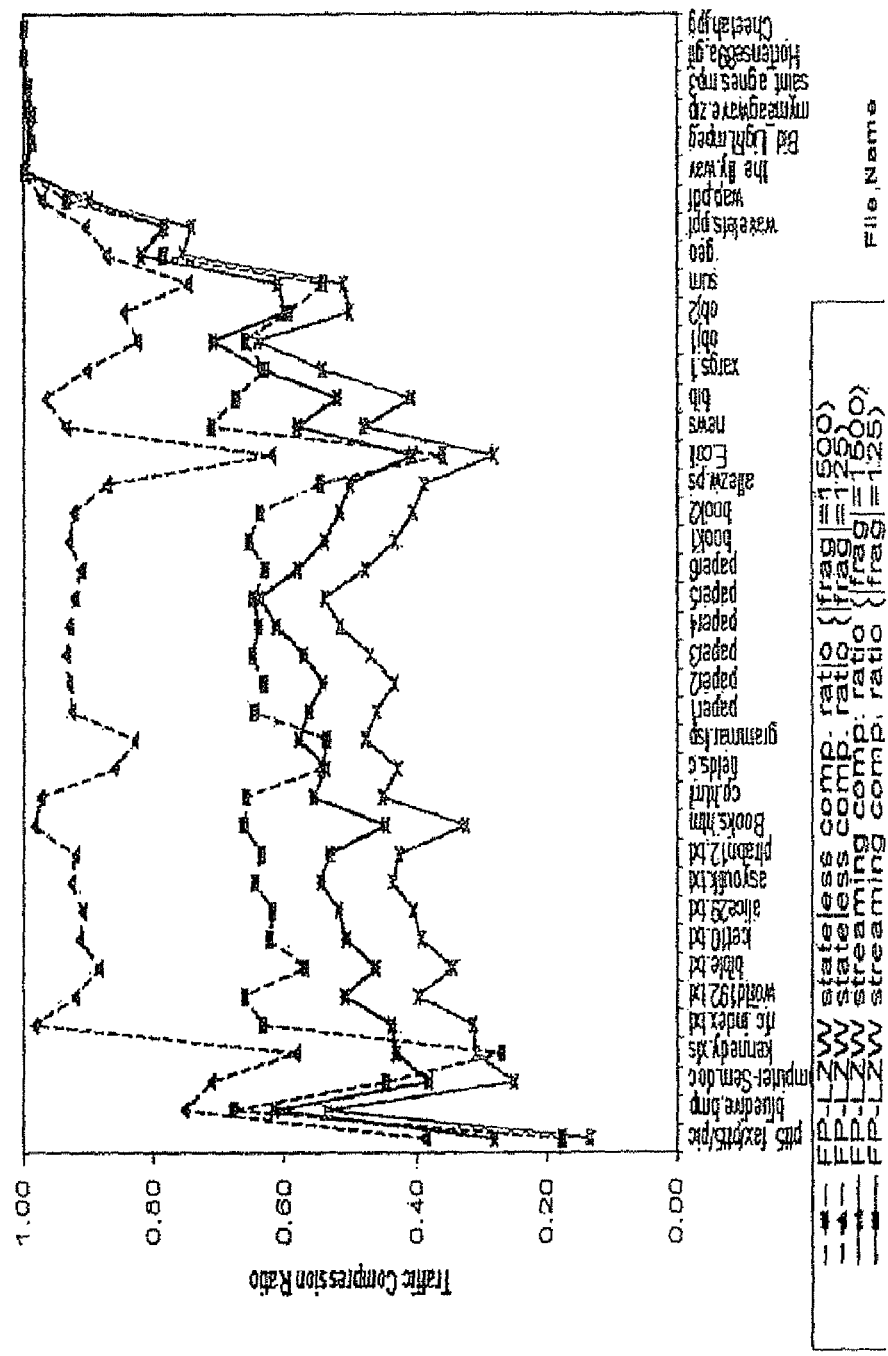
FIG. 9 provides a graph illustrating the effect of the fragment size on the overall compression ratio, with respect to the FP-LZW compression algorithm.

In order to measure the potential for improvement we used $r_{A,Bstreaming}$ as the goal for improvement. The goal of this experiment was to measure the actual differences between the compression ratios of stateless compression and streaming compression. A comparison of the stateless compression ratio and the streaming compression ratio when the packet size varies, with respect to the FP-LZW compression algorithm, is given in FIG. 9. More specifically, FIG. 9 illustrated the effect of the fragment size on the overall compression ratio, with respect to the FPLZW compression algorithm. The two upper graphs are of FP-LZW, for small (upper) packets and large packets (lower). Shifting the packets size from small packets to large packets results in an improvement in the traffic compression ratio. The same phenomenon happens in the two lower graphs. When packet size rises, the compression ratio improves, since each packet contains longer phrases. The ratio between stateless compression ratio and streaming compression ratio for a given file and a given packet size is the potential improvement.

It is noted that we assume in this measurement a header size of 24 bytes. Two packet sizes were measured. From observing the graphs we learn that the larger the payload the better the compression ratio, since the compression algorithm uses longer phrases. This is true for stateless compression as well as streaming compression. The same effect occurs in Deflate, Predictor, and LZW. The graphs are not included due to similarity in behavior to FP-LZW.

Definition 7 Let A be a compression algorithm. Let Bstateless (resp. Bstreaming) be a stateless (resp. streaming) compression algorithm which uses A. Let us define $\phi$ as the potential for traffic compression ratio improvement, when using a specific packet size.

$$\varphi(B_{STATELESS}, B_{STREAMING}) = \frac{r_{A,B_{STATELESS}}}{r_{A,B_{STREAMING}}}$$

Figure 10:
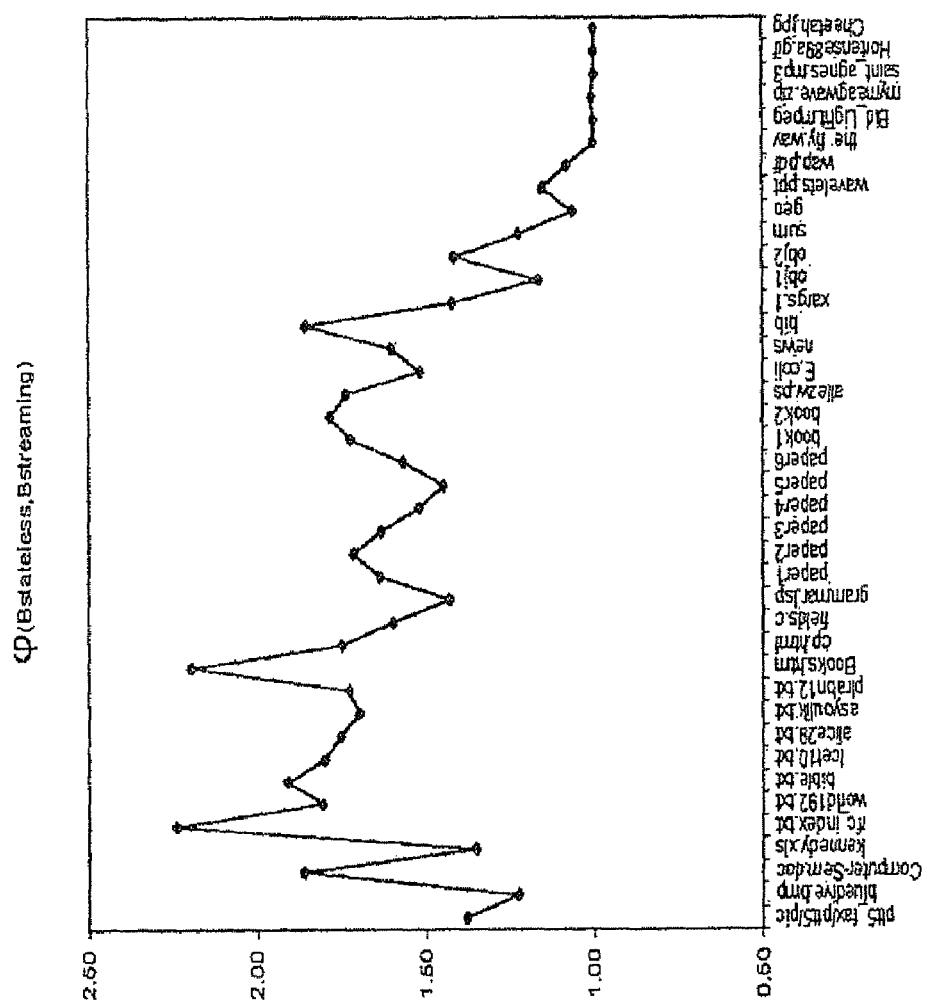
FIG. 10 provides a graph illustrating a potential improvement.

The results of the experiment according to this definition are depicted in FIG. 10. FIG. 10 illustrates potential for improvement as measured by using the Calgary corpus files, Canterbury corpus files, and some files of our own. The potential improvement is defined as the stateless traffic compression ratio divided by the streaming traffic compression ratio of each file. The right hand side files are compressed files, therefore there is no room for improvement in these files. The payload size is 125 bytes.

These results are for small packets with a payload size of 125 bytes. If the value of the ratio is 1, we have nothing to improve. If the ratio is larger than 1, we have more room for improvements. For the implementation we used several objects and functions that are described later on at Section 0.5. For this experiment we used a main program, that reads fragments (simulating packets) from a file. Two dictionary objects were created, one for stateless compression (d_stateless) and one for streaming compression (d_streaming). Each fragment was supplied to the compress_buffer( ) function of both objects. We used a cshell scripts to perform the compression tests on the various test files, separately and also on their concatenation.

On-Line Dictionary Compression Algorithms Model

Figure 11:
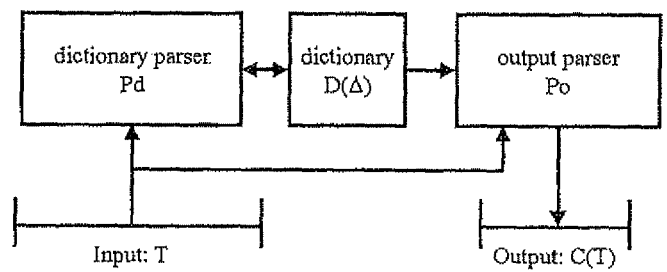
FIG. 11 provides a block diagram of an exemplary encoder.
Figure 12:
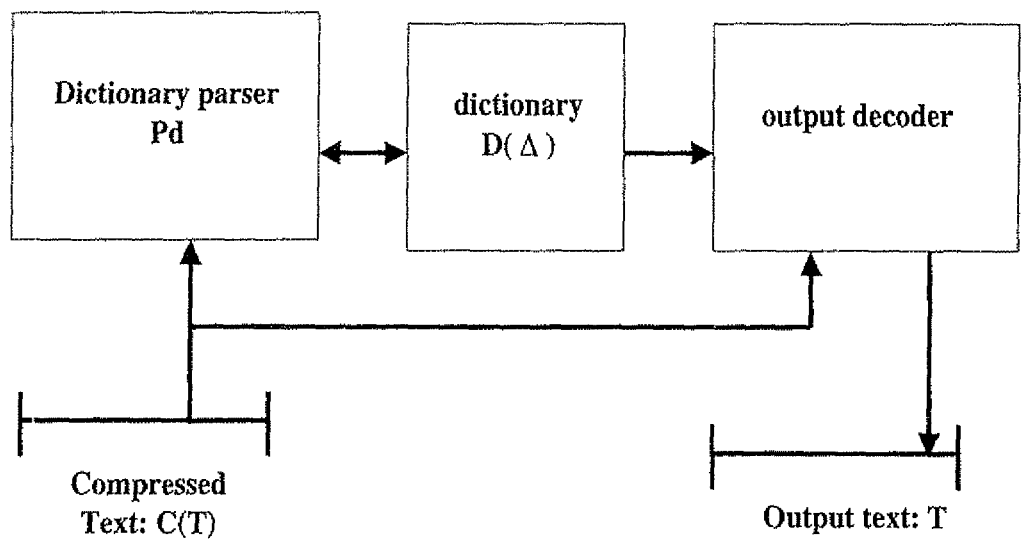
FIG. 12 provides a block diagram of an exemplary decoder.

The theoretical derivation of these techniques may relies on a conceptual separation between the parsing process and the dictionary update process of dictionary based compression algorithms, as shown by Matias and Sabinalp in [25] and depicted in FIGS. 11 and 12. FIG. 11 provides an illustrated of a block diagram of a model for incremental dictionary compression algorithm C. The model enables complete separation between the dictionary parser and the output parser. FIG. 12 provides an illustrated of a block diagram of a model for incremental dictionary decompression $C^{\leftarrow}$. The model enables complete separation between the dictionary parser and the output decoder.

It is noted that this separation (i.e. separation between the parsing process and the dictionary update process) may be true for any dictionary based compression algorithm (note the Flexible Parsing (FP) algorithm introduced in [25] explicitly enables this separation, while giving an optimal parsing method in the sense of minimizing the number of phrases produced as output for a given dictionary). This separation enables us to update the dictionary independently to the parsing process, a fact that may be used by DDC.

The model M presented in [25] is suitable for all known dictionary compression algorithms. In this model there is a compression algorithm C and respectively a decompression algorithm $C^{\leftarrow}$. The compression algorithm C uses and possibly maintains a set of substrings D, denoted as a dictionary. The output of C is a sequence of codewords which is called the compressed text and denoted as C(T). The decompression algorithm $C^{\leftarrow}$ takes as input a compressed text C(T), and maintains the same dictionary D as the compression algorithm $C^{\leftarrow}$. The parsing process for constructing the dictionary is called dictionary parser and is denoted as Pd; the second process is the output parser and is denoted as Po. The encoding algorithm is depicted in FIG. 11. The input C(T) to the decompression algorithm $C^{\leftarrow}$, is a sequence of codewords. After reading each codeword, $C^{\leftarrow}$ replaces it with its corresponding phrase, while building the exact same dictionary D that C builds for T. The decoding algorithm $C^{\leftarrow}$, with its different components, is given in FIG. 12.

An Exemplary Basic Delayed-Dictionary Compression Algorithm

We present a generalization of the model M by adding an additional parameter denoted by $\Delta$ which is a non-negative integer. The dictionary is updated in a delay of $\Delta$ units, which can be either characters or packets. In terms of M, D is a function of all the n_$\Delta$_1 units read from the input, for n≧$\Delta$+1. For all standard dictionary compression algorithms, $\Delta$ is 0 by definition. This approach is called basic delayed-dictionary compression (BDDC).

Figure 13:
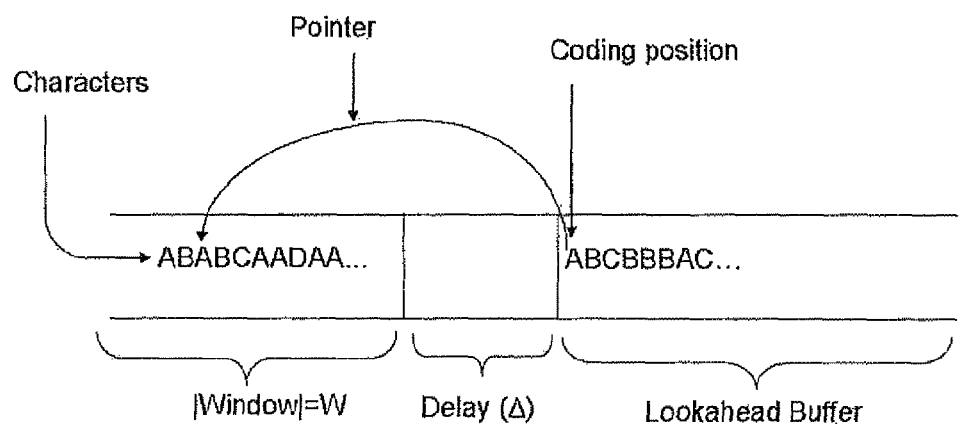
FIG. 13 illustrates a BDDC-LZ77 technique.

An example of this method for the LZ77 [36] is given in FIG. 13. FIG. 13 illustrates BDDC-LZ77, according to exemplary embodiments. Thus, according to this example, LZ77 compression algorithm encodes phrases as pairs consisting of a pointer and a match length to a phrase which is in a predetermined window. The LZ77 has a dictionary which is defined as all the strings within the window. In BDDC-LZ77, the window is shifted $\Delta$ characters backward. Every match starts and ends in the limits of the window, and without considering the delay gap.

Thus, according to the example of FIG. 13, LZ77 searches the window for the longest match with the beginning of the lookahead buffer and outputs a pointer to that match. The LZ77 has a dictionary which is defined as all the strings within the window. The BDDC-LZ77 shifts the window $\Delta$ characters backward. In this case the encoded phrase depends only on the characters that preceded the last $\Delta$ characters before the lookahead buffer.

The model M can be enhanced at the encoder process. The encoding of a current character in T is a function of all the characters prior to the last $\Delta$ characters. In this case any on-line compression algorithm will do, providing its on-line encoder is a function of the text.

Figure 14:
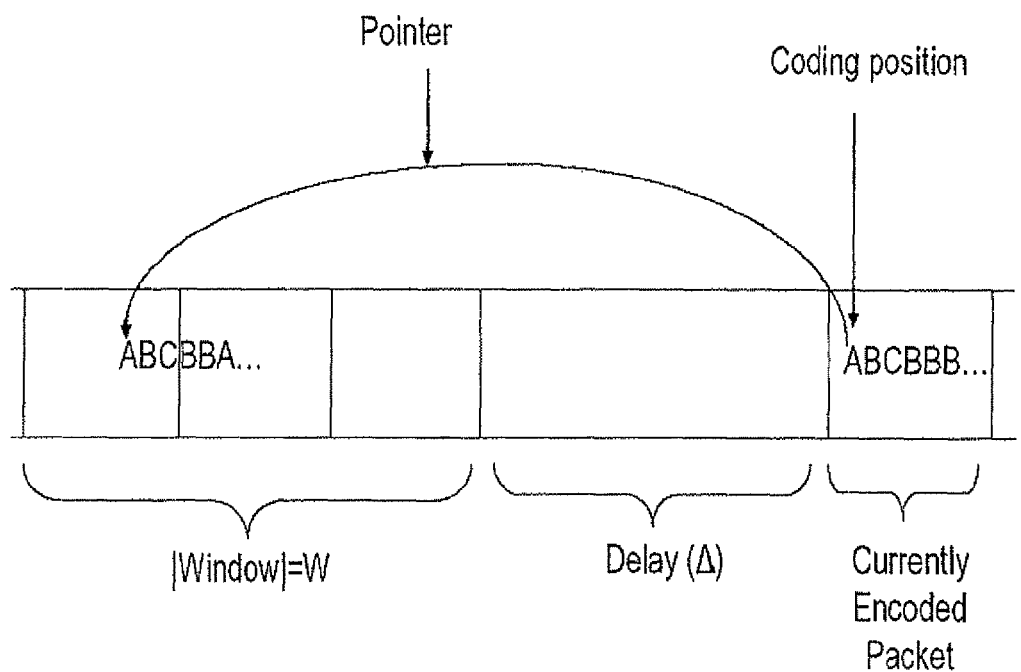
FIG. 14 illustrates a BDDC-LZ77 in granularity level of packets.

When considering the model M in terms of a network, we may consider the data in a granularity of packets, as it appears in FIG. 14. FIG. 14 thus illustrates BDDC-LZ77 in granularity level of packets.

The BDDC-LZ77 algorithm encodes the currently encoded packet by pointing to a phrase which is in packets that preceded the last $\Delta$ packets prior to the currently encoded packet.

Figure 15A:
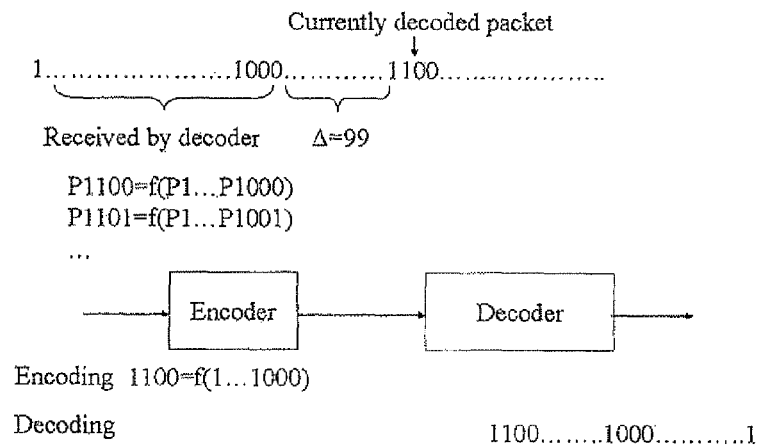
FIG. 15A illustrates a exemplary Basic Delayed-Dictionary Compression.

The phrases created from compressing a packet are inserted to the dictionary in a delay of $\Delta$ packets. $\Delta$ can be a constant, or adaptive according to any rule that we choose. An illustration for the case of $\Delta$=99 is given in FIG. 15A. The upper part of the figure demonstrates an encoding packet with serial number=1100. The packet is encoded with a history based on packets 1 . . . 1000. The lower part of the figure demonstrates the decoding time—when packet 1100 is decoded, all the packets 1 . . . 1000 were already received by the decoder.

The BDDC method compresses the network packets according to a dictionary which is updated with a delay $\Delta$ proportional to the network propagation delay.

A Non-Limiting Exemplary BDDC Implementation

Each packet is compressed by using a history based on all the packets that were originally received by the encoder, except for the last $\Delta$ packets that preceded the currently encoded packet. When this packet is decoded, our ability to decode it is of high probability, even without receiving all the packets that preceded it, since the original encoding is not using them. Even if some packets were dropped or reordered, we may still be able to decode the received packet, since due to the use of delay we do not depend on the last $\Delta$ packets (they are in the "delay gap"). In case of packet drops, a retransmission scheme will resend the missing packets. If the retransmission scheme is not part of the original transport protocol, it can be implemented by the encoder and the decoder pair. After the compression of a packet the encoder transmits the encoded packet. After a constant time period (2RTT), if no acknowledgment is received by the encoder, the encoder will retransmit the compressed packet.

The delay $\Delta$ has a strong effect on the performance of the BDDC, compression wise. If the delay is very large, the BDDC compresses the current traffic with a history based on very ancient traffic. In this case the compression ratio will be poor. When considering the probability of packet decoding success, the smaller the delay is, the smaller our chances to decode a packet, since there is a higher probability that the decoder did not receive all the packets that were required to decode the current packet.

In exemplary embodiments, each header may contain a serial number of the current packet, as well as the serial number of the last packet that was used during the encoding process. The original header contains up to 2 bits that indicate the compression method, and can also indicate whether the packet is compressed or not. The ability to assign packets as uncompressed is good for traffic that was already compressed as well as for encrypted traffic. An adaptive algorithm layer using these special bits can be used when traffic compressibility changes along a session as described in [31].

In some examples, this extra header information takes up to 4 bytes. If the compressed length+additional header≧uncompressed length, the encoder will transmit the original packet without compression (we can recover the required phrases for the dictionary synchronization purposes by compressing the packet at the decoder side).

An Non-Limiting Exemplary BDDC Encoder

For the implementation of the delay we may use a FIFO queue as a data structure which uses real packet structures, or empty dummy packet structures. Each packet structure contains a list (implemented by another FIFO queue) which stores all the dictionary phrases which were created due to the compression of the packet.

Figure 15B:
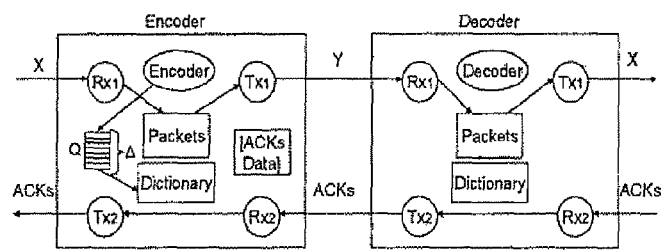
FIG. 15B provides a block diagram of an internal structure of the encoder and the decoder according to exemplary embodiments of the present invention.

We can assume that each dictionary based compression algorithm has a conceptual Insert-PhraseToDictionary function. This function was replaced with another function that inserts a packet queue element to the dictionary. The main FIFO queue is initialized with delay dummy packets in order to immediately start the encoding with a delay. Each time we insert a packet structure to the queue we also extract a packet structure from the queue and insert all the phrases in it to the dictionary. The internal structure of the encoder and the decoder are depicted in FIG. 15B. According to the example of FIG. 15B, Task Rx1 receives uncompressed packets, and stores them in a Packets buffers pool. The Encoder task, encodes packets from the Packets pool, and sends the new phrases to the Dictionary through a FIFO queue, initialized to a length of Δ packets. Task Tx1 transmits encoded packets to the communication line. Task Rx2 reads acknowledgements from the communication line, and transfers them to task Tx2. In case of Confirmed-Dictionary Compression (a variant of BDDC which is described later on), the acknowledgments are used for update of the Acknowledgments data structure. The decoder does not use a queue. The decoder decodes a received packet, whenever a packet is decodable.

The structure of the encoder in BDDC is identical to the structure of the encoder of streaming, except for the FIFO queue. In streaming compression the dictionary is a function of all prior packets and the current packet, while in BDDC it is a function of all the packets prior to the last preceding Δ packets. However, in stateless compression the dictionary is only a function of the current packet.

A Discussion of Various Exemplary Techniques for Packet Compression

Figure 16A:
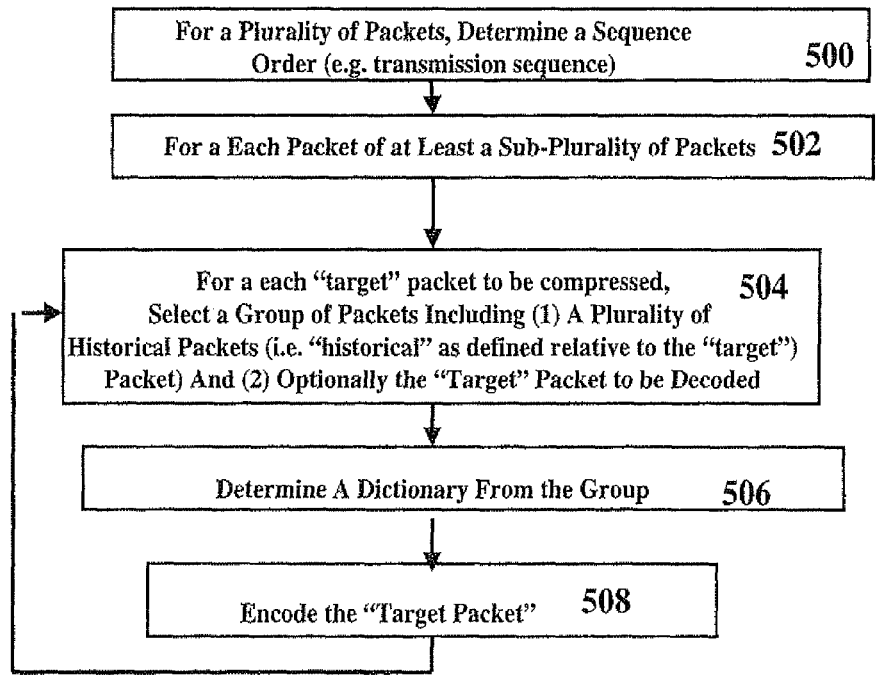
FIG. 16A provides a flow chart illustrating an exemplary encoding technique.

FIG. 16A provides a flow chart describing exemplary embodiments of the present invention. For a plurality of packets, a sequence order (in most embodiments, a transmission sequence order) is determined 500. As noted earlier, this sequence order may be determined "implicitly" (i.e. may be a function of the order that the encoder receives packets) or may be explicitly determined (for example, the packets are marked with data about the sequence order).

For each packet of at least a sub-set of these packets 502, a respective "group of packets" is selected or determined 504. Typically, for each packet of this sub-set, the respective group of packets differ. The respective group of packets includes certain historical packets (i.e. historical for a given packet) and excludes other historical packets. Optionally, the respective group of packets includes the actual target packet.

In some embodiments, the plurality of "excluded" historical packets may be characterized as at least one (or both) of the following:

A) there is a sequence gap among historical packets of the respective group (see FIG. 161B)—i.e. for at least exist two packets of the historical group (an 'earlier packet' and a 'later packet'), there is at least one patent of the transmission order which is not included in the respective group. In the example of FIG. 1613, the 'earlier' packet is packet 1080 and the 'later packet' is packet 1098;

B) there is a sequence gap between a latest packet of the historical packets and the 'target packet'—i.e. for the latest packet of the historical group (in FIG. 16C, packet 1060), there is a sequence gap between this 'latest' packet of the historical group and the 'target' packet (i.e. there are packets in the transmission order after the latest historical packet, for example, 1060, and the target packet). Relating FIG. 16C to FIG. 15, it is noted that the "delta" parameter of FIG. 16C is 39. It is noted that for embodiments where there is a 'delta' parameter, this delta parameter is not required be explicitly specified, though in some embodiments, this delta parameter is specified and enforced.

Figure 16B:
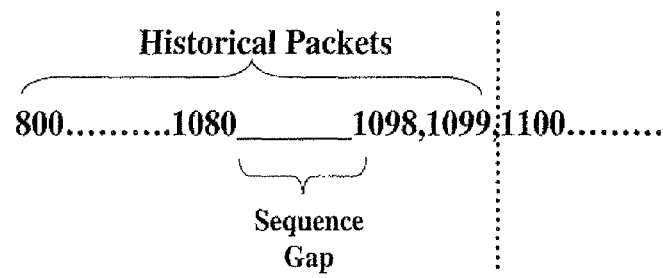
FIGS. 16B-C illustrate exemplary historical packets and sequence gaps.
Figure 16C:
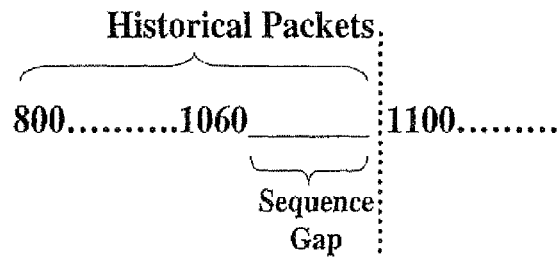
Figure 16D:
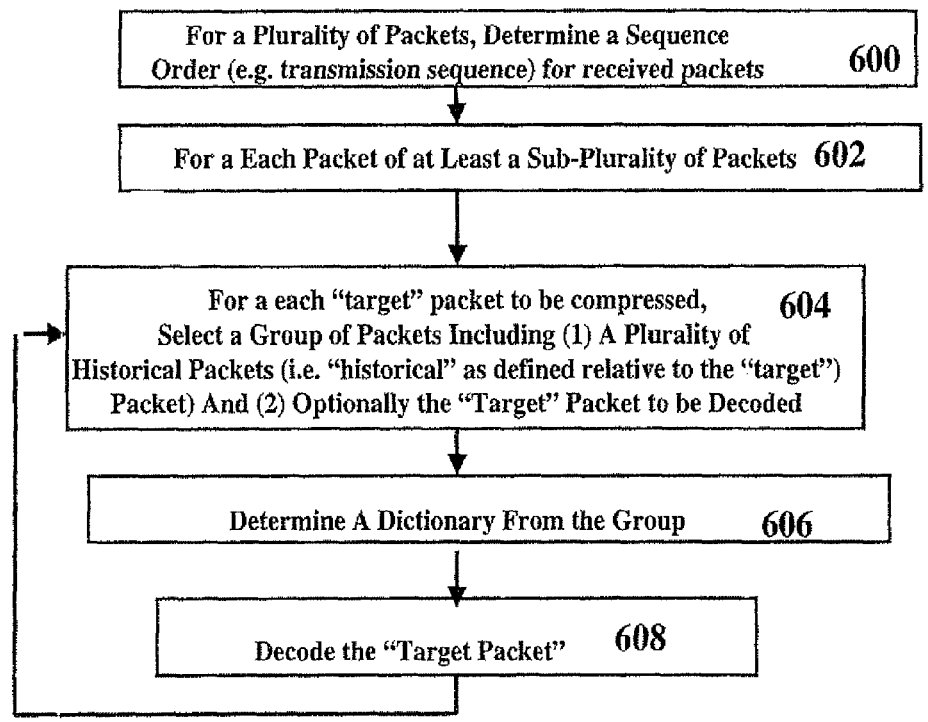
FIG. 16D provides a flow chart illustrating an exemplary decoding technique.

FIG. 16D presents a similar technique for packet decoding.

Encoding a Given Packet Using More than One Dictionary

In some embodiments, more than dictionary may be determined for a given packet. For example, a first dictionary determined from a first set of packets may be determined, and a second dictionary determined from a second set of packets may be determined.

In one example, it is possible to compress a given packet using each dictionary and to compare the size of the compressed packets. According to one example, the compressed packet obtained from the first dictionary is comparable in size to the packet obtained from the second dictionary. According to this example, if the latest historical packet of the second dictionary is more recent than the latest historical packet of the first dictionary, it may be advantageous for a transmitter to transmit the compressed packet derived from using the first dictionary, in order to reduce decoding latency.

In some embodiments, carrying out this process (i.e. compressing packets using different dictionaries) in parallel may reduce the latency of computing the compressed packet which is ultimately transmitted.

A Non-Limiting Exemplary BDDC Decoder

The output decoder When a packet is received by the decoder, if the serial number of the last packet that was inserted to the dictionary ≧ the serial number of the last packet used for compression (taken from the header), then the decoder can certainly decode the received packet. If the dictionary does not have all the required packets (marked by the last packet used for compression), the packet is inserted to a data structure that contains all the packets that are pending decoding. When a new packet is received the decoder examines whether the packet is required for the decoding of the pending packets and decodes accordingly.

The dictionary parser If a received packet i has all the predecessors packets in the dictionary, then the decoder decodes the packet and updates the dictionary.

Exemplary Encoding Algorithms—A Non-Limiting Theoretical Discussion

We present four encoding algorithms based on the Basic ADC approach: Adaptive Delay algorithm, Confirmed-Dictionary Compression algorithm, and two types of DDC known as DDC-min and DDC-union.

Adaptive Delay Algorithm (A Non-Limiting Example)

This algorithm maintains a delay parameter which is changed dynamically according to the decoding success and the changes in the probability for packet drops. If the decoder fails to constantly decode packets, it will send a message to the encoder asking it to increase the delay used for encoding (this is done by adding dummy packets to the FIFO queue). If the decoder succeeds in decoding packets for a large amount of packets, it will send a message to the encoder asking it to decrease the delay used.

When the decoder senses that the probability for packet loss increases, it signals the encoder to increase the delay parameter resulting in deterioration of the traffic compression ratio. However, when using a small delay there is a higher probability for not receiving all the packets required for the decoding of a specific packet. This will result in adding the specific packet to the list of packets that are pending decoding, and therefore larger Ldec. The decoder will signal the encoder to increase the delay parameter. This feedback method will ultimately converge to a specific delay value. See our measurements for the values of the compression ratios for each converged delay value. This approach can also be enhanced to a different method of prediction of the required delay by the encoder.

Figure 17:
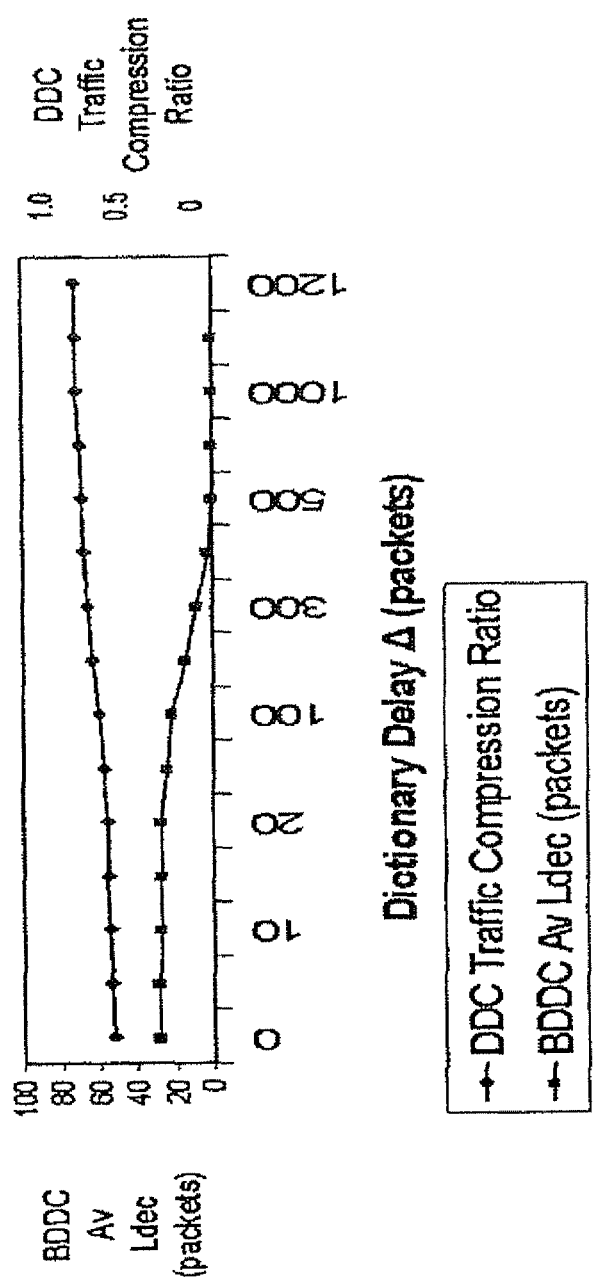
FIG. 17 provides a graph illustrating a BDDC conflict.

The BDDC method has an inherent conflict between $\overline{L_{dec}}$ and the traffic compression ratio: increasing the dictionary delay will cause a decrease in the $\overline{L_{dec}}$, and also a poor traffic compression ratio. This is in contrast to the goal of packet compression algorithms—obtaining small decoding latency and a small traffic compression ratio. This conflict is depicted in FIG. 17.

Thus, the upper part of FIG. 16 is a plot of the traffic compression ratio in the DDC method as a function of the dictionary delay, e.g., for a dictionary delay of 1000 packets the traffic compression ratio is 0.72. The lower part of the figure is a plot of the average decoding latency BDDC in terms of packets, e.g. for a dictionary delay of 300 packets, the average decoding latency is 7.8 packets. Note that we show the dictionary delay of BDDC since the dictionary delay of DDC is in progressive research. The BDDC method has an inherent conflict between the average decoding latency $\overline{L_{dec}}$ and the traffic compression ratio: increasing the dictionary delay will cause a decrease in the $\overline{L_{dec}}$, and a poor traffic compression ratio, and vice versa. This is in contrast to the goal of packet compression algorithms—obtaining small decoding latency and small traffic compression ratio.

Confirmed-Dictionary Compression Algorithm (A Non-Limiting Example)

Figure 18:
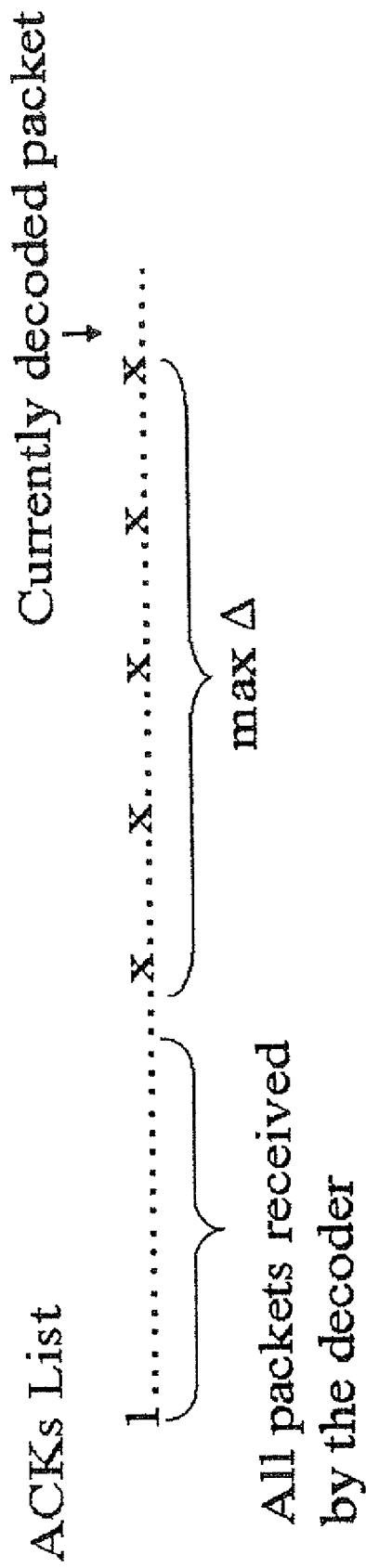
FIG. 18 illustrates an exemplary Confirmed-Dictionary Compression.

This algorithm ensures immediate decoding. A similar approach was introduced in [15]. In this approach the encoder registers the acknowledgements transmitted from the decoder side. The encoder knows which packets were already received by the decoder, thus the encoder encodes the current packet with a history which is based on packets that have surely arrived to the decoder. The encoder maintains an acknowledgments data structure based on packets that were received by the decoder. This list appears in FIG. 18. FIG. 18 illustrates an example of Confirmed-Dictionary Compression Each packet is encoded by choosing a maximal Δ value so that the packet is encoded with a history based on packets that have surely arrived to the decoder. The encoder uses the acknowledgments to maintain an acknowledgements data structure.

Therefore, the encoder is guaranteed that the new encoded packets will be successfully decoded by the decoder. In this approach we set the dictionary delay in the encoder to a maximal value so that all the packets prior to the chosen Δ were received by the decoder. Therefore, every packet received by the decoder will be decoded immediately, i.e.

Ldec=0. This algorithm does not require any buffer for storing packets pending decoding. The trade-off in this algorithm is the compression ratio.

Although the "confirmed" embodiments (i.e. where a dictionary is determined in accordance with packets confirmed by a receiving end) have been explained in terms of embodiments where there is a sequence gap between a latest historical packet and a target packet (i.e. delta is not equal to zero—see FIG. 16C), it is appreciated that this teaching may also apply to embodiments where these is a sequence gap among historical packets (see FIG. 16B).

Embodiments where there is No Need to Acknowledge Packets (For the Decoder) and/or No Need to Require Confirmation of Receipt of the Packets by the Receiving End (For the Encoder)

It is noted that confirmed dictionary compression is a particular technique of compression and/or decoder techniques disclosed herein.

In some embodiments, the encoding of packets in accordance with historical packets may be carried out without receiving confirmation (or without requiring confirmation) of receipt of these historical packet (i.e. used to construct the dictionary) by the receiving end.

As such, in some embodiments, when receiving and/or decoding packets, there is no need to send acknowledgement of receipt of the packets. Thus, in some embodiments, the present invention is useful in "connectionless" networks and/or communication protocols.

As used herein, sending an acknowledgement of receipt of a packet requires sending this acknowledgement over a "connection oriented" communications channel—i.e. sending an acknowledgement from the receiving end that has a reasonable chance (for example, greater than a pre-determined threshold, for example, greater than 80% or greater than 90%) of arriving at the sending location. In examples where an acknowledgement is sent over a less reliable communications channel, it is considered, for the purpose of this application, as if no acknowledgment was sent.

Eager Decoding

In some embodiments, a packet is encoded using a dictionary determined from a plurality of packets. When this packet arrives on the receiving end, one or more of these plurality of packets may not have arrived. The present inventors are not disclosing for the first time whereby an attempt is made to decode a given packet, notwithstanding the fact that historical packets associated with a dictionary of the "given" packet have not yet been received. It is possible that the missing packets will not be required, and thus, by attempting to "eagerly" decode the given packet, it is possible to reduce decoding latencies. In the event that the missing packet(s) is indeed required, a failure may be detected, and then decoding may be attempted at a later time after the missing packet(s) is received.

Although eager decoding may be used in the context of DDC or any other "sequence gap" technique, this technique also applies to the particular case of streaming compression.

The DDC Algorithms—Descriptions of Non-Limiting Examples

The DDC algorithms are a combination of BDDC and stateless compression. The purpose of these algorithms is to ensure that the compression ratio of DDC does not become worse than that of stateless compression. This may happen in small files, since once the FIFO queue is large and the stream is short, the phrases in the queue do not have a chance to enter the dictionary. Therefore the BDDC method is good for long streams.

Two exemplary alternative algorithms for DDC are described herein, though it is appreciated that there are many alternatives:

DDC-min Each packet is compressed twice-every packet is compressed by the BDDC dictionary and also by the stateless dictionary. The output packet's length will be the minimum between the uncompressed length, the stateless compressed length, and the BDDC compressed length. Since we use the stateless dictionary, the compression ratio will be at least as good as the stateless compression ratio. When the decoder receives such a packet, it has the same DDC dictionary. The decoder will reconstruct the required phrases from the compressed packet. Note that one of the options of the minimum is uncompressed length. This is useful for implementation of an adaptive compression algorithm that identifies the compressibility of the traffic along a session (e.g. when traffic is encrypted or compressed).

Although not a limitation, the DDC-min algorithm may be useful for situations recommended to when the encoder machine has a plurality of CPUs. Since the stateless compression of the packet and the BDDC compression of the packet are independent, each compression method can be executed separately in parallel with a separate task running on a separate CPU.

DDC-Union Each packet is compressed with a dictionary which is the union of the current BDDC dictionary and the stateless dictionary to be created from this packet during compression. When packet $P_i$ is encoded, a matching BDDC dictionary exists. Its state can be regarded as $DBDDC_i$. The dictionary $DBDDC_i$ is a function of phrases taken from the packets $1 \ldots i-\Delta-1$. This appears in Equation 5.

$$D_{BDDC_i} = D(1 \ldots i-\Delta-1) \quad (5)$$

We can also say that when a packet Pi is encoded with DDC-Union, the DDC-Union dictionary is at state i. The dictionary $D_{DDC-UNION_i}$ is a union of the current BDDC dictionary, and the current stateless dictionary, which is achieved when $P_i$ is compressed with stateless compression. This appears in Equation 6.

$$D_{DDC-UNION_i} = D_{BDDC_i} \cup D_{stateless_i}$$

In order to implement the DDC-Union algorithm we need to maintain the states of the $D_{DDC-UNION_i}$ dictionary. In particular we need to be able to move from one state to its successive state. In order to do so, we need to maintain the BDDC dictionary, and unionize it with the current stateless dictionary created when packet i is encoded with stateless compression. This can be simplified, when a packet is encoded with DDC-Union, we add the new phrases from the current packet, if they did not exist in the BDDC dictionary, to a unionized dictionary. In order to move on to the next iteration, we need to "roll-back" from the current DDC-Union dictionary to the BDDC dictionary. It is noted that the "roll-back" implementation described is only one implementation of the DDC-union technique, and that other implementations are contemplated.

Figure 19:
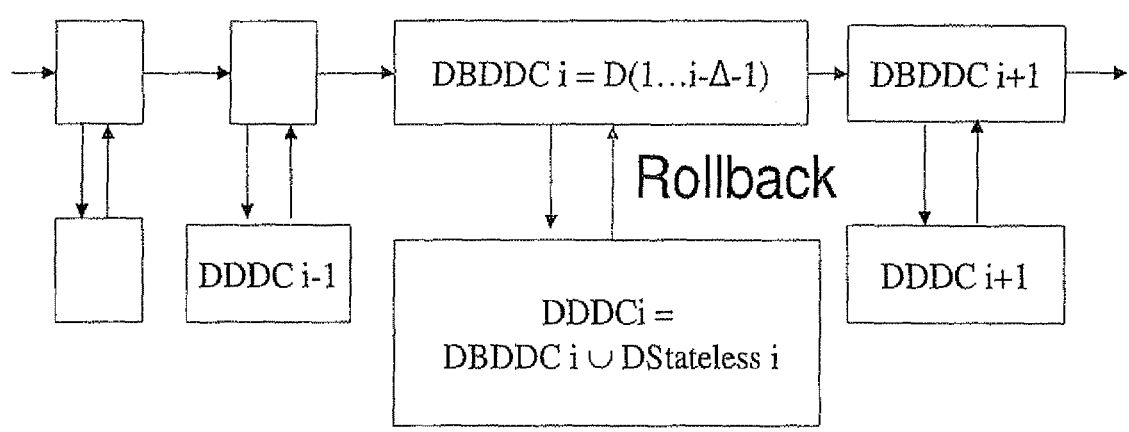
FIG. 19 illustrates exemplary DDC-Union dictionary states.

This method is depicted in FIG. 19. FIG. 19 illustrates DDC-Union dictionary states. According to the example of FIG. 17, when packet i is encoded with DDC-BDDC, the BDDC dictionary is in state i. Also when packet i is encoded with DDC-Union, the appropriate DDC-Union dictionary is at state i. For the implementation of DDC-Union dictionary, when packet i is encoded, we need to maintain a BDDC-Dictionary, and to unionize it with the stateless dictionary created from the compression of packet i. In order to move on to the next iteration, we need to "roll-back" from the current DDC-Union dictionary to the current BDDC dictionary.

For the implementation of DDC-Union roll-back stage we use the following method which is good for any dictionary type. We maintain two dictionaries: BDDC dictionary and stateless dictionary. When packet i is encoded the encoder has a BDDC dictionary which is at state i, or $DBDDC_i$. The encoder creates an empty stateless dictionary called $Dstateless_i$. The index of the first phrase in dictionary $Dstateless_i$ will be the index of the last phrase in the dictionary $DBDDC_i$ plus 1. During encoding of packet i, if (phrase x is not in $DBDDC_i$) and (phrase x is not in $Dstateless_i$) it will be added to $Dstateless_i$. This addition rule ensures that phrase x will be added only if it does not exist in the original dictionary $DBDDC_i$. New phrases will be written only to $Dstateless_i$. After the encoding is completed, all the new phrases (in $Dstateless_i$) will be freed and $DBDDC_i$ will remain as it was, ready for the next iteration. This "naive" implementation is depicted in FIG. 20.

Figure 20:
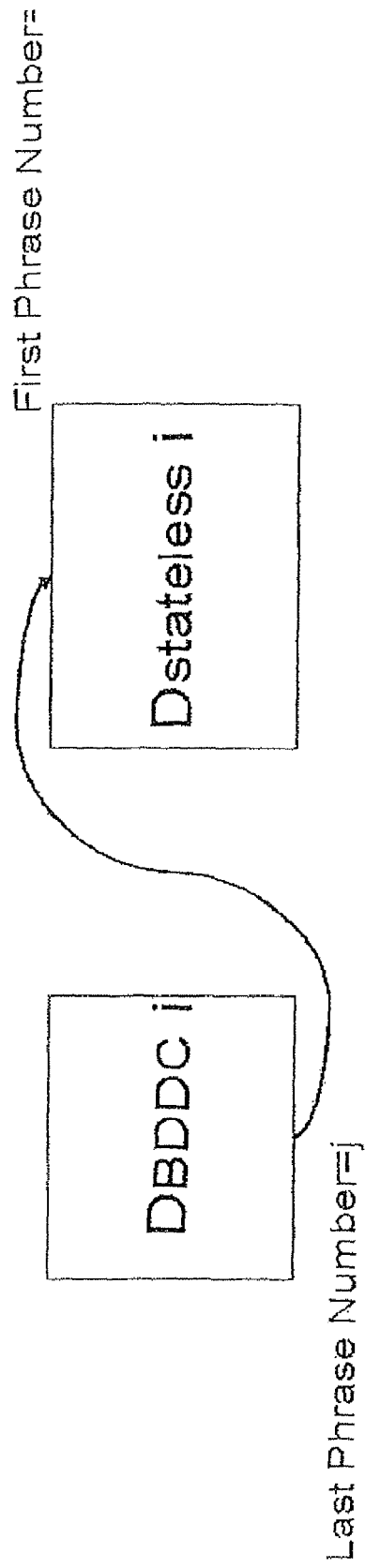
FIG. 20 illustrates an exemplary Naive implementation of DDC-Union.

Thus, according to FIG. 20, for the implementation of DDC-Union rollback stage we use the following method which is good for any dictionary type. We maintain two dictionaries: BDDC dictionary and stateless dictionary. When packet i is encoded the encoder has a BDDC dictionary which is at state i. The encoder creates an empty stateless dictionary. The index of the first phrase in stateless dictionary will be the index of the last phrase in the BDDC dictionary plus 1. During encoding of packet i, if phrase x is not in neither of the dictionaries, it will be added to stateless dictionary. This addition rule ensures that phrase x will be added only if it does not exist in the original BDDC dictionary. New phrases will be written only to the stateless dictionary. After the encoding, all the new phrases (in the stateless dictionary) will be freed and the BDDC dictionary will remain as it was, ready for the next iteration.

Another Example—Graph Based Implementation

We present an efficient method which is suitable for graph based dictionary implementations, which are the most popular ones. It is appreciated that this is just one exemplary non-limiting implementation, and other implementations are contemplated. Each node in the BDDC dictionary, is duplicated to contain two parts. The first part contains all the BDDC information that the original dictionary contained. The second part is the DDC part. The information that this part contains, is the new information (e.g. pointers to phrases) that may be generated due to compression of the current packet. This duplication is depicted in FIG. 21.

Figure 21:
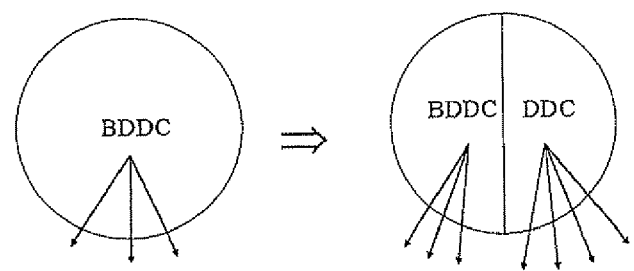
FIG. 21 illustrates an exemplary Node duplication for the DDC-Union implementation.

Thus as shown in the example of FIG. 21, for the implementation of DDC-Union roll-back stage we use the following method which is good for graph based dictionaries. Each node in the BDDC dictionary, is duplicated to contain two parts. The first part contains all the BDDC information that the original dictionary contained. The second part is the DDC part. The information that this part contains is the new information (e.g. pointers to phrases) that may be generated due to compression of the current packet.

For every packet, we encode the current packet, and add the phrases derived from it only to the DDC part of the relevant nodes, and also add the new phrases to the FIFO queue. When encoding of the current packet is finished, all the new phrases may be removed from the dictionary, thus we obtain the original BDDC dictionary, which is ready for the next iteration. We have to maintain a pointers list. Each pointer points to a node that was extended by a non empty suffix of a phrase. When encoding is completed, we can free the extra nodes according to this pointers list.

Figure 22:
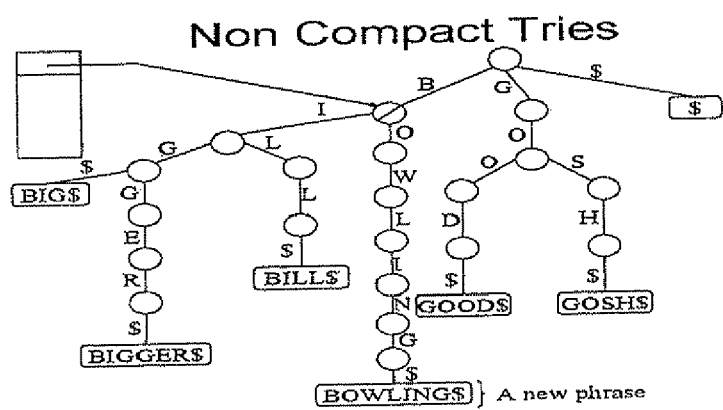
FIG. 22 illustrates an exemplary Non-compact trie dictionary implementation.

Suppose that the dictionary is implemented with a non-compact trie (see FIG. 22). The original trie contained BIG, BIGGER, BILL, GOOD, GOSH. The new trie with duplicated nodes, contains the phrase BOWLING in addition to all the other phrases. By using the pointer, we are able to free the suffix OWLING.

Figure 23:
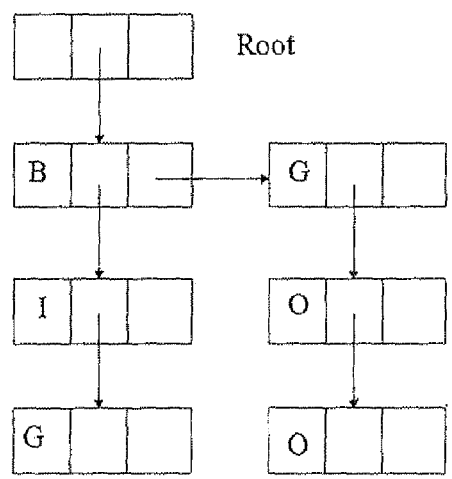
FIG. 23 illustrates an exemplary linked lists implementation of a trie.
Figure 24:
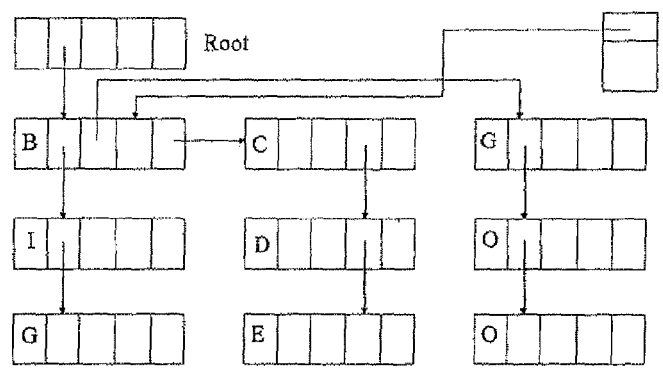
FIG. 24 illustrates an exemplary linked lists implementation of a trie with splitted nodes.

A trie can be implemented by using linked lists as depicted in FIG. 23. Each node in this trie contains a "down" pointer and a "right" pointer. The trie in FIG. 23 contains the phrases BIG and GOO. When using the suggested method on this implementation of a trie, each node now has two additional pointer. We also maintain a pointers list pointing to each new phrase. The same trie with a new phrase CDE derived from a new packet is depicted in FIG. 24. A pointers list points to the new CDE phrase, which will be used to release this phrase when encoding of the current packet is completed.

Thus, FIG. 24 depicts an exemplary linked lists implementation of a trie with splitted nodes. According to the example of FIG. 24, the original trie contains two phrases: BIG and GOO. The new trie with the splitted nodes also contains the phrase CDE. A pointers list points to the new CDE phrase, which will be used to release this phrase when encoding of the current packet is completed.

A trie can be also be implemented by using an array of pointers. Suppose the alpha-bet is A . . . Z. Then, every array cell, i.e. node, has |{A . . . Z}|=26 entries, each can contain either NIL or a pointer to another node. When using the suggested method, each node now has 262 pointers, as depicted in FIG. 25.

Figure 25:
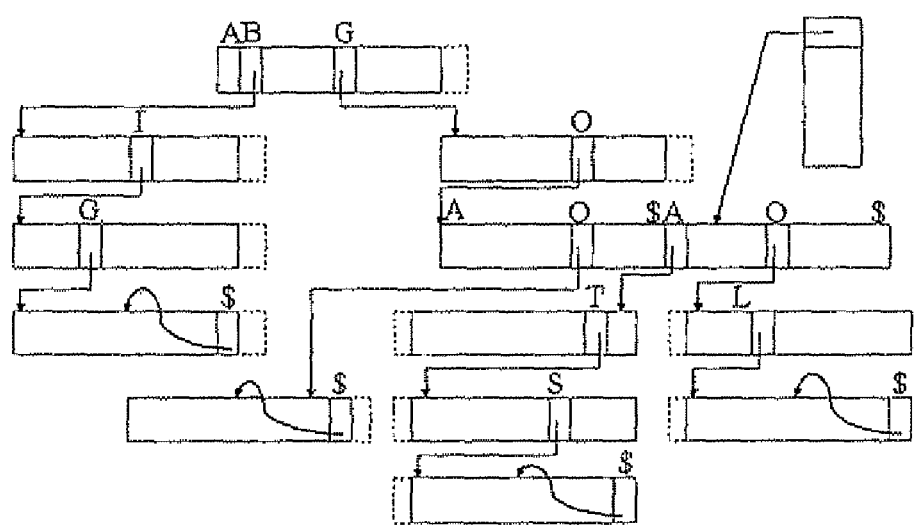
FIG. 25 illustrates an exemplary array cells implementation of a trie with splitted nodes.

Thus, FIG. 25 depicts an example of a cells implementation of a trie with splitted node. In this implementation of a trie, each node is an array of pointers. The phrases in the original trie are BIG and GOO. The enhanced trie also contains GOATS and GOOL. Again, a pointer is used for releasing the new phrases.

Figure 26:
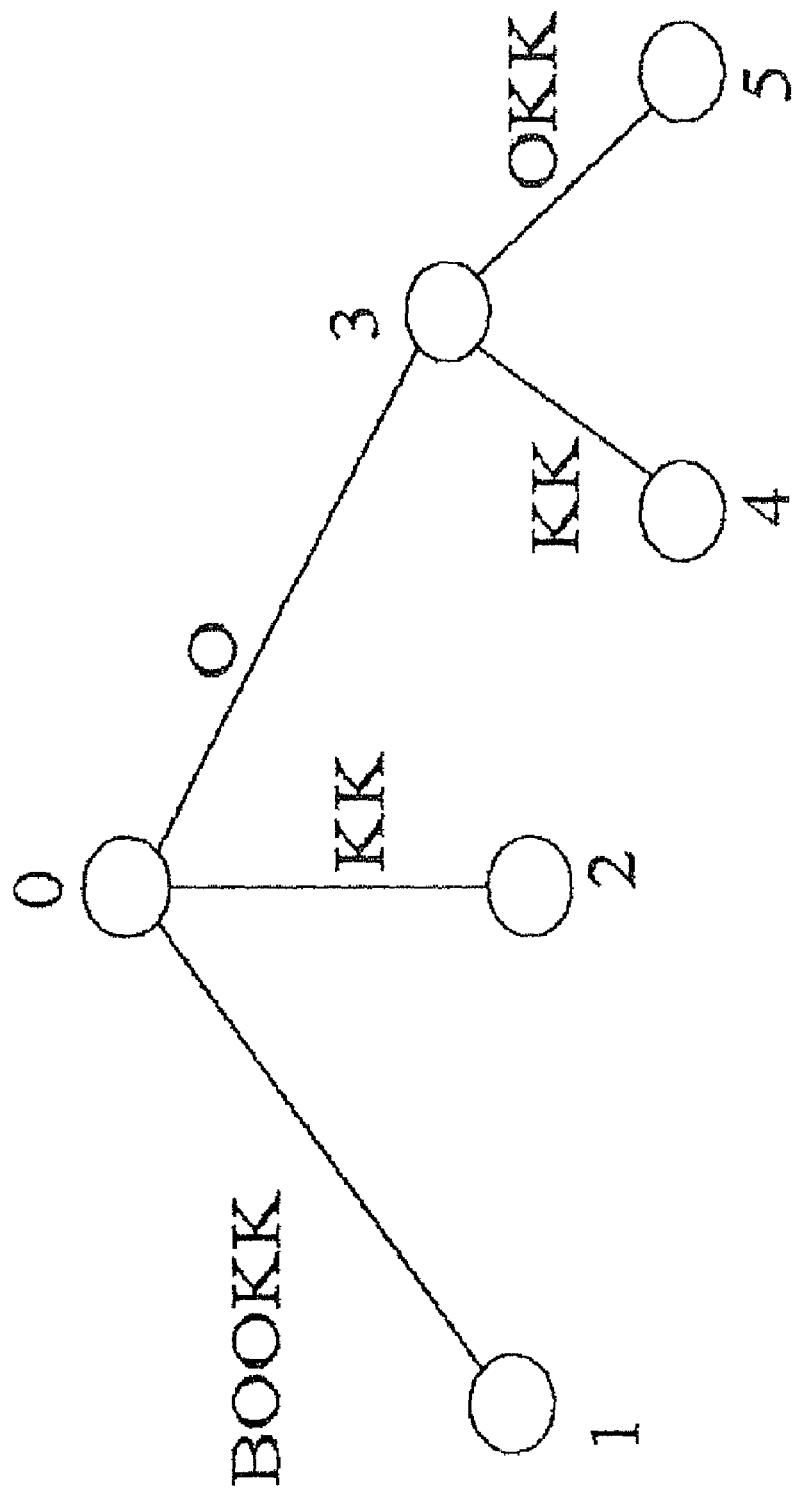
FIG. 26 illustrates an exemplary suffix tree implementation of a dictionary.
Figure 27:
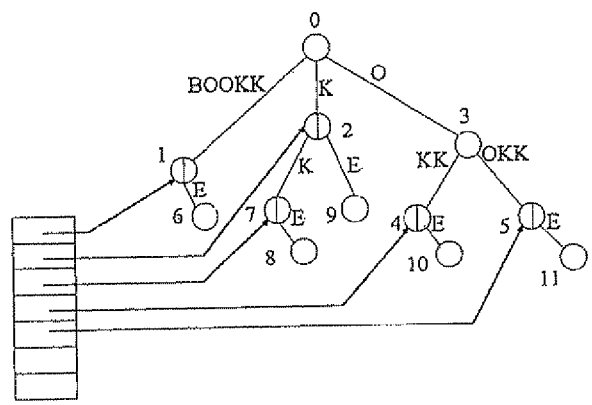
FIG. 27 illustrates an exemplary suffix tree implementation of a dictionary.

Another implementation of a dictionary can be obtained by using a suffix tree, see FIG. 26. Suppose that the current compressed packet contains the phrase BOOKKE. In this case we have to temporarily extend the suffix tree with E, as depicted in FIG. 27. In some places, the paths to the leaves were not reduced, since these leaves are going to be released after compression of the current packet.

Thus, FIG. 26 illustrates an example of a suffix tree implementation of a dictionary. This suffix tree contains the phrase BOOKK.

Thus, FIG. 27 illustrates an example of a suffix tree implementation of a dictionary extended with E. The original suffix tree contains the phrase BOOKK. The enhanced suffix tree was enhanced by E.

The final exemplary implementation of a dictionary described in this section is by using the Karp-Rabin Fingerprint data structure, which is used in the FP-LZW algorithm, as described in [24]. The Fingerprint was implemented by using a Hash. In every node that needs to be extended, we use the DDC part of the node. The Fingerprint extension is depicted in FIG. 28.

Figure 28:
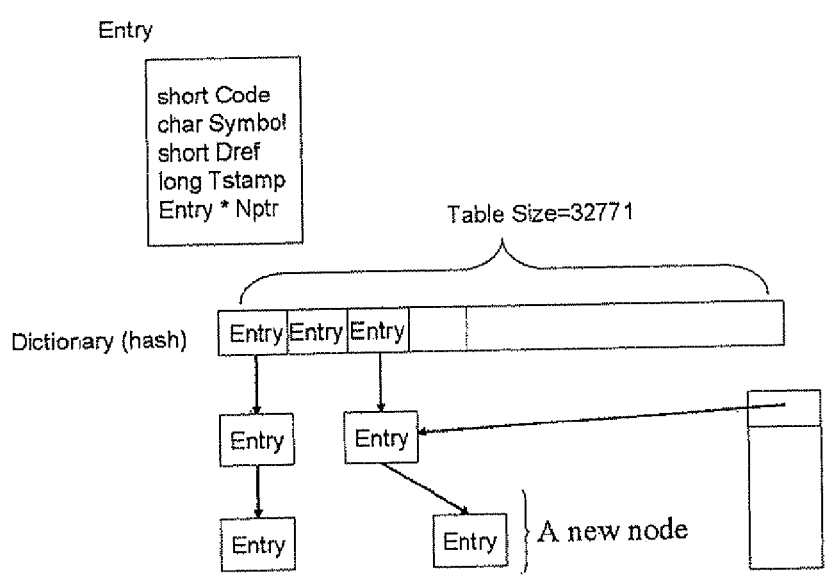
FIG. 28 illustrates an exemplary Karp-Rabin Fingerprint implementation of a dictionary.

Thus, FIG. 28 provides an illustration of an exemplary Karp-Rabin Fingerprint implementation of a dictionary. Each node in the hash has two pointers, unlike the original implementation of FP-LZW where such data structure was used.

At the decoder, if during decoding time of packet i new phrases "emerge" from the compressed packet, then these phrases can be stored as strings, to be added later to the BDDC dictionary after all previous packets have arrived. However, we can also keep the compressed packet and send it to the decoding function again before insertion to the BDDC dictionary, which is more modest memory wise.

The DDC-Union algorithm is recommended to be used when the encoder machine has a single CPU, since unlike DDC-min this algorithm is sequential.

Waiting Packets Data Structure

Since some packets in the DDC algorithm may not be decoded immediately, we need to store them in a waiting packets data structure. When a new packet is received, waiting packets should be decoded accordingly.

Figure 29:
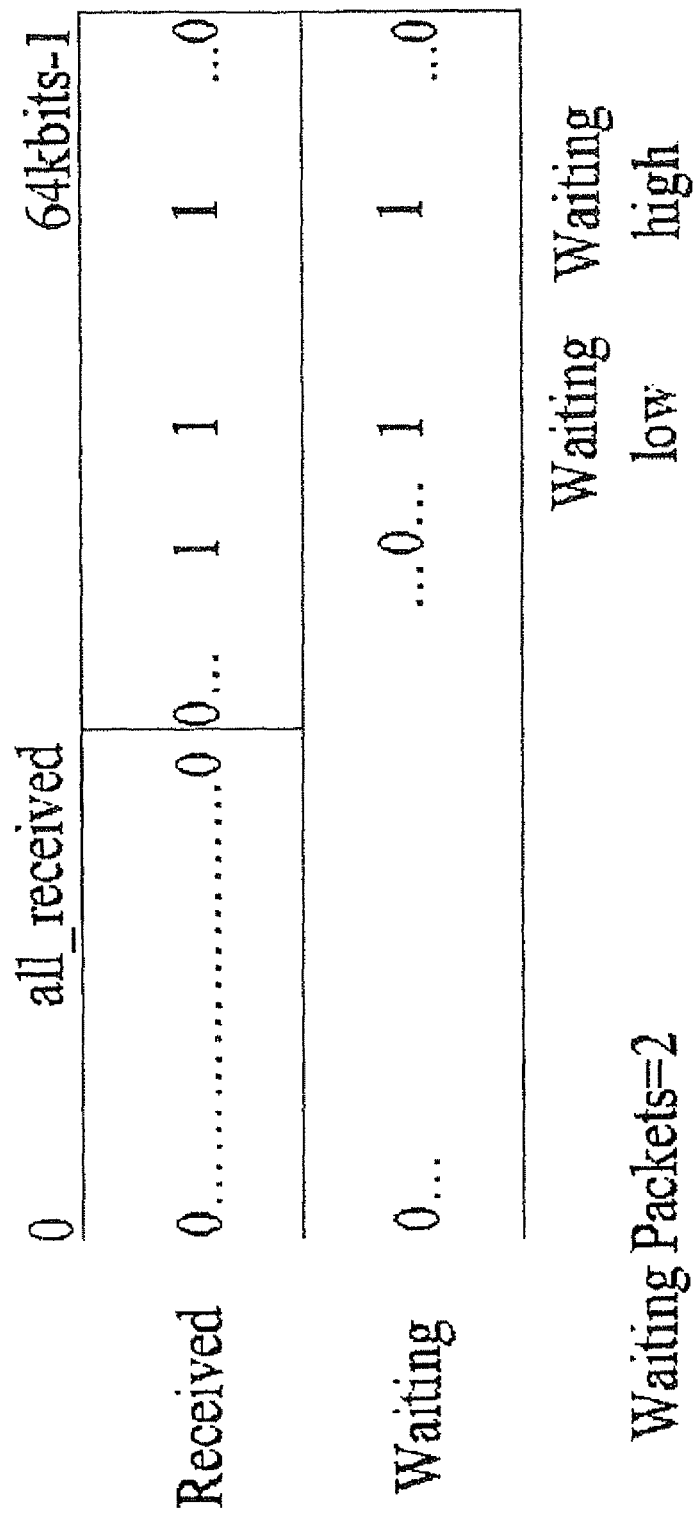
FIG. 29 illustrates an exemplary waiting packets data structure.

The data structure used to implement the waiting packets list is good for any standard protocol, i.e. protocols that use 2 or 4 bytes for serial numbers. Let us assume that the protocol uses 4 bytes for serial numbers. The basic assumption that the transmission window is no longer than 64 k packets which is true for all protocols. The waiting packets data structure is depicted in FIG. 29.

We use a 64 kbits two dimensional array. The first dimension is for the received packets. For every received packet i we assign bit i mod 64 k with 1. We also used a variable called all_received, which indicates what is the range of all the consecutive packets that were received by the decoder. After every iteration, we check if we can increase the value all_received, by poking into the next bit of the received array. When this variable is increased, we assign all_received mod 64 k with 0. This ensures that in case of a wraparound, we can still notice which packets have been received. The variable all_received is increased by 1, mod 64 k. The second dimension is the waiting packets dimension. When ever a packet i is received, and cannot be decoded, we assign 1 in place i mod 64 k, at the waiting dimension. When packet i is received, we seek for waiting packets, in the range indicated by waiting low and waiting high.

Addressing an Inherent Initialization Problem

All the algorithms described in this section must address an inherent problem: many dictionaries re-initialize themselves when they reach their maximal capacity. This may cause decoding problems: the decoder may receive a packet, so that all the phrases that are needed for decoding are not in the dictionary of the decoder anymore, due to re-initialization of the decoder's dictionary.

To address this problem we can maintain two dictionaries in the decoder: current dictionary and previous dictionary. Previous is the dictionary before re-initialization and current is the dictionary after re-initialization. If a decoded packet requires phrases from the previous dictionary due to the network propagation delay, the decoder will simply use the previous dictionary.

The required buffer size for the dictionary is twice than the required buffer size in streaming compression, due to the dictionary re-initialization problem. The buffer required for storing pending packets at the decoder is smaller by a factor of Δ compared to streaming compression.

Exemplary Scenarios where Compression and/or Encoding and/or Decoding According to Various Teachings of the Present Invention may be Useful In this section, certain scenarios exemplary scenarios where compression and/or encoding and/or decoding according to one or more teachings of the present invention may be useful. It is stressed that these are just non-limiting examples, and that teachings of the present invention certainly apply to many scenarios other than those disclosed herein.

Certain teachings of the present invention may be useful in latency critical applications, especially when the compression is in the network processor, and not in the application. If the application is unknown we cannot assume anything about the latency requirements of the application, and therefore streaming is unacceptable. If the latency is not important (which means that we have information about the application) we may consider using streaming or even concatenate packets and use off-line compression.

Certain teachings of the present invention may have an advantage over streaming when the order of the packets is not required. If packet drops are allowed by the application, we can use a technique disclosed herein and add a retransmission mechanism for dictionary update purposes. Choosing a dictionary delay of $\Delta \geqq 2RTT$ may ensure an immediate decoding in practical terms. We assume that a dropped packet will reach its destination after a retransmission. We also assume that the timer in the retransmission mechanism expires after 2RTT. This assumption means that the time from the point that a packet drop was detected by the decoder, until the time it was received at the decoder after a retransmission is exactly 2RTT. Let us assume $\Delta \geqq 2RTT$. Let Pi be a packet that has been received by the decoder. Pi was compressed by using a history which depends only on packets that were received by the decoder at least 2RTT ago. When Pi is received by the decoder all the packets that Pi depends on were already received by the decoder. If one of these packets was dropped, it had enough time for a retransmission according to the assumptions. Such packets have arrived to the decoder before Pi was received by the decoder.

In some embodiments, one dictionary for all the connections between the two ends are used. In case of web traffic, may be is worth while to keep one dictionary, and not create a different dictionary for every separate connection, since there is an inherent redundancy across several different connections, as shown by Spring and Wetherall in [32]. This may be application dependent, therefore in some applications a different dictionary should be created for every connection.

By using the results of our measurements and a simple arithmetic calculation, it can easily be shown that certain teachings of the present invention including but not limited to DDC are good for low to medium speed links. When using high speed communication links there is not much point in data compression. In a fast line it is better to send the information as is, since the time required for compression, transmission, and decompression will be longer than just transmitting it, within a high probability.

Software Architecture for One Exemplary Implementation

In this section we describe a dictionary based compression framework for packets and buffers. It is appreciated that the teachings of the present invention are not limited to the presently described implementation, and that other implementations are within the scope of the present invention.

We present the architecture and implementation of the framework. The framework allows compression of buffers, files, packets, and can be used as a software layer for off-line and on-line purposes. For networking purposes, the framework supports stateless compression, streaming compression, the various variants of DDC (e.g. Basic DDC, DDC itself, Confirmed-Dictionary Compression), and other selective methods of dictionary update. The framework allows scalability in creating new methods of compression. The framework was implemented in standard c++, thus it can be ported to any OS or hardware architecture immediately. It is appreciated that other languages other than C++ (including but not limited to C, Java, assembler, machine language, .NET, etc) are also appropriate.

This software architecture was used in the various implementations of the DDC methods. The implementation is based on a flexible framework, whose architecture allows for various variants of dictionary-compression implementations.

For the implementation of the delay we use a multi purpose FIFO queue as a data structure which uses real packet structures, or empty dummy packet structures. Each packet structure contains another FIFO queue which stores all the dictionary phrases which were created due to the compression of the packet.

Figure 30:
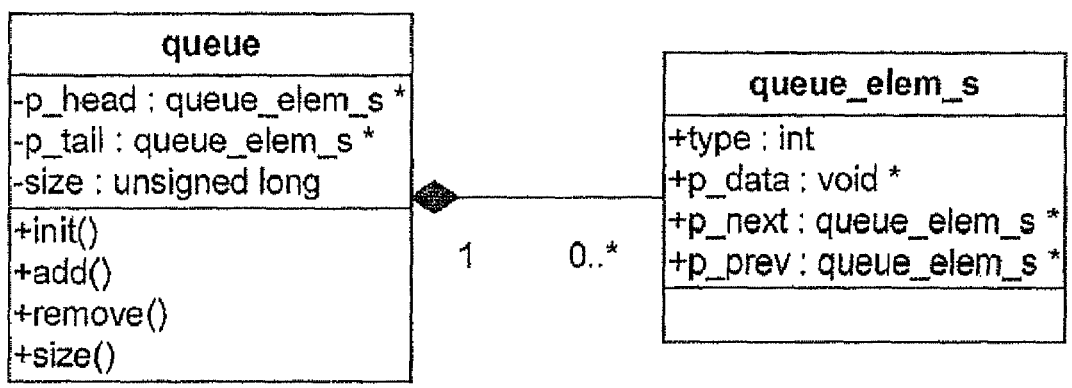
FIG. 30 illustrates an exemplary multi purpose FIFO queue.
Figure 31:
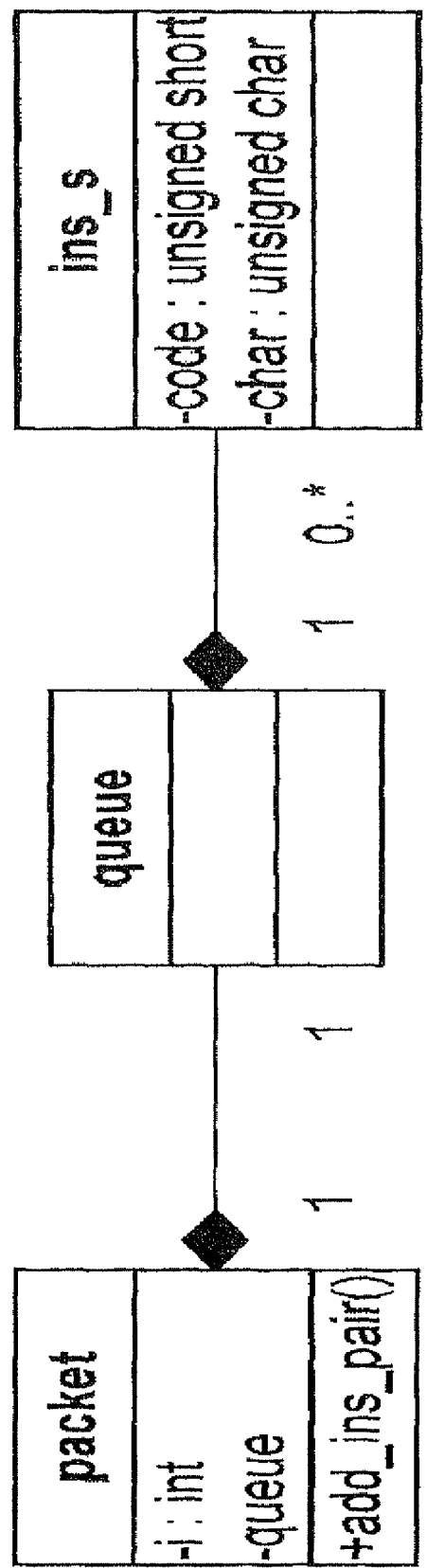
FIG. 31 illustrates an exemplary packet class.

FIG. 30 illustrates A multi purpose FIFO queue. The queue contains queue element structures which may have different types.

The FIFO queue is depicted in FIG. 30. The queue contains queue_elem_s structures which can have different types. The packet class contains a FIFO queue for storing dictionary elements. Each element (which is a valid queue element) is called ins_s. When DDC encodes a packet and encounters a new phrase, it stores it in such a ins_s structure, and adds it to the FIFO queue of the packet object.

We can assume that each dictionary based compression algorithm has a conceptual InsertPhraseToDictionary function. This function was replaced with another function that inserts a packet queue element to the dictionary. The main FIFO queue is initialized with delay dummy packets in order to immediately start the encoding with a delay. Each time we insert a packet structure to the queue we also extract a packet structure from the queue and insert all the phrases in it to the dictionary. The internal structure of the encoder (resp. decoder) appears in FIG. 16. The general structure of the encoder in DDC is similar to the structure of the encoder of streaming, except for the FIFO queue. The decoder has some other data structures to be described later on. The non-dummy packet structures maintain a list of phrases that are about to enter the dictionary. In streaming compression the dictionary is a function of all prior packets and the current packet, while in DDC it is a function of all the packets prior to the last preceding $\Delta$ packets. However, in stateless compression the dictionary is only a function of the current packet.

Figure 32:
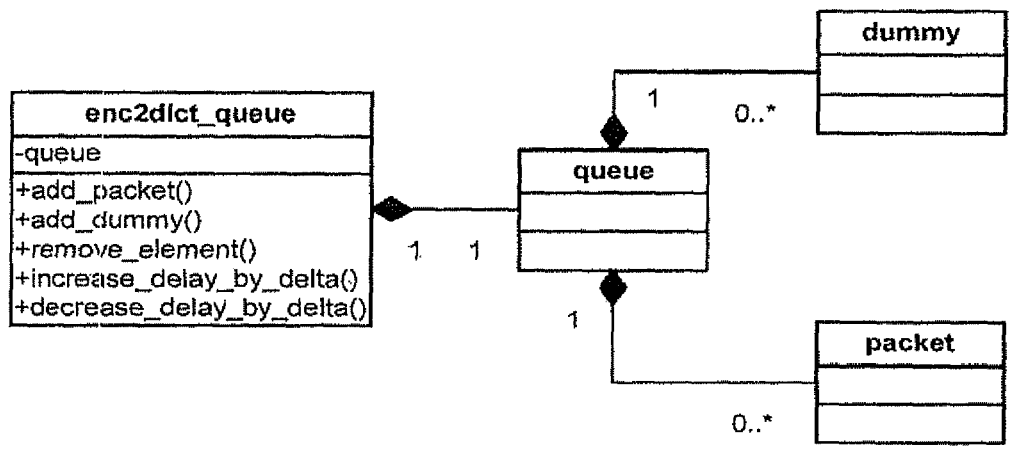
FIG. 32 illustrates an exemplary encoder to Dictionary queue.

The FIFO queue that connects the encoder and the dictionary is depicted in FIG. 32. Each time that encoding of a packet is finished, a packet structure is added to this queue, a packet structure (perhaps dummy) is removed from the queue, and its elements are added into the dictionary.

Figure 33:
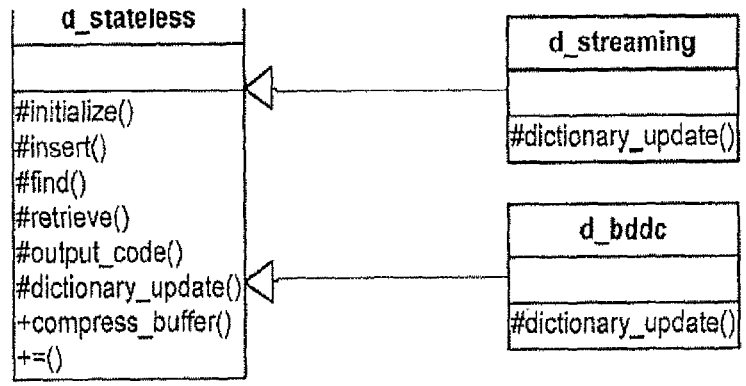
FIG. 33 illustrates an exemplary dictionaries classes hierarchy.

For the implementation of the dictionary we had to convert an existing c language implementation [29] to an object oriented c++ implementation. We created a base class that implements a stateless dictionary which is useful to compress a single packet. A derived class implemented the BDDC method. We used a virtual function called dictionary_update. In the case of stateless compression, this function added phrases immediately to the dictionary. In case of BDDC the function added an ins_s pair to the relevant packet object. Both classes implement a compress_buffer( ) function. The description is depicted in FIG. 33. Note that the DDC dictionary can be easily implemented by using a combination of the two classes by using a minimum of the results of the compression by using the two dictionaries.

Note that the use of the function compress_buffer( ) allows to use framework as a software compression layer. For example, we can first use the Burrows-Wheeler Transform (BWT) [13], and then call compress_buffer( ) with a pointer to the output of BWT.

We describe one implementation of the BDDC-LZW algorithm: At first we allocate a BDDC dictionary. According to this particular implementation, the dictionary is initialized to $\Delta$ dummy elements. Every new uncompressed packet is compressed with the BDDC dictionary. If the new length is indeed shorter than the original length, the compressed packet is transmitted. After transmission all the new dictionary phrases, known as pairs, are added to the dictionary. Since the queue was initialized to $\Delta$, the new phrases will be added to the dictionary in a delay of $\Delta$ packets.

The DDC-LZW-min is similar to the previous algorithm. However, at each phase, the algorithm calculates the minimum between the original uncompressed packet length, the length of the packet compressed with stateless compression, and the length of the packet compressed with BDDC. The algorithm transmits the packet with the shortest length among all three possibilities.

Experiments

In this section we describe the experience and experimental results of the present inventors using the non-limiting compression framework. For all the experiments we used software written in c++, using the Linux OS. For the compression ratio experiments we used local Linux machines. Appropriate encoders were implemented for this purpose. For the decoding latency experiments we used hundreds of remote nodes over the internet of the Linux based Planet-Lab [8] testbed, which is suitable for networking measurements.

Compression Ratio vs. Dictionary Delay

The algorithm we chose for the experiment is FP-LZW. As we mentioned earlier, there is a conceptual separation between the parsing process and the dictionary update process. The implementation of FP-LZW explicitly gives this separation, and is very convenient for modifications [24].

For the measurements we used a concatenation of the 18 Calgary corpus files [10]. In order to avoid a deviation in our measurements we assumed an incoming header size of 20 bytes, which is relatively large. The outgoing header size is 24 bytes (original header size+our additional 4 bytes).

Figure 34:
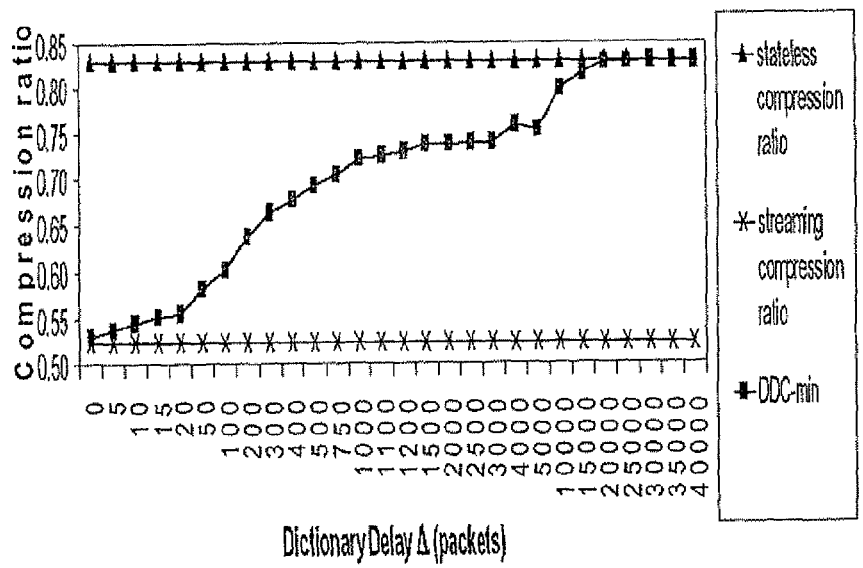
FIG. 34 The experimentally measured traffic compression ratio of DDC-min as a function of the dictionary delay in packets, compared to other compression ratios (small packets).
Figure 35:
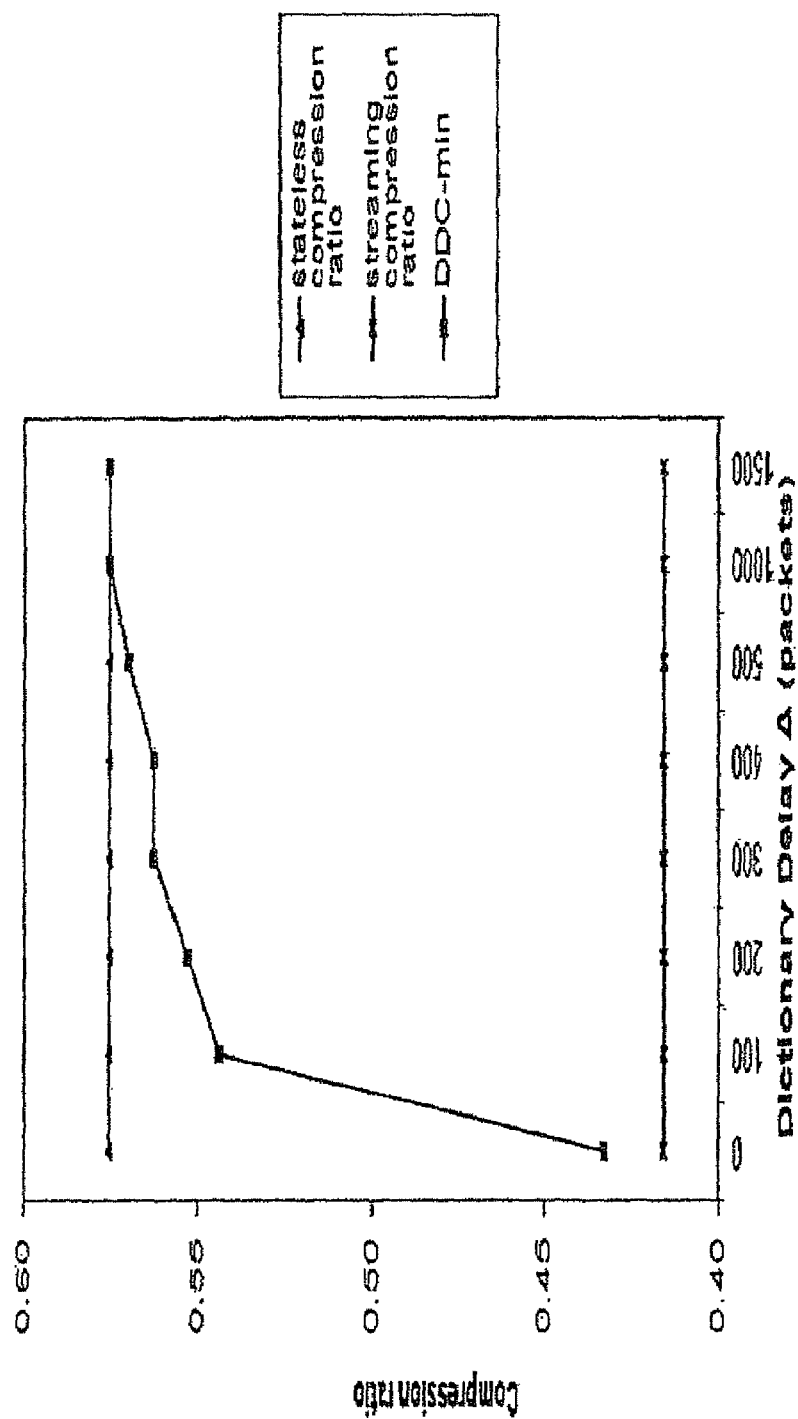
FIG. 35 The experimentally measured traffic compression ratio of DDC-min as a function of the dictionary delay in packets, compared to other compression ratios (large packets).

A description of the traffic compression ratio for each delay value for the case of DDC-min is given in FIGS. 34 and 35.

FIG. 34 illustrates the traffic compression ratio of DDC-min as a function of the dictionary delay in packets, compared to stateless traffic compression ratio and to streaming traffic compression ratio (small packets)—The traffic compression ratio for streaming compression is very close to the DDC-min traffic compression ratio with zero dictionary delay. The data file in use is the concatenation of 18 Calgary corpus files, |Header|=20, |Payload|=125. The traffic compression ratio of DDC is at least as good as the one of stateless compression. DDC-min obtains a traffic compression ratio better than the one of stateless compression even for large dictionary delays, of up to 40,000 packets.

FIG. 35 illustrates the traffic compression ratio of DDC-min as a function of the dictionary delay in packets, compared to stateless traffic compression ratio and to streaming traffic compression ratio (large packets)—The data file in use is the concatenation of 18 Calgary corpus files, |Header|=20, |Payload|=1500. The traffic compression ratio of DDC is at least as good as the one of stateless compression. DDC-min obtains a traffic compression ratio better than the one of stateless compression for dictionary delays of up to 1500 packets.

Two main cases are presented: a payload of 125 bytes and 1500 bytes. Our results show that a significant improvement is achieved, even with a large dictionary delay, which is considerably better than the result of thwack shown in [15]. For example, let us consider the case of small packets where $\Delta=15$. Let $\text{Deflate}_{streaming}$ (resp. $\text{FP-LZW}_{streaming}$) be the streaming version of Deflate (resp. FP-LZW). The ratio $$\frac{r_{Deflate,thwack}}{r_{deflate,Deflate_{streaming}}}$$

is approximately 1.5, which means that there is still more room for improvement. However, in DDC the ratio is $$\frac{r_{FP-LZW,DDC}}{r_{FP-LZW,FP-LZW_{STREAMING}}}$$

only 1.04, i.e. DDC is very close to streaming. In addition, the measurements in [15] assume a zero length header which is not practical, and causes the compression ratio to become better.

For large packets, we also receive a good improvement. The DDC-min method is good for a dictionary delay of up to 1500 packets. As shown earlier in FIG. 9, for a larger payload, there is a better compression ratio.

The BDDC compression ratio measurement used a program that read fragments from a file. The program allocated once the d_bddc object. Each fragment that was read from the input file was given to the compress_buffer( ) function.

In order to measure the DDC algorithm, we created a main program that read fragments from a file, which simulated the data of the packets. The program allocated once a single object of d_bddc, and also a new d_stateless object (stateless dictionary) in each iteration (it was released after the compressed of the packet was finished). By choosing the minimum of the compressed length returned from the two objects, we obtained the DDC method.

Decoding Latency vs. Dictionary Delay

Real network experiments were conducted to measure the packet drop probability, packet reordering probability and the improvement of Ldec of BDDC over streaming compression. In all the experiments we used hundreds of nodes over the internet of the Linux OS based Planet-Lab testbed [8] which is good for networking measurements. We used a concatenation of 18 Calgary corpus [10] files, which has a total size of 3.25M bytes. We broke the concatenated files to fragments of 125 bytes and transmitted them with UDP [27] to 269 different Planet-Lab nodes in different geographical positions all over the world. In each transmission there were 26,012 packets. The transmission rate was 6 k bytes of data per second.

The first experiment measured the packet drop probability, which for all the measurements is 1.27%, or alternatively each packet will reach its destination in a probability of 98.73%. The variance is 0.002. These results suggest that in case the packet has been dropped, it will reach its destination after a single retransmission within a very high probability. Packet drops at the internet was also studied by Borella [12].

The packet reordering probability, without using retransmissions (due to change of paths, etc.), was negligible. It happened only in 137 packets out of a total of 7M packets. When retransmissions were used the packet reordering probability was increased to 0.008. The packet reordering probability was also studied by Bellardo [11].

In order to measure the packet drop probability and packet reordering probability of streaming compression and DDC, we had to implement two processes. The first process sent uncompressed packets by a UDP client which was part of the process. The second process was a UDP server, that contained a statistical calculator, for the calculation of packet drops probability and packet reordering probability. The calculation was based on serial numbers inside the UDP packets.

The first process contained the main program, that used the previous compression measurements programs, and also a UDP client, so it would be able to transmit the compressed packets. The second process contained a UDP server that recorded the serial numbers of the received packets. We signalled the end of the transmission by sending an empty UDP packet 3 times. By recording the serial numbers, we were able to calculate the packet drop probability and packet reordering probability, off-line, for stateless compression and for DDC.

Figure 36:
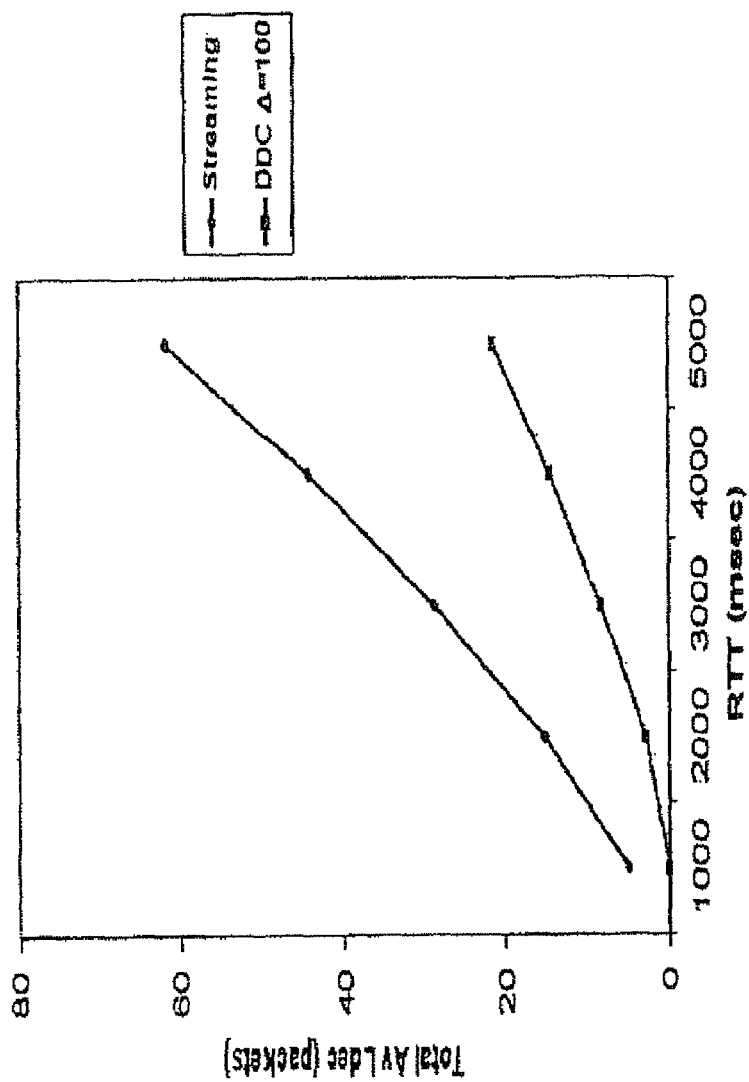
FIG. 36 provides a graph illustrating the total average decoding latency according to some experiments.

The goal of the second experiment was to compare $\overline{L_{dec}}$ of streaming compression vs. Ldec of BDDC. The measurements were for various round trip times of 1000 ... 5000 msec. The total average $\overline{L_{dec}}$ of streaming compression and BDDC with Δ=100 as a function of the round trip time is depicted in FIG. 36. This is a total average of all the averages derived from all the 269 transmissions. The total average $L_{dec}$ of BDDC is smaller than that of streaming.

FIG. 36 provides a graph of the total average $L_{dec}$ (i.e. the total average decoding latency) of streaming compression and BDDC with a dictionary delay of Δ=100, over all the 269 Planet-Lab transmissions for various round trip times of 1000 ... 5000 msec. The total average $L_{dec}$ of BDDC is strictly better (smaller) than that of streaming compression.

Figure 37:
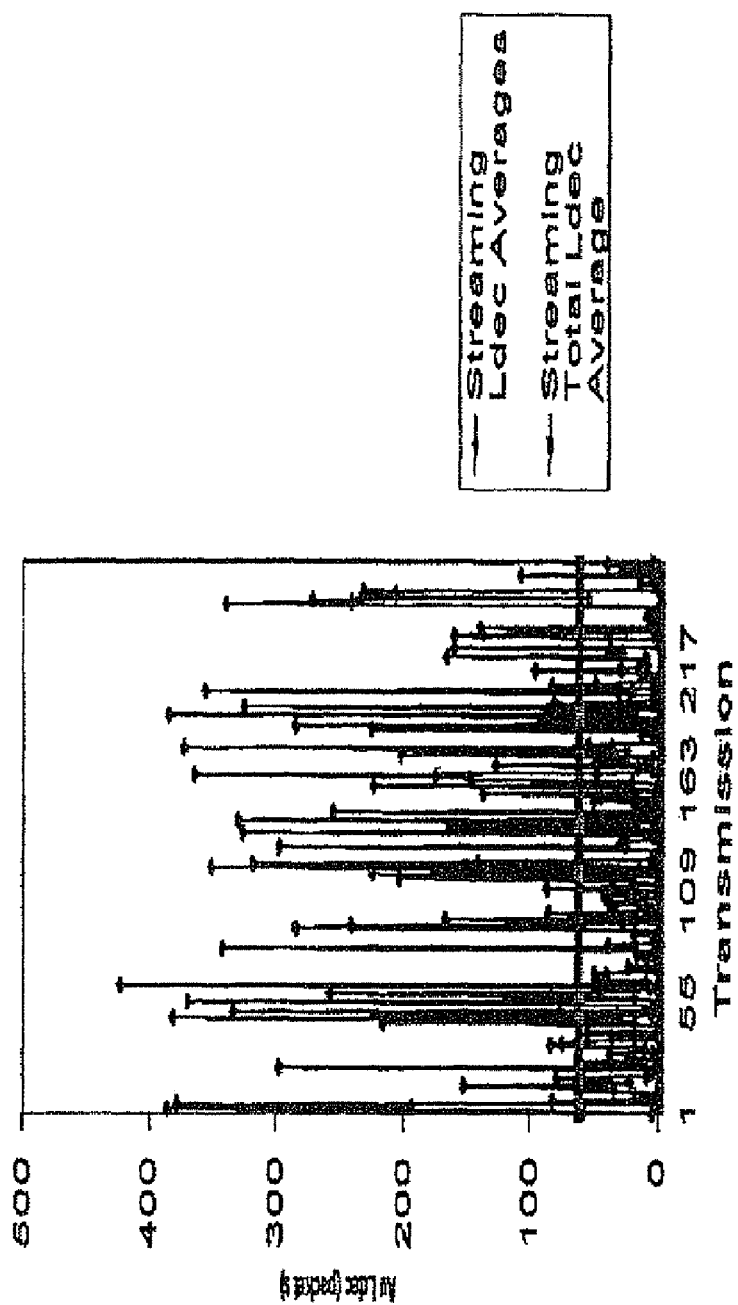
FIG. 37 provides a graph illustrating the actual decoding latency of streaming according to some experiments.
Figure 38:
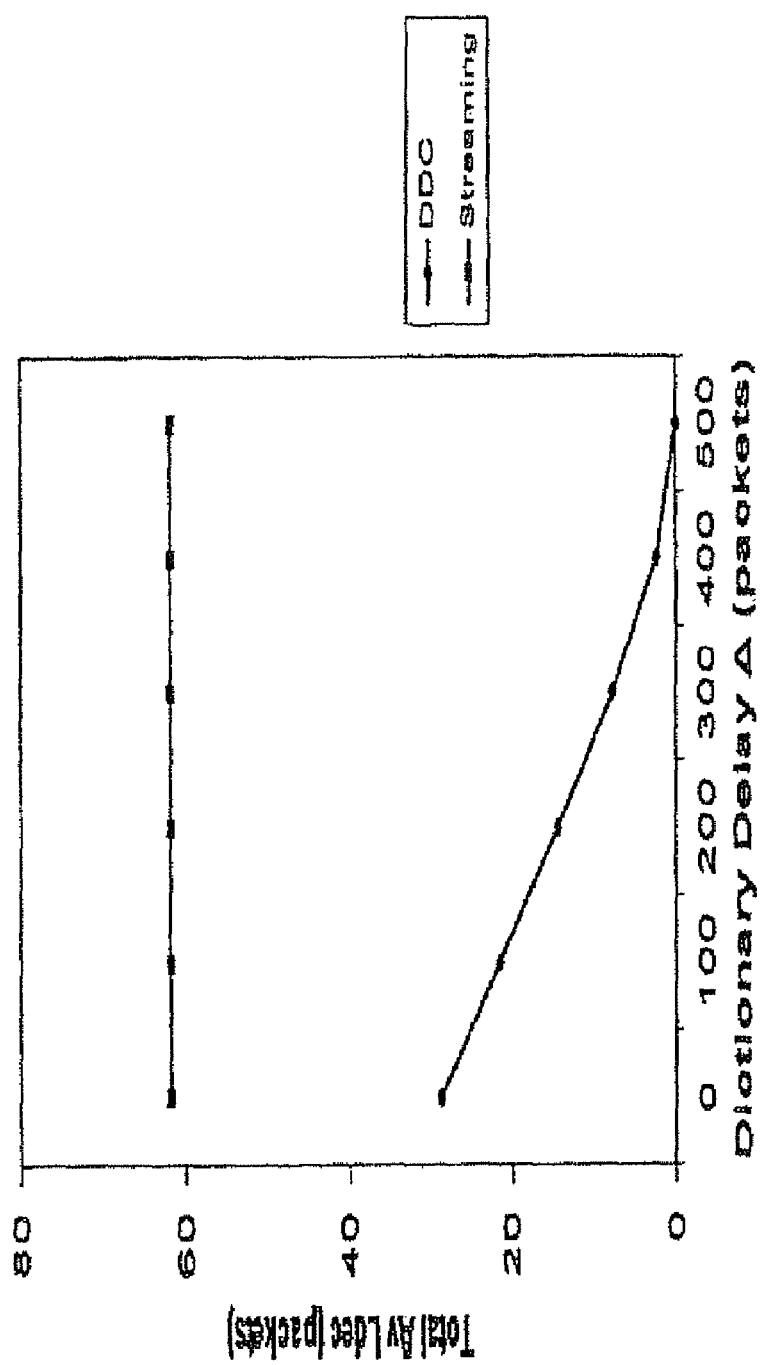
FIG. 38 provides a graph illustrating the effect of the dictionary delay on the decoding latency according to some experiments.

Let us examine the case where RTT=5000 msec. In FIG. 37 we see the $\overline{L_{dec}}$ of streaming compression for every transmission out of the 269 transmissions. The variance in this case is very high. The average decoding latency (Ldec) of streaming for every transmission out of the 269 transmissions over Planet-Lab. The variance in terms of packets is very high. The total average is 62 packets, represented by the horizontal line.a In FIG. 38 illustrates the effect of the dictionary delay on the decoding latency. Thus, we compare the total average $L_{dec}$ of streaming compression for the case of RTT=5000 msec with the total average Ldec of BDDC for various dictionary delays. We can see that for all values of Δ the total average $L_{dec}$ of BDDC in terms of packets is smaller than that of streaming compression. When increasing the dictionary delay of BDDC, the total average $L_{dec}$ becomes smaller. In particular for Δ=500 each packet in streaming is waiting on average for 62 packets, while in BDDC no packets are waiting at all for decoding.

Figure 39:
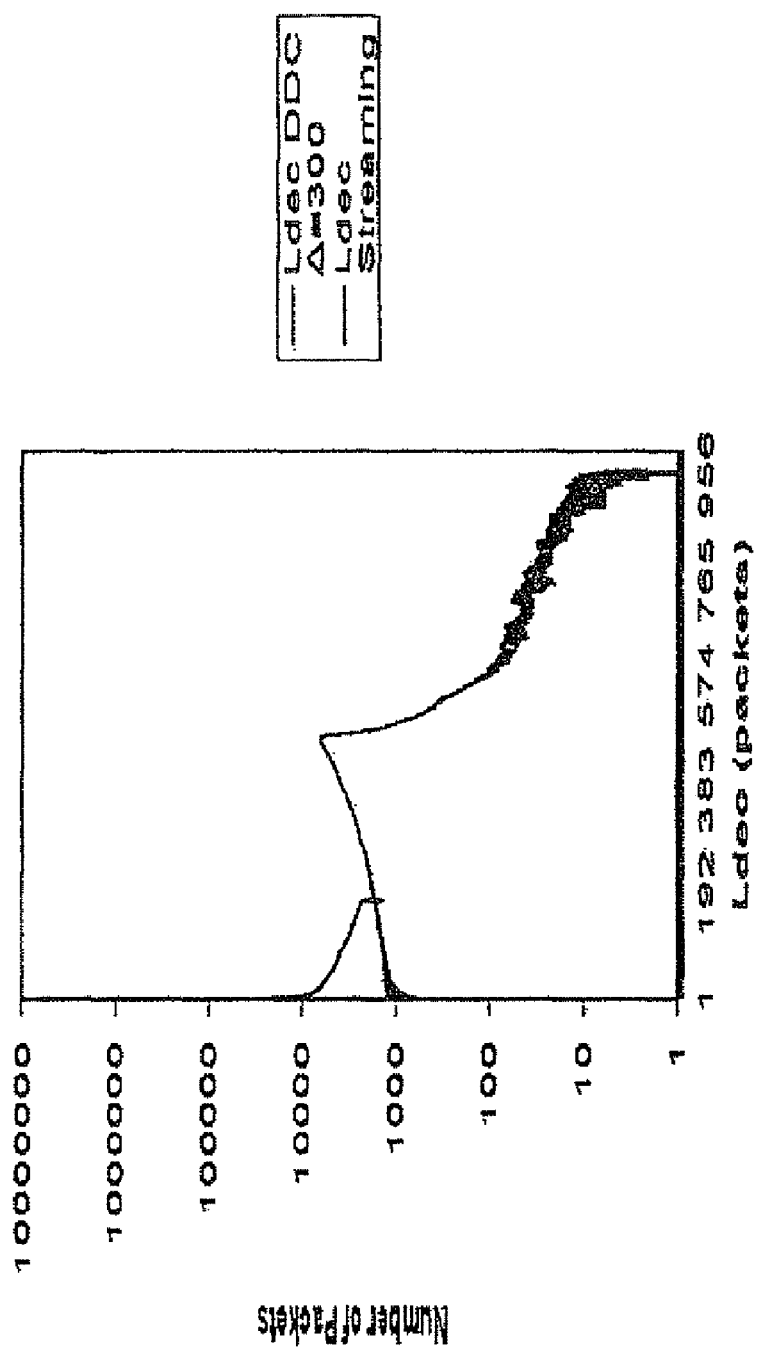
FIG. 39 provides a graph illustrating a comparison between the decoding latency distribution of BDDC and streaming compression.

The distribution of streaming compression for RTT=5000 msec vs. BDDC with Δ=300 is given in FIG. 39.

Thus, FIG. 39 provides a graph illustrating the Comparison between the decoding latency distribution of BDDC and streaming compression, where a RTT=5000 msec is assumed. The maximal $L_{dec}$ value for streaming (lower and wider graph) is 4RTT which is 963 in terms of packets. The other graph is for BDDC with Δ=300. The maximal Ldec value for BDDC is 2RTT-Δ which is 383 packets. BDDC achieves smaller Ldec values compared to streaming.

In streaming, the percentage of pending packets, i.e, packets with $L_{dec} \neq 0$, is 18.8% with maximal $L_{dec}$ value of 963 which represents 4RTT (In case of a massive packet drop that comes in a large burst which is equal to 2RTT in terms of packets, the first non-dropped packet after the burst may wait up to 4RTT since the retransmission timer is set to 2RTT). In the case of BDDC, the percentage of pending packets is reduced to 17.1% in BDDC. The maximal Ldec for BDDC is 383 packets which represents 2RTT-Δ≧0.

By simulating a retransmission scheme on the recorded series of the received packets, we were able to calculate the decoding latency of streaming compression and of the various variants of DDC.

Example Applications

Figure 40:
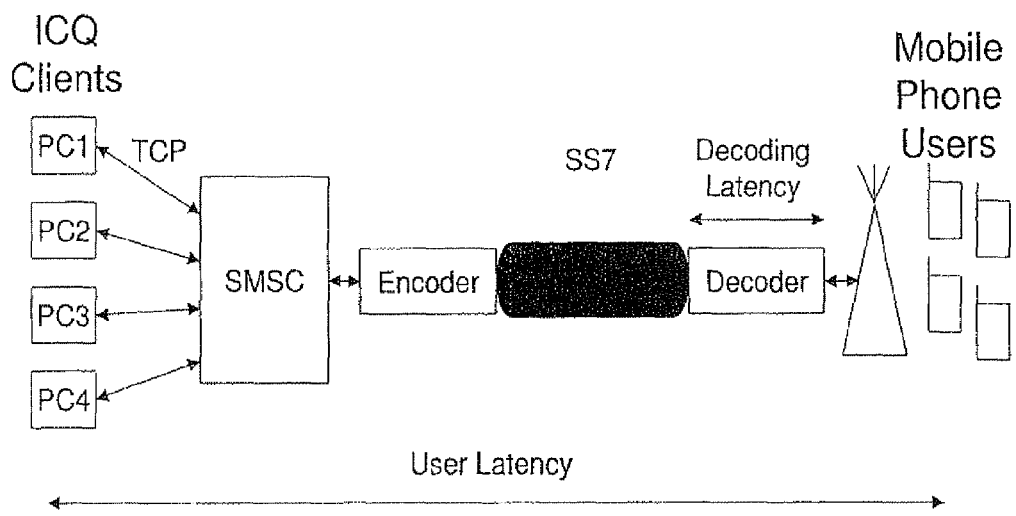
FIG. 40 provides a block diagram of an exemplary system for providing SMS chat from a PC to a mobile phone according to exemplary embodiments of the present invention.

In this section we will describe some example applications. The first application is a PC to a mobile phone chat over SMS (Short Message Service) messages. Such applications exist in PC based instant messenger clients. The PC based messenger client enables sending SMS messages to mobile phones through the PC clients. The SMS messages are transferred to the SMSC (Short Message Service Center) by using special SMS protocols (e.g., CIMD, SMPP, UCP). Then the SMS messages are transferred to the mobile phones through dedicated low speed SS7 (Signaling System 7) control links. The speed range of the SS7 control links is 56 kbps to 64 kbps, therefore these links are considered a bottleneck. The system overview of this application appears in FIG. 40. ICQ is a commercial example of such a PC client.

The amounts of SMS messages are known to increase from day to day due to the high demand for this service. This causes a major problem in the SS7 links. Our method enables compressing traffic, while maintaining on a reasonable latency in user terms. The compression enables more SMS messages to be sent along the given bandwidth, with good Ldec. Other examples would be instant messaging clients: Yahoo messenger and MSN messenger. All the above mentioned messengers are used for transmitting short textual messages. There are organizations that are physically dispersed to remote geographical places. Such organizations may use the instant messaging clients with a compression feature, such as DDC, thus saving bandwidth in the network paths that connect parts of the organization.

DDC can be used in network management applications. When checking if nodes are functioning, we do not care about the order of the check. We only want to know whether failure exists. Many compressed management commands can go through the same channel to various nodes.

Sensor Networks are known to constantly send data from their various sensors. This data can be transmitted via a single bus by using packets compressed with the DDC method. Since a packet transmission requires energy from the sensor, compressing it apriori to transmitting it if effective in saving energy of the sensors, and also bandwidth along the communication bus. Note that the samples of the various sensors are independent, therefore DDC is indeed useful.

Another example is TFTP [22]. TFTP is widely used in networking applications, especially where user authentication and directory visibility are not required. For example, many large software projects use it internally to transfer data between modules, such as configuration files. Suppose we want to copy several files or a memory space from one place to another, through a low speed communication channel, quickly. In a massive packet drops environment, DDC has a clear advantage over streaming compression. If the files are transferred simultaneously, DDC will be able to transfer the files more quickly than streaming compression, while retaining a good traffic compression ratio, allowing to transfer many files at the same time Additional Discussion We show an improved compression-latency trade-off via a method for compressing the payload of network packets named delayed-dictionary compression (DDC). The method deals with the problems of packet drops, packet reordering and the dictionary synchronization problems that ensue. The DDC method has an advantage over the traditional streaming compression, since when decoding a packet, the decoder does not have to wait for all its predecessor packets. It also has an advantage over stateless compression in that it can use dictionaries that are based on a large number of packets, resulting in a better compression ratio. The method has particular advantage for slow to medium speed communication links. While the current work focused on dictionary-compression algorithm, the method may be helpful for various types of on-line compression algorithms. Experimental study establishes the potential for compression improvement in packet networks, as well as the actual improvements obtained by the DDC algorithm presented here.

The research presented here focuses on the issues of compression quality versus latency at the decoding end. Another issue of significance in the context of packet networks is the time in which encoding and decoding take place. When a single session exists, if the time spent on compression and transmission is longer than the time required to transmit the information without compression, there is no point in using data compression. However, even if the compression method increases the overall latency while allowing more sessions to be transferred on the communication link, compression is indeed useful. Jeannot et al [21] present an algorithm that allows overlapping of communications with compression and to automatically adapting the compression effort to currently available network and processor resources. A new software framework was created for the implementation of all the packet compression algorithms mentioned in this work.

A Discussion Related to Presently Disclosed Apparatus

A number of techniques for compressing and/or decoding packets or other units of data have been disclosed herein.

For any of these techniques and/or methods, corresponding apparatus is also provided. Typically, this apparatus includes a packet encoder and/or a packet decoder. Optionally, the apparatus includes a packet transmitter and/or packet receivers. Communications in packet networks is well known in the art, and any known packet transmitter and/or packet receiver (for example, in a wireless network or a network other than a wireless network) is within the scope of the present invention.

In exemplary embodiments, a packet encoder and a packet transmitter reside within a single housing, for example, a handset or a microcomputer or a "network server" (for example, a proxy server), though this is not to be construed as a limitation of the present invention, and alternative form factors or implementations are also contemplated.

In exemplary embodiments, apparatus including a combination of packet compressors (encoders) and decompressors (decoders) are provided. It is known, for example, that single devices are often configured both to send packets (with a need for compression) and to receive packets (with a need for decoding or decompression). In one non-limiting example, a handset may include both apparatus for encoding (compressing) and decoding (decompressing) packets.

It is noted that the packet transmitter and/or the packet encoder (or compressor) and/or the packet receiver and/or the packet decoder (or decompressor) or any other apparatus may be implemented as hardware, as software or any combination thereof. In exemplary embodiments, apparatus is within any or all of these components are provided to that are operative to effect any method or technique described herein.

Transmission Order vs. Actual Transmitting

It is noted that embodiments where the packets are actually transmitting are discussed herein. Nevertheless, this is not a limitation, and the teachings of the present invention are equally applicable to systems where packets are compressed and/or decompressed in a accordance with a determined order of packet transmission. Furthermore, "encoding" and/or "decoding" apparatus that lacks both a transmitter and a receiver are within the scope of the present invention.

In one example, an encoder provided in accordance with a teaching of the present invention is provided (for example, an encoder configured to compress in accordance with a future transmission order). A file may be broken up into chunks and compressed with this encoder. These compressed "chunks" may be stored in non-volatile memory and/or placed on a web server. Subsequently, whenever a decoder downloads these "pre-compressed" chunks from the web-server, the web server will serve these chunks in accordance with the transmission order. Each decoder being served by this web server will decompress individual chunks in accordance with the "transmission order."

Bibliography

[1] Asymmetric digital subscriber line. http://www.dslforum.org.
[2] Asynchronous transfer mode. http://www.atmforum.com.
[3] Divx. http://www.divx.com.
[4] Ethernet IEEE 802.3. http://www.ieee802.org/3.
[5] Frame relay forum. http://www.mplsforum.org/frame.
[6] General packet radio service. http://www.gsmworld.com/technology/gprs.
[7] IPSec working group. http://www.ietf.org/html.charters/ipsec-charter.html.
[8] Planet-lab. http://www.planet-lab.org.
[9] Virtual private network consortium. http://www.vpnc.org.
[10] T. C. Bell, J. G. Cleary, and Ian H. Witten. *Text Compression*. Prentice Hall Advanced Reference Series, 1990.
[11] J. Bellardo and S. Savage. Measuring packet reordering. *In Proc. of the International ACMSIGCOMM Conference on Applications, Technologies, Architectures, and Protocols for Computer Communication*, Pittsburgh, Pa., USA, August 2002.
[12] M. Borella. Measurement and interpretation of internet packet loss. *In Proc. of Journal of Communication and Networks*, 2(2):93-402, 2000.
[13] M. Burrows and D. J. Wheeler. A block-sorting lossless data compression algorithm. Technical Report 124, 1994.
[14] P. Deutsch. Deflate compressed data format specification version 1.3. *IETF, RFC* 1951, May 1996. http://www.ietforg/rfc/rfc1951.txt.
[15] S. Dorward and S. Quinlan. Robust data compression of network packets. *Bell Labs, Lucent Technologies*, July 2000. Unpublished manuscript.
[16] M. Engan, S. Casner, and C. Bormann. IP header compression over PPP. *IETF, RFC* 2509, 1999. http://www.ietf.org/rfe/rfc2509.txt.
[17] R. Friend and R. Monsour. IP payload compression using LZS. *IETF, RFC* 2395, December 1998. http://www.ietf.org/rfc/rfc2395.txt.
[18] J. L Gailly and M. Adler. Zlib—a massively spiffy yet delicately unobtrusive compression library. 1996. http://www.zlib.org.
[19] Information Science Institute. Transmission control protocol. *IETF, RFC* 793, 1981. http://www.ietforg/rfc/rfc793.txt.
[20] V. Jacobson. Compressing tcp/ip headers for low-speed serial links. *IETF, RFC* 1144, February 1990. http://www.ietf.org/rfc/rfc1144.txt.
[21] E. Jeannot, B. Knutsson, and M. Bjorkman. Adaptive online data compression. *In Proc. of the IEEE International Conference on High Performance Distributed Computing* (HPDC'11), Edinburgh, Scotland, July 2002.
[22] K. Sollins. The TFTP protocol (revision 2). *IETF, RFC* 1350, 1992. http://www.ietf.org/rfc/rfc1350.txt.
[23] J. Lilley, J. Yang, H. Balakrishnan, and S. Seshan. A unified header compression framework for low-bandwidth links. *In Proc. of the Sixth Annual ACM-IEEE International Conference on Mobile Computing and Networking*, pages 131-442, August 2000.
[24] Y. Matias, N. Rajpoot, and S. C. Sahinalp. The effect of flexible parsing for dynamic dictionary based data compression. *In Proc. of the International Conference on Data Compression (DCC)*, Snowbird, Utah, pages 238-246, March 1999.
[25] Y. Matias and S. C. Sahinalp. On the optimality of parsing in dynamic dictionary based data compression. *In Proc.* of the Tenth Annual ACM-SIAM Symposium On Discrete Algorithms (SODA), pages 943-944, January 1999.

[26] R. Pereira. IP payload compression using DEFLATE. *IETF, RFC* 2394, December 1998. http://www.ietforg/rfc/rfc2394.txt.

[27] J. Postel. User datagram protocol. *IETF, RFC* 768, 1980. http://www.ietf.org/rfc/rfe768.txt.

[28] J. Postel and J. Reynolds. File transfer protocol. *IETF, RFC* 959, 1985. http://www.ietf.org/rfc/rfc959.txt.

[29] N. Rajpoot. Flexible-parsing project. http://www.dcs.warwick.ac.uk/~nasir/work/fp/.

[30] D. Rand. PPP Predictor compression protocol. *IETF, RFC* 1978, August 1996. http://www.ietf.org/rfc/rfc1978.txt.

[31] A. Shacham, R. Monsour, R. Pereira, and M. Thomas. IP payload compression protocol (IPComp). *IETF, RFC* 2393, December 1998. http://www.ietf.org/rfc/rfc2393.txt.

[32] N. Spring and D. Wetherall. A protocol independent technique for eliminating redundant network traffic. *In Proc. of the International ACM-SIGCOMM Conference on Applications, Technologies, Architectures, and Protocols for Computer Communication*, Stockholm, Sweden, August 2000.

[33] T. Welch. A technique for high performance data compression. *IEEE Computer*, 17(6):8-19, Jun. 1984.

[34] C. Westphal. A user-based frequency-dependent IP header compression architecture. *In Proc. of the International IEEE-Globecom Symposium on Ad Hoc Wireless Networks (SAWN)*, Taipei, Taiwan, November 2002.

[35] J. Woods. PPP Deflate protocol. *IETF, RFC* 1979, 1996. http://www.ietf.org/rfc/rfc1979.txt.

[36] J. Ziv and A. Lempel. A universal algorithm for sequential data compression. *In Proc. of the International Conference IEEE Transactions on Information Theory*, 23(3): 337-343, 1977.

[37] J. Ziv and A. Lempel. Compression of individual sequences via variable-rate coding. *In Proc. of the International Conference IEEE Transactions on Information Theory*, 24(5):530-536, 1978.

Appendix

The files that were used in the experiments are the Calgary corpus files, Canterbury files, and some of our own files. These files are commonly used for data compression benchmark tests. We also added some other files, in particular compressed file, to examine the behavior of the various compression algorithms when a compressed traffic is transferred. The list of the file names and their size is given in Table 1.

TABLE 1

Test files

| Name | Size |
|---|---|
| ptt5_fax/ptt5/pic | 513,216 |
| bluedive.bmp | 2,359,434 |
| Computer-Sem.doc | 383,488 |
| kennedy.xls | 1,029,744 |
| rfc_index.txt | 497,008 |
| world192.txt2 | 2,473,400 |
| bible.txt | 4,047,392 |
| Icet10.txt | 426,754 |
| alice29.txt | 152,089 |
| asyoulik.txt | 125,179 |
| plrabn12.txt | 481,861 |
| Books.htm | 3,498,064 |

TABLE 1-continued

Test files

| Name | Size |
|---|---|
| cp.html | 24,603 |
| fields.c | 11,150 |
| grammar.lsp | 3,721 |
| paper1 | 53,161 |
| paper2 | 82,199 |
| paper3 | 46,526 |
| paper4 | 13,286 |
| paper5 | 11,954 |
| paper6 | 38,105 |
| book1 | 768,771 |
| book2 | 610,856 |
| allezw.ps | 344,346 |
| E. coli | 4,638,690 |
| news | 377,109 |
| bib | 111,261 |
| xargs.1 | 4,227 |
| obj1 | 21,504 |
| obj2 | 246,814 |
| sum | 38,240 |
| geo | 102,400 |
| wavelets.ppt | 437,2487 |
| wap.pdf | 1,231,123 |
| the_fly.wav | 921,992 |
| Bid_Light.mpeg | 1,159,172 |
| mymeagwave.zip | 634,320 |
| saint_agnes.mp3 | 1,957,430 |
| Hortense89a.gif | 1,577,504 |
| Cheetah.jpg | 277,978 |

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method of receiving and decompressing packets, comprising:
    (a) at a receiving location, receiving a plurality of compressed packets transmitted from a sending location, said plurality of compressed packets associated with a transmission order; and (b) for each packet of at least a sub-plurality of said compressed packets:
   (i) determining a respective dictionary from a respective group of packets that precede said each packet in said transmission order,
   (ii) using said respective dictionary, attempting to decompress said each packet, and
   (iii) upon failure of said attempt to decompress said each packet: upon receiving from said sending location at least one more packet that precedes said each packet in said transmission order:
      (A) updating said respective dictionary in accordance with said at least one more packet, and
      (B) repeating said attempt to decompress said each packet using said respective dictionary as updated in accordance with said at least one more packet.

2. An apparatus for receiving and decompressing packets transmitted from a sending location, the apparatus comprising:
   (a) a packet receiver operative to receive a plurality of compressed packets transmitted from the sending location, said plurality of compressed packets associated with a transmission order; and
   (b) a data decompressor operative to decompress at least some of said received packets, said data decompressor operative, for each packet of at least a sub-plurality of said compressed packets:
      (i) to determine a respective dictionary from a respective group of packets that precede said each packet in said transmission order,
      (ii) to attempt to decompress said each packet using said respective dictionary, and
      (iii) upon failure of said attempt to decompress said each packet: upon receipt, by said packet receiver, of at least one more packet that precedes said each packet in said transmission order:
         (A) to update said respective dictionary in accordance with said at least one more packet, and
         (B) to repeat said attempt to decompress said each packet using said respective dictionary as updated in accordance with said at least one more packet.

3. A method of compressing a plurality of packets to be transmitted from a sending location to a receiving location, comprising:
   (a) receiving, at the sending location, from the receiving location, a respective acknowledgement of each packet that is received by the receiving location; and
   (b) for each packet of at least a sub-plurality of the packets:
      (i) determining a respective dictionary from a respective group of packets that includes only said each packet and at least one packet whose respective acknowledgement has been received at the sending location, and
      (ii) generating a respective compressed packet using said respective dictionary.

4. The method of claim 3, wherein, for said each packet of said at least sub-plurality of the packets, said respective group of packets includes a respective first set of historical packets and excludes a respective second set of historical packets that includes at least one historical packet transmitted after a latest packet of said respective first set.

5. The method of claim 4, wherein said respective group of a later said compressed packet has a later latest historical packet than said respective group of an earlier said compressed packet.

6. The method of claim 4, wherein, for each said packet of said sub-plurality, there is a sequence gap between said each packet of said sub-plurality and a latest historical packet of said respective group.

7. The method of claim 3, wherein each said compressed packet is generated by effecting a lossless compression using said respective dictionary.

8. The method of claim 3, wherein each said compressed packet is generated by effecting a lossy compression using said respective dictionary.

9. The method of claim 3, wherein at least some said packets of said sub-plurality are selected from the group consisting of voice packets, text chat packets, video packets and interne browsing packets.

10. The method of claim 3, wherein, for at least one said packet of said sub-plurality, said generating of said respective compressed packet is carried out such that a relative compression ratio of said respective compressed packet is at least as good as a compression ratio attainable by effecting a stateless compression.

11. The method of claim 3, wherein, for each said packet of said sub-plurality, a ratio between a number of historical packets of said respective group and a number of bits of said each packet is at least 0.2.

12. The method of claim 3, wherein, for each said packet of said sub-plurality, a number of historical packets of said respective group is at least 100.

13. The method of claim 3, further comprising:
   (c) if a respective acknowledgement, of a packet that has been transmitted by the sending location to the receiving location, is not received by the sending location within a predetermined time period after the packet has been transmitted: retransmitting said packet.

14. An apparatus for compressing and transmitting a plurality of packets, comprising:
   (a) a packet transmitter operative to transmit packets to a receiving location;
   (b) an acknowledgement receiver operative to receive, from said receiving location, respective acknowledgements of packets received by said receiving location; and
   (c) a data compressor operative to generate compressed packets by steps including, for each packet of at least a sub-plurality of the packets:
      (i) determining a respective dictionary from a respective group of packets that includes only said each packet and at least one packet whose respective acknowledgement has been received by said acknowledgement receiver, and
      (ii) generating a respective said compressed packet using said respective dictionary.

15. The apparatus of claim 14, wherein, if said acknowledgement receiver fails to receive, from said receiving location, within a predetermined time period, a respective acknowledgement of a packet that has been transmitted to said receiving location by said packet transmitter, then said packet transmitter retransmits said packet.

* * * * *